(12) United States Patent
Yashiro et al.

(10) Patent No.: US 10,879,664 B2
(45) Date of Patent: Dec. 29, 2020

(54) LASER GAS REGENERATION SYSTEM AND LASER SYSTEM

(71) Applicant: Gigaphoton Inc., Tochigi (JP)

(72) Inventors: Masanori Yashiro, Oyama (JP);
Hiroaki Tsushima, Oyama (JP);
Osamu Wakabayashi, Oyama (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 16/375,591

(22) Filed: Apr. 4, 2019

(65) Prior Publication Data

US 2019/0237928 A1  Aug. 1, 2019

Related U.S. Application Data

(63) Continuation of application No. PCT/JP2016/085340, filed on Nov. 29, 2016.

(51) Int. Cl.
*H01S 3/036* (2006.01)
*H01S 3/097* (2006.01)
(Continued)

(52) U.S. Cl.
CPC ............ *H01S 3/036* (2013.01); *C01B 7/20* (2013.01); *H01S 3/09705* (2013.01);
(Continued)

(58) Field of Classification Search
CPC ........ H01S 3/03; H01S 3/036; H01S 3/08004; H01S 3/08009; H01S 3/09705;
(Continued)

(56) References Cited

U.S. PATENT DOCUMENTS 5,073,896 A   12/1991   Reid et al.
5,363,396 A   11/1994   Webb et al.
(Continued)

FOREIGN PATENT DOCUMENTS

CN   104516378 A   4/2015
JP   H11-054851 A   2/1999
(Continued)

OTHER PUBLICATIONS

An Office Action mailed by China National Intellectual Property Administration dated Aug. 4, 2020, which corresponds to Chinese Patent Application No. 201680089883.5 and is related to U.S. Appl. No. 16/375,591 with English language translation.
(Continued)

*Primary Examiner* — Yuanda Zhang
(74) *Attorney, Agent, or Firm* — Studebaker & Brackett PC

(57) ABSTRACT

A laser gas regeneration system for an excimer laser includes a first pipe capable of supplying a laser chamber with a first laser gas, a second pipe capable of supplying the laser chamber with a second laser gas having a halogen gas concentration higher than that of the first laser gas, a third pipe allowing a gas exhausted from the laser chamber to pass therethrough, a gas refiner that refines the gas having passed through the third pipe, a branch that causes the refined gas to divide and flow into a fourth pipe and a fifth pipe, a first regenerated gas supplier that supplies the first pipe with a gas having divided and flowed into the fourth pipe, and a second regenerated gas supplier that adds a halogen gas to a gas having divided and flowed into the fifth pipe and supplies the second pipe with the halogen-added gas.

17 Claims, 37 Drawing Sheets

(51) Int. Cl.
    *C01B 7/20*     (2006.01)
    *H01S 3/104*     (2006.01)
    *H01S 3/225*     (2006.01)
    *H01S 3/22*     (2006.01)
    *H01S 3/03*     (2006.01)

(52) U.S. Cl.
    CPC .............. *H01S 3/104* (2013.01); *H01S 3/225* (2013.01); *H01S 3/2222* (2013.01); *H01S 3/2258* (2013.01); *H01S 3/03* (2013.01)

(58) Field of Classification Search
    CPC ........ H01S 3/0971; H01S 3/104; H01S 3/134; H01S 3/2222; H01S 3/225; H01S 3/2258
    See application file for complete search history.

(56) References Cited

U.S. PATENT DOCUMENTS 6,609,540 B1     8/2003     Torisu et al.
2015/0249312 A1     9/2015     Tsushima et al.
2016/0248215 A1     8/2016     Suzuki et al.
2018/0241170 A1*     8/2018     Suzuki .................... H01S 3/036

FOREIGN PATENT DOCUMENTS

| WO | 2014/069636 A1 | 5/2014 | |
|---|---|---|---|
| WO | 2015/076415 A1 | 5/2015 | |
| WO | WO-2017072863 A1 * | 5/2017 | ........... H01S 3/2251 |
| WO | WO-2017081819 A1 * | 5/2017 | ............. H01S 3/036 |

OTHER PUBLICATIONS

International Search Report issued in PCT/JP2016/085340; dated Feb. 28, 2017.

International Preliminary Report on Patentability (Chapter I) and Written Opinion of the International Searching Authority; PCT/JP2016/085340; dated Jun. 4, 2019.

* cited by examiner

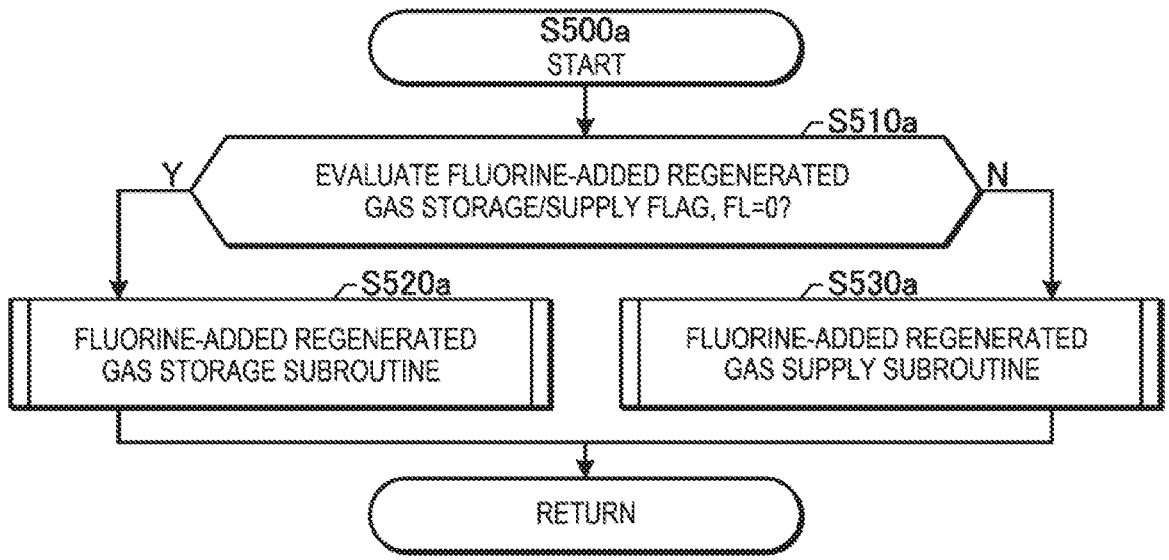
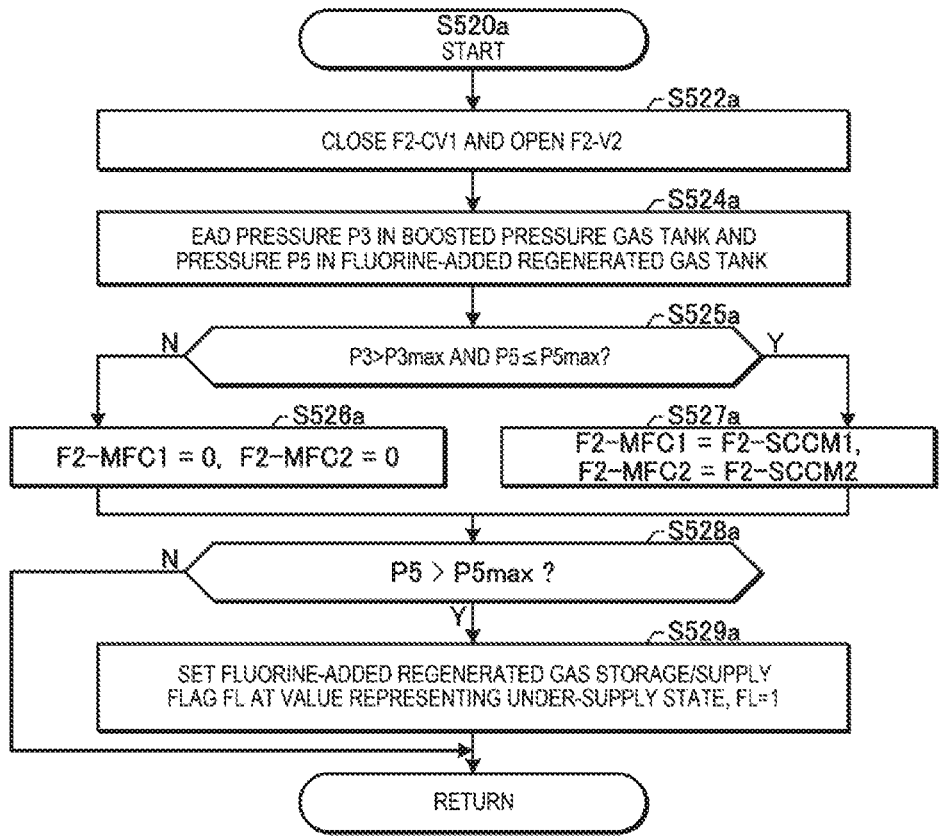

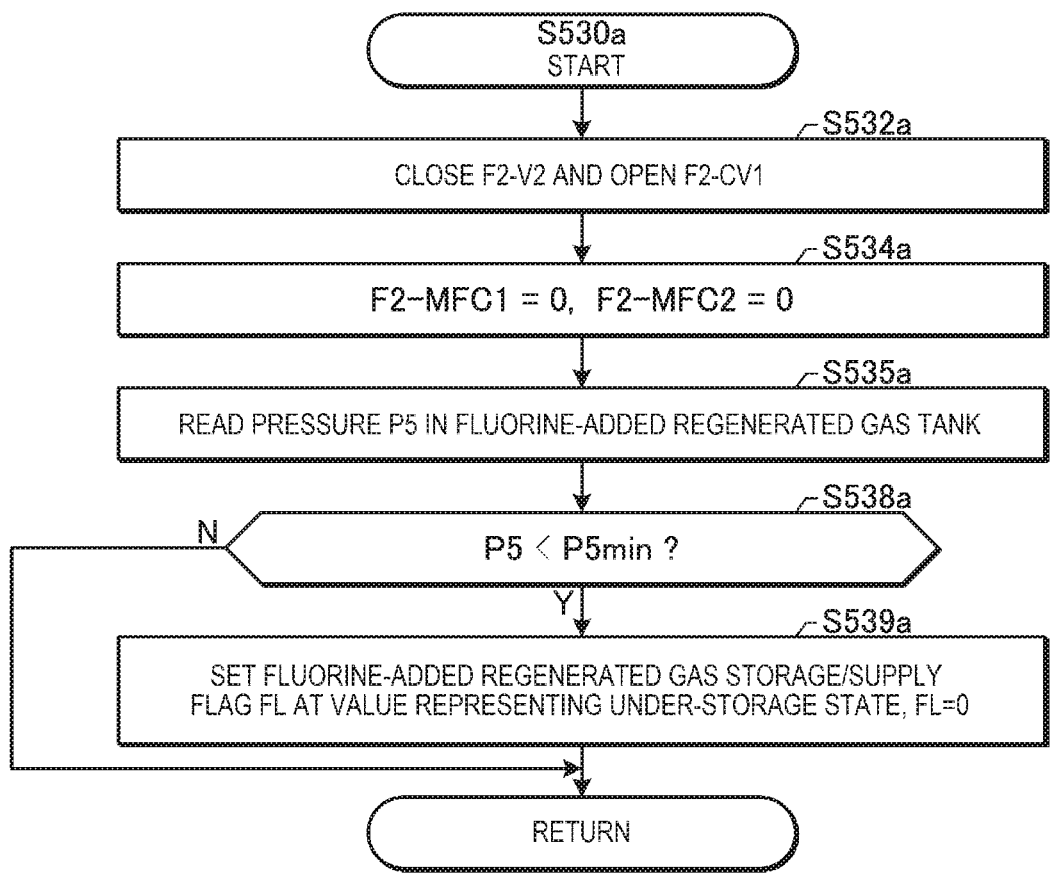

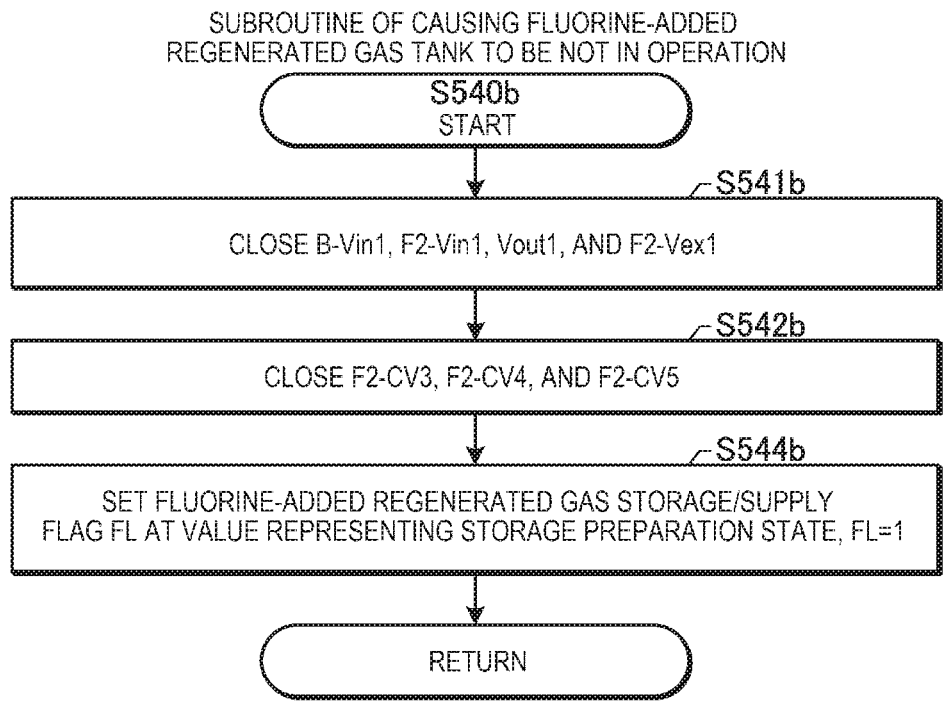
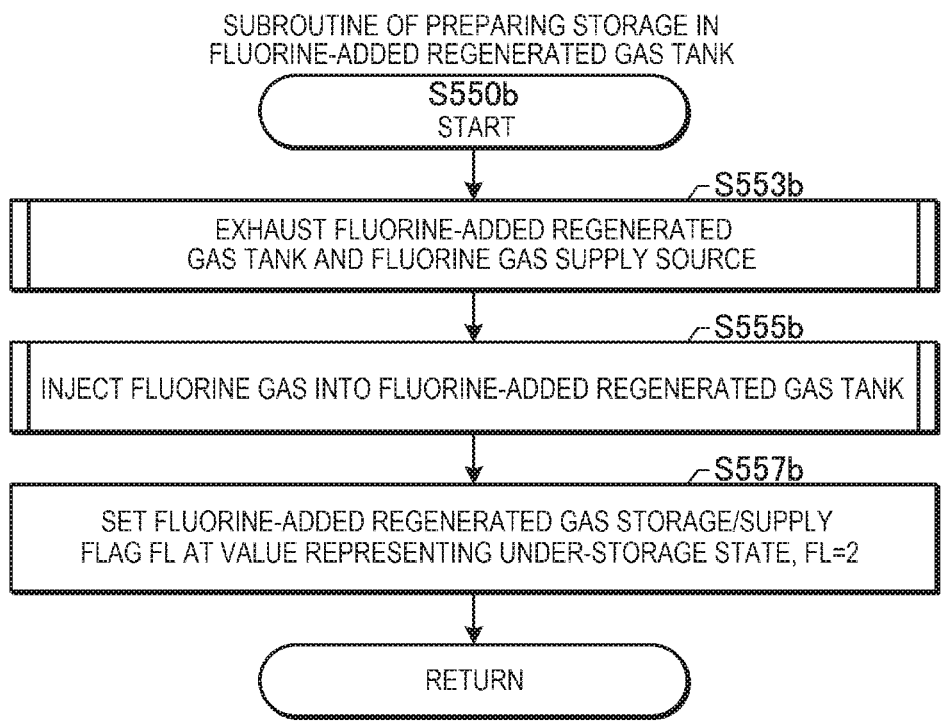

FIG. 38

| FIRST FLUORINE-ADDED REGENERATED GAS TANK | | SECOND FLUORINE-ADDED REGENERATED GAS TANK | |
|---|---|---|---|
| STATE | STORAGE/SUPPLY FLAG | STATE | STORAGE/SUPPLY FLAG |
| UNDER NOT-IN-OPERATION | FL1 = 0 | UNDER NOT-IN-OPERATION | FL2 = 0 |
| STORAGE PREPARATION | FL1 = 1 | UNDER NOT-IN-OPERATION | FL2 = 0 |
| UNDER STORAGE | FL1 = 2 | UNDER NOT-IN-OPERATION | FL2 = 0 |
| SUPPLY PREPARATION | FL1 = 3 | STORAGE PREPARATION | FL2 = 1 |
| UNDER SUPPLY | FL1 = 4 | UNDER STORAGE | FL2 = 2 |
| STORAGE PREPARATION | FL1 = 1 | SUPPLY PREPARATION | FL2 = 3 |
| UNDER STORAGE | FL1 = 2 | UNDER STORAGE | FL2 = 4 |
| SUPPLY PREPARATION | FL1 = 3 | STORAGE PREPARATION | FL2 = 1 |
| UNDER SUPPLY | FL1 = 4 | UNDER STORAGE | FL2 = 2 |
| STORAGE PREPARATION | FL1 = 1 | SUPPLY PREPARATION | FL2 = 3 |
| UNDER STORAGE | FL1 = 2 | UNDER SUPPLY | FL2 = 4 |
| ... | ... | ... | ... |

LASER GAS REGENERATION SYSTEM AND LASER SYSTEM

CROSS REFERENCE TO RELATED APPLICATIONS

The present application is a continuation application of International Application No. PCT/JP2016/085340 filed on Nov. 29, 2016. The content of the application is incorporated herein by reference in its entirety.

BACKGROUND

1. Technical Field

The present disclosure relates to a laser gas regeneration system and a laser system.

2. Related Art

In recent years, a semiconductor exposure apparatus (hereinafter referred to as "exposure apparatus") is required to improve the resolution as a semiconductor integrated circuit is increasingly miniaturized and highly integrated. To this end, reduction in the wavelength of the light emitted from a light source for exposure is underway. In general, a gas laser is used as the light source for exposure in place of a mercury lamp in related art. For example, a KrF excimer laser, which outputs ultraviolet laser light having a wavelength of 248 nm, and an ArF excimer laser, which outputs ultraviolet laser light having a wavelength of 193 nm, are used as a gas laser for exposure.

As a next-generation exposure technology, liquid-immersion exposure, in which the gap between the exposure lens of the exposure apparatus and a wafer is filled with a liquid, has been put into use. In the liquid-immersion exposure, since the refractive index of the gap between the exposure lens and the wafer changes, the apparent wavelength of the light from the light source for exposure is shortened. In the liquid-immersion exposure with an ArF excimer laser as the light source for exposure, the wafer is irradiated with ultraviolet light having a wavelength of 134 nm in water. The technology described above is called ArF liquid-immersion exposure (or ArF liquid-immersion lithography).

A KrF excimer laser and an ArF excimer laser each have a wide spontaneous oscillation width ranging from about 350 to 400 pm. Therefore, in a case where the projection lens is made of a material that transmits ultraviolet light, such as the KrF and ArF laser light, the chromatic aberrations undesirably occur in some cases. As a result, the resolution could lower. To avoid the reduction in resolution, the spectral linewidth of the laser light outputted from the gas laser needs to be narrow enough to cause the chromatic aberrations to be nearly negligible. A line narrowing module (LNM) including a line narrowing element (such as etalon and grating) is therefore provided in some cases in the laser resonator of the gas laser to narrow the spectral linewidth. In the following description, a laser having a narrowed spectral linewidth is called a narrowed-linewidth laser.

CITATION LIST

Patent Literature

[PTL 1] U.S. Pat. No. 5,363,396
[PTL 2] U.S. Pat. No. 6,609,540
[PTL 3] WO2015/076415

SUMMARY

The laser gas regeneration system according to a viewpoint of the present disclosure is a laser gas regeneration system for an excimer laser including a first pipe configured to be capable of supplying a laser chamber with a first laser gas, a second pipe configured to be capable of supplying the laser chamber with a second laser gas having a halogen gas concentration higher than a halogen gas concentration of the first laser gas, and a third pipe configured to allow a gas exhausted from the laser chamber to pass therethrough, the laser gas regeneration system including a gas refiner that refines the gas having passed through the third pipe, a branch that causes a gas having flowed into the gas refiner and having been refined by the gas refiner to divide and flow into a fourth pipe and a fifth pipe, a first regenerated gas supplier that supplies the first pipe with a gas having divided and flowed into the fourth pipe, and a second regenerated gas supplier that adds a halogen gas to a gas having divided and flowed into the fifth pipe and supplies the second pipe with the gas to which the halogen gas has been added.

The laser system according to another viewpoint of the present disclosure is a laser system including an excimer laser and a laser gas regeneration system. The excimer laser includes a plurality of laser chambers, a first pipe configured to be capable of supplying each of the plurality of laser chambers with a first laser gas, a second pipe configured to be capable of supplying each of the plurality of laser chambers with a second laser gas having a halogen gas concentration higher than a halogen gas concentration of the first laser gas, and a third pipe configured to allow a gas exhausted from each of the plurality of laser chambers to pass therethrough, and the laser gas regeneration system includes a gas refiner that refines the gas having passed through the third pipe, a branch that causes a gas having flowed into the gas refiner and having been refined by the gas refiner to divide and flow into a fourth pipe and a fifth pipe, a first regenerated gas supplier that supplies the first pipe with a gas having divided and flowed into the fourth pipe, and a second regenerated gas supplier that adds a halogen gas to a gas having divided and flowed into the fifth pipe and supplies the second pipe with the gas to which the halogen gas has been added.

BRIEF DESCRIPTION OF THE DRAWINGS

Embodiments of the present disclosure will be described below only by way of example with reference to the accompanying drawings.

FIG. 10 is a flowchart showing in detail a fluorine-added regenerated gas storage/supply subroutine in the first embodiment.

FIG. 11 is a flowchart showing a fluorine-added regenerated gas storage subroutine in detail.

FIG. 12 is a flowchart showing a fluorine-added regenerated gas supply subroutine in detail.

FIG. 16 is a flowchart showing in detail the process of causing the fluorine-added regenerated gas tank to be not in operation in the second embodiment.

FIG. 17 is a flowchart showing in detail the process of preparing storage in the fluorine-added regenerated gas tank in the second embodiment.

FIG. 38 shows changes in the states of the first fluorine-added regenerated gas tank 711 and the second fluorine-added regenerated gas tank 712.

DETAILED DESCRIPTION

Figure 1:
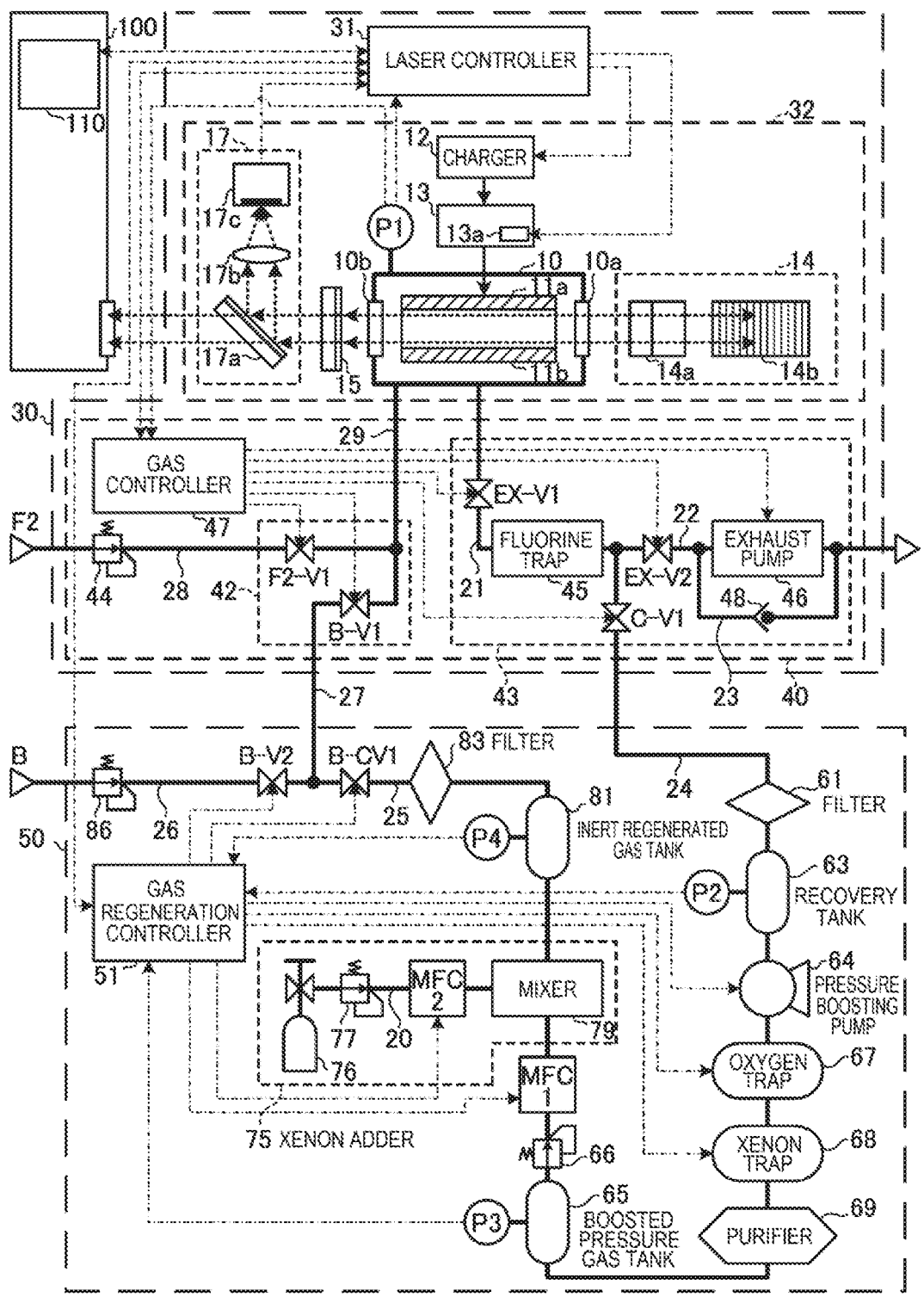
FIG. 1 schematically shows the configurations of an excimer laser 30 and a laser gas regeneration system 50 according to Comparable Example.

<Contents>
1. Excimer laser and laser gas regeneration system according to Comparable Example
  1.1 Configuration
    1.1.1 Excimer laser
      1.1.1.1 Laser oscillation system
      1.1.1.2 Laser gas control system
    1.1.2 Laser gas regeneration system
  1.2 Operation
    1.2.1 Operation of excimer laser
      1.2.1.1 Operation of laser oscillation system
      1.2.1.2 Operation of laser gas control system
    1.2.2 Operation of laser gas regeneration system
      1.2.2.1 Main procedure
      1.2.2.2 Initial setting subroutine
      1.2.2.3 Gas recovery/pressure boosting subroutine
      1.2.2.4 Gas refinement/adjustment subroutine
      1.2.2.5 Inert regenerated gas storage/supply subroutine 1.3 Problems
2. Laser gas regeneration system in which fluorine gas is added to inert regenerated gas
   2.1 Configuration
   2.2 Operation
   2.2.1 Main procedure
   2.2.2 Initial setting subroutine
   2.2.3 Fluorine-added regenerated gas storage/supply subroutine
      2.2.3.1 Fluorine-added regenerated gas storage subroutine
      2.2.3.2 Fluorine-added regenerated gas supply subroutine
   2.3 Effects
3. Laser gas regeneration system including halogen gas supply source containing solid halogen
   3.1 Configuration
   3.2 Operation
   3.2.1 Initial setting subroutine
   3.2.2 Fluorine-added regenerated gas storage/supply subroutine
      3.2.2.1 Subroutine of causing fluorine-added regenerated gas tank to be not in operation
      3.2.2.2 Subroutine of preparing storage in fluorine-added regenerated gas tank
      3.2.2.3 Subroutine of causing fluorine-added regenerated gas tank to be under storage
      3.2.2.4 Subroutine of preparing supply from fluorine-added regenerated gas tank
      3.2.2.5 Subroutine of causing fluorine-added regenerated gas tank to be under supply
   3.3. Effects
4. Laser gas regeneration system including a plurality of fluorine-added regenerated gas tanks
   4.1 Configuration
   4.2 Operation
   4.2.1 Initial setting subroutine
   4.2.2 Fluorine-added regenerated gas storage/supply subroutine
      4.2.2.1 Subroutine of causing first and second fluorine-added regenerated gas tanks to be not in operation
      4.2.2.2 Subroutine of preparing storage in first and second fluorine-added regenerated gas tanks
      4.2.2.3 Subroutine of causing first and second fluorine-added regenerated gas tanks to be under storage
      4.2.2.4 Subroutine of preparing supply from first and second fluorine-added regenerated gas tanks
      4.2.2.5 Subroutine of causing first and second fluorine-added regenerated gas tanks to be under supply
   4.3 Effects
5. Laser gas regeneration system for laser using no xenon gas
6. Laser gas regeneration system connected to plurality of lasers
   6.1 Configuration
   6.2 Operation
   6.3 Effects
7. Laser gas regeneration system in which a variety of traps are disposed on downstream side of boosted pressure gas tank
   7.1 Configuration
   7.2 Effects
8. Laser gas regeneration system in which fluorine gas is added to inert new gas
   8.1 Configuration
   8.2 Operation
   8.2.1 Initial setting subroutine
   8.2.2 Fluorine-added regenerated gas storage subroutine
   8.2.3 Fluorine-added regenerated gas supply subroutine
   8.3 Effects
9. Others Embodiments of the present disclosure will be described below in detail with reference to the drawings. The embodiments described below each show an example of the present disclosure and are not intended to limit the contents of the present disclosure. Further, all configurations and operations described in the embodiments are not necessarily essential as configurations and operations in the present disclosure. The same component has the same reference character, and no redundant description of the same component will be made.

1. Excimer Laser and Laser Gas Regeneration System According to Comparable Example 1.1 Configuration FIG. 1 schematically shows the configurations of an excimer laser 30 and a laser gas regeneration system 50 according to Comparable Example.

1.1.1 Excimer Laser

The excimer laser 30 includes a laser controller 31, a laser oscillation system 32, and a laser gas control system 40.

The excimer laser 30 may be used along with an exposure apparatus 100. Laser light outputted from the excimer laser 30 may enter the exposure apparatus 100. The exposure apparatus 100 includes an exposure apparatus controller 110. The exposure apparatus controller 110 is configured to control the exposure apparatus 100. The exposure apparatus controller 110 is configured to transmit a target pulsed energy setting signal and a light emission trigger signal to the laser controller 31 provided in the excimer laser 30.

The laser controller 31 is configured to control the laser oscillation system 32 and the laser gas control system 40. The laser controller 31 receives measured data from a power monitor 17 and a chamber pressure sensor P1 provided in the laser oscillation system 32.

1.1.1.1 Laser Oscillation System

The laser oscillation system 32 includes a laser chamber 10, a charger 12, a pulsed power module 13, a line narrowing module 14, an output coupling mirror 15, the chamber pressure sensor P1, and the power monitor 17.

The laser chamber 10 is disposed in the optical path of a laser resonator formed of the line narrowing module 14 and the output coupling mirror 15. The laser chamber 10 is provided with two windows 10a and 10b. The laser chamber 10 accommodates discharge electrodes 11a and 11b. The laser chamber 10 contains a laser gas.

The charger 12 holds electrical energy to be supplied to the pulsed power module 13. The pulsed power module 13 includes a switch 13a. The pulsed power module 13 is configured to apply pulsed voltage to the gap between the discharge electrodes 11a and 11b.

The line narrowing module 14 includes a prism 14a and a grating 14b. The output coupling mirror 15 is formed of a partial reflection mirror.

The chamber pressure sensor P1 is configured to measure the pressure of the gas in the laser chamber 10. The chamber pressure sensor P1 measures the overall pressure of the laser gas. The chamber pressure sensor P1 is configured to transmit measured data on the gas pressure to the laser controller 31 and a gas controller 47 provided in the laser gas control system 40.

The power monitor 17 includes a beam splitter 17a, a light collection lens 17b, and an optical sensor 17c. The beam splitter 17a is disposed in the optical path of the laser light outputted through the output coupling mirror 15. The beam splitter 17a is configured to transmit part of the laser light outputted through the output coupling mirror 15 at high transmittance toward the exposure apparatus 100 and reflects the remainder of the laser light. The light collection lens 17b and the optical sensor 17c are disposed in the optical path of the laser light reflected off the beam splitter 17a. The light collection lens 17b is configured to focus the laser light reflected off the beam splitter 17a onto the optical sensor 17c. The optical sensor 17c is configured to transmit, as the measured data to the laser controller 31, an electric signal according to the pulsed energy of the laser light focused by the light collection lens 17b.

1.1.1.2 Laser Gas Control System

The laser gas control system 40 includes the gas controller 47, a gas supplier 42, and an exhauster 43. The gas controller 47 is configured to transmit and receive signals to and from the laser controller 31. The gas controller 47 is configured to receive the measure data outputted from the chamber pressure sensor P1 provided in the laser oscillation system 32. The gas controller 47 is configured to control the gas supplier 42 and the exhauster 43. The gas controller 47 is configured to control valves F2-V1 and B-V1 provided in the gas supplier 42 and valves EX-V1, EX-V2, and C-V1 and an exhaust pump 46 provided in the exhauster 43.

The gas supplier 42 includes part of a pipe 28 connected to a fluorine-containing gas supply source F2 and part of a pipe 29 connected to the laser chamber 10 provided in the laser oscillation system 32. The pipe 28 corresponds to a second pipe in the present disclosure. The pipe 28 is connected to the pipe 29 to allow the fluorine-containing gas supply source F2 to supply the laser chamber 10 with a fluorine-containing gas. The fluorine-containing gas supply source F2 is a gas cylinder containing the fluorine-containing gas. The fluorine-containing gas is, for example, a laser gas that is a mixture of fluorine gas, argon gas, and neon gas. The pressure at which the laser gas is supplied from the fluorine-containing gas supply source F2 to the pipe 28 is set by a regulator 44 at a value, for example, greater than or equal to 5,000 hPa but smaller than or equal to 6,000 hPa. The gas supplier 42 includes the valve F2-V1 provided in the pipe 28. The supply of the fluorine-containing gas from the fluorine-containing gas supply source F2 to the laser chamber 10 via the pipe 29 is controlled by opening and closing the valve F2-V1. The opening and closing of the valve F2-V1 is controlled by the gas controller 47.

The gas supplier 42 further includes part of a pipe 27 connected to and between the laser gas regeneration system 50 and the pipe 29. The pipe 27 corresponds to the first pipe in the present disclosure. The pipe 27 is connected to the pipe 29 to allow the laser gas regeneration system 50 to supply the laser chamber 10 with a buffer gas. The buffer gas is a laser gas containing, for example, argon gas, neon gas, and a small amount of xenon gas. The buffer gas may be an inert new gas supplied from a buffer gas supply source B, which will be described later, or an inert regenerated gas having impurities reduced in the laser gas regeneration system 50. The gas supplier 42 includes the valve B-V1 provided in the pipe 27. The supply of the buffer gas from the laser gas regeneration system 50 to the laser chamber 10 via the pipe 29 is controlled by opening and closing the valve B-V1. The opening and closing of the valve B-V1 is controlled by the gas controller 47.

The exhauster 43 includes part of a pipe 21 connected to the laser chamber 10 provided in the laser oscillation system 32 and part of a pipe 22 connected to an exhaust processor and other components that is external to the laser but is not shown. The pipe 21 corresponds to the third pipe in the present disclosure. The pipe 21 is connected to the pipe 22 to allow exhaust gas exhausted from the laser chamber 10 to be exhausted out of the laser.

The exhauster 43 includes the valve EX-V1 provided in the pipe 21 and a fluorine trap 45 provided in the pipe 21. The valve EX-V1 and the fluorine trap 45 are disposed in the presented order from the side facing the laser chamber 10. Exhausting the exhaust gas from the laser chamber 10 to the fluorine trap 45 is controlled by opening and closing the valve Ex-V1. The opening and closing of the valve EX-V1 is controlled by the gas controller 47.

The fluorine trap 45 is configured to trap the fluorine gas and fluorine compounds contained in the exhaust gas exhausted from the laser chamber 10. A processing agent that traps the fluorine gas and the fluorine compounds contains, for example, the combination of zeolite and a calcium oxide. The fluorine gas and the calcium oxide therefore react with each other to generate a calcium fluoride and oxygen gas. The calcium fluoride is left in the fluorine trap 45, and the oxygen gas is trapped by an oxygen trap 67, which will be described later. Part of impurity gases that have not been completely removed by the calcium oxide, such as the fluorine compounds, are adsorbed by the zeolite.

The exhauster 43 includes the valve EX-V2 provided in the pipe 22 and the exhaust pump 46 provided in the pipe 22. The valve EX-V2 and the exhaust pump 46 are disposed in the presented order from the side facing the laser chamber 10. Exhausting the exhaust gas out of the laser via an outlet of the fluorine trap 45 is controlled by opening and closing the valve EX-V2. The opening and closing of the valve EX-V2 is controlled by the gas controller 47. The exhaust pump 46 is configured to forcibly exhaust the laser gas in the laser chamber 10 with the valves EX-V1 and EX-V2 open in such a way that the pressure of the laser gas becomes lower than or equal to the atmospheric pressure. The operation of the exhaust pump 46 is controlled by the gas controller 47.

The exhauster 43 includes a bypass pipe 23. The bypass pipe 23 is connected to and between the pipe 22 on the inlet side of the exhaust pump 46 and the pipe 22 on the outlet side of the exhaust pump 46. The exhauster 43 includes a check valve 48 provided in the bypass pipe 23. The check valve 48 is configured to exhaust, when the valves EX-V1 and EX-V2 are opened, part of the laser gas in the laser chamber 10 so filled therewith that the laser gas pressure is higher than or equal to the atmospheric pressure.

The exhauster 43 further includes part of a pipe 24. The pipe 24 is connected to and between the laser gas regeneration system 50 and the portion where the pipes 21 and 22 are connected to each other. The pipe 24 is connected to the portion where the pipes 21 and 22 are connected to each other to allow the exhaust gas exhausted from the laser chamber 10 to be supplied to the laser gas regeneration system 50. The exhauster 43 includes the valve C-V1 provided in the pipe 24. The supply of the exhaust gas via the outlet of the fluorine trap 45 to the laser gas regeneration system 50 is controlled by opening and closing the valve C-V1. The opening and closing of the valve C-V1 is controlled by the gas controller 47.

1.1.2 Laser Gas Regeneration System

The laser gas regeneration system 50 includes a gas regeneration controller 51, part of the pipe 24, part of the pipe 27, and a pipe 25. The pipe 24 is connected to the exhauster 43 of the laser gas control system 40. The pipe 27 is connected to the gas supplier 42 of the laser gas control system 40. The pipe 25 is connected to and between the pipes 24 and 27.

In the laser gas regeneration system 50, the following components are arranged along the pipe 24 in the present order from the side facing the exhauster 43: a filter 61; a recovery tank 63; a pressure boosting pump 64; an oxygen trap 67; a xenon trap 68; a purifier 69; a boosted pressure gas tank 65; a regulator 66; and a mass flow controller MFC1. A xenon adder 75 is disposed between the pipe 24 and the pipe 25. An inert regenerated gas tank 81, a filter 83, and a valve B-CV1 are arranged in the presented order along the pipe 25 from the side facing the xenon adder 75. The pipe 24 and the pipe 25 form a gas refinement channel from the valve C-V1 to the valve B-CV1. The gas refiner in the present disclosure includes at least one of the filter 61, the oxygen trap 67, the xenon trap 68, and the purifier 69. The first regenerated gas supplier in the present disclosure includes at least one of the xenon adder 75 and the inert regenerated gas tank 81.

The laser gas regeneration system 50 further includes part of a pipe 26 connected to the buffer gas supply source B. The pipe 26 is connected to the portion where the pipes 25 and 27 are connected to each other. The buffer gas supply source B is, for example, a gas cylinder containing the buffer gas. In the present disclosure, the buffer gas that has been supplied from the buffer gas supply source B but has not reached the laser chamber 10 is referred to as an inert new gas in some cases in distinction from the inert regenerated gas supplied through the pipe 25. The pressure at which the inert new gas is supplied from the buffer gas supply source B to the pipe 26 is set by a regulator 86 at a value, for example, greater than or equal to 5,000 hPa but smaller than or equal to 6,000 hPa. The laser gas regeneration system 50 includes a valve B-V2 provided in the pipe 26.

The filter 61 provided in the laser gas regeneration system 50 is a mechanical filter that traps particles contained in the exhaust gas introduced from the exhauster 43. The particles to be trapped are primarily particles produced by the discharge in the laser chamber 10.

The recovery tank 63 is a container that contains the exhaust gas having passed through the filter 61. A recovery pressure sensor P2 is attached to the recovery tank 63.

The pressure boosting pump 64 is a pump that boosts the pressure of the exhaust gas introduced from the recovery tank 63 and outputs the gas having the boosted pressure. The pressure boosting pump 64 is formed, for example, of a diaphragm or bellows pump that restricts contamination of the exhaust gas with oil to a small amount.

The oxygen trap 67 contains a processing agent that traps oxygen gas from the boosted pressure gas. The oxygen gas to be trapped is primarily the oxygen gas generated in the reaction between the fluorine gas and the calcium oxide in the fluorine trap 45. The processing agent that traps oxygen gas contains at least one of a nickel-based (Ni-based) catalyst, a copper-based (Cu-based) catalyst, and a composite thereof. The oxygen trap 67 includes a heater and a temperature adjuster that are not shown.

The xenon trap 68 is configured to remove the xenon gas from the exhaust gas having passed through the oxygen trap 67. The xenon trap 68 is, for example, a device using a Ca—X-type zeolite, a Na—Y-type zeolite, or activated carbon, which can each selectively adsorb xenon. The xenon trap 68 includes a heater and a temperature adjuster that are not shown.

The purifier 69 is configured to trap minute amounts of impurity gases, such as water vapor, oxygen gas, carbon monoxide gas, carbon dioxide gas, and nitrogen gas, from the exhaust gas having passed through the oxygen trap 67.

The purifier 69 is, for example, a metal filter containing a metal getter. The metal getter is, for example, a zirconium-based (Zr-based) alloy.

The boosted pressure gas tank 65 is a container that contains the inert regenerated gas having passed through the portion from the fluorine trap 45 to the purifier 69. A boosted pressure sensor P3 is attached to the boosted pressure gas tank 65.

The regulator 66 is configured to set the pressure of the inert regenerated gas supplied from the boosted pressure gas tank 65 at a value, for example, greater than or equal to 5,000 hPa but smaller than or equal to 6,000 hPa and supplies the thus set inert regenerated gas to the mass flow controller MFC1.

The mass flow controller MFC1 includes a mass flowmeter and a valve that are not shown. The opening of the valve is controlled based on the flow rate measured with the mass flowmeter. The mass flow controller MFC1 thus controls the flow rate of the inert regenerated gas.

The xenon adder 75 includes a xenon-containing gas cylinder 76, a pipe 20, a regulator 77, a mass flow controller MFC2, and a mixer 79.

One end of the pipe 20 is connected to the xenon-containing gas cylinder 76. The regulator 77 and the mass flow controller MFC2 are disposed in the pipe 20. The regulator 77 and the mass flow controller MFC2 are arranged in the present order from the side facing the xenon-containing gas cylinder 76. The mixer 79 is disposed in a position where the pipe 20 merges with the pipe 24. The output of the mixer 79 is connected to the pipe 25.

The xenon-containing gas cylinder 76 is a gas cylinder containing a xenon-containing gas. The xenon-containing gas is a laser gas formed of argon gas and neon gas mixed with xenon gas. The concentration of the xenon gas contained in the xenon-containing gas is adjusted to be higher than the xenon gas concentration optimal for an ArF excimer laser.

The regulator 77 is configured to set the pressure of the xenon-containing gas supplied from the xenon-containing gas cylinder 76 at a value, for example, greater than or equal to 5,000 hPa but smaller than or equal to 6,000 hPa and supplies the thus set xenon-containing gas to the mass flow controller MFC2.

The mass flow controller MFC2 includes a mass flowmeter and a valve that are not shown. The opening of the valve is controlled based on the flow rate measured with the mass flowmeter. The mass flow controller MFC2 thus controls the flow rate of the xenon-containing gas supplied from the regulator 77.

The mixer 79 is configured to uniformly mix the inert regenerated gas supplied from the mass flow controller MFC1 with the xenon-containing gas supplied from the mass flow controller MFC2.

The inert regenerated gas tank 81 disposed as part of the pipe 25 is a container containing the inert regenerated gas supplied from the mixer 79. An inert gas pressure sensor P4 is attached to the inert regenerated gas tank 81.

The filter 83 is a mechanical filter that traps particles contained in the inert generated gas supplied from the inert regenerated gas tank 81. The particles to be trapped are primarily particles produced in the laser gas regeneration system 50.

1.2 Operation
1.2.1 Operation of Excimer Laser
1.2.1.1 Operation of Laser Oscillation System The laser controller 31 receives the target pulsed energy setting signal and the light emission trigger signal from the exposure apparatus controller 110. The laser controller 31 transmits a charge voltage setting signal to the charger 12 based on the target pulsed energy setting signal received from the exposure apparatus controller 110. The laser controller 31 further transmits a light emission trigger to the switch 13a provided in the pulsed power module (PPM) 13 based on the light emission trigger signal received from the exposure apparatus controller 110.

The switch 13a of the pulsed power module 13 is turned on upon reception of the light emission trigger from the laser controller 31. When the switch 13a is turned on, the pulsed power module 13 produces pulsed high voltage from the electrical energy charged in the charger 12. The pulsed power module 13 applies the high voltage to the discharge electrodes 11a and 11b.

When the high voltage is applied to the discharge electrodes 11a and 11b, discharge occurs in the gap between the discharge electrodes 11a and 11b. The discharge energy excites the laser gas in the laser chamber 10, and the excited laser gas transitions to a higher energy level. When the excited laser gas then transitions to a lower energy level, the laser gas emits light having a wavelength according to the difference between the energy levels.

The light produced in the laser chamber 10 exits out of the laser chamber 10 through the windows 10a and 10b. The light having exited through the window 10a of the laser chamber 10 is incident on the grating 14b with the beam width of the light enlarged by the prism 14a. The light incident via the prism 14a on the grating 14b is reflected off a plurality of grooves of the grating 14b and diffracted in the direction according to the wavelength of the light. The grating 14b is so disposed in the Littrow arrangement that the angle of incidence of the light incident via the prism 14a on the grating 14b coincides with the angle of diffraction of the diffracted light having a desired wavelength. The light having the desired wavelength and light wavelengths close thereto thus return to the laser chamber 10 via the prism 14a.

The output coupling mirror 15 transmits and outputs part of the light having exited through the window 10b of the laser chamber 10 and reflects the remainder of the light to cause the reflected light to return to the laser chamber 10.

The light having exited out of the laser chamber 10 thus travels back and forth between the line narrowing module 14 and the output coupling mirror 15 and is amplified whenever passing through the discharge space between the discharge electrodes 11a and 11b, resulting in laser oscillation. The light undergoes the line narrowing whenever deflected back by the line narrowing module 14. The thus amplified and line-narrowed light is outputted as laser light through the output coupling mirror 15.

The power monitor 17 detects the pulsed energy of the laser light outputted through the output coupling mirror 15. The power monitor 17 transmits data on the detected pulsed energy to the laser controller 31.

The laser controller 31 performs feedback control on the charge voltage set in the charger 12 based on the measured pulsed energy data received from the power monitor 17 and the target pulsed energy setting signal received from the exposure apparatus controller 110.

1.2.1.2 Operation of Laser Gas Control System

Operating an excimer laser for a long period causes generation of impurities in the laser gas in the laser chamber. The impurities generated in the laser gas absorb the pulsed laser light or causes deterioration of the discharge state in some cases.

To avoid the problems described above, the laser gas control system 40 of the excimer laser 30 exchanges part of the laser gas to reduce the impurities in the laser chamber 10 based on the following control performed by the gas controller 47.

The gas controller 47 controls the gas supplier 42 to cause it to inject a first predetermined amount of buffer gas into the laser chamber 10 and inject a second predetermined amount of fluorine-containing gas into the laser chamber 10. The gas controller 47 then controls the exhauster 43 to cause it to exhaust the laser gas the amount of which corresponds to the sum of the first predetermined amount and the second predetermined amount from the laser chamber 10.

The partial gas exchange is performed, for example, whenever the number of pulses outputted from the laser chamber reaches a fixed value. Instead, the partial gas exchange is performed whenever the period for which the laser chamber has been operated reaches a fixed value.

To inject the first predetermined amount of buffer gas into the laser chamber 10, the gas supplier 42 opens and then closes the valve B-V1. The buffer gas is either the inert new gas supplied from the buffer gas supply source B via the valve B-V2 or the inert regenerated gas having impurities reduced in the laser gas regeneration system 50 and supplied via the valve B-CV1.

To inject the second predetermined amount of fluorine-containing gas into the laser chamber 10, the gas supplier 42 opens and then closes the valve F2-V1. The fluorine-containing gas is supplied from the fluorine-containing gas supply source F2.

The exhauster 43 opens the valve EX-V1 to exhaust part of the laser gas in the laser chamber 10 to the exhauster 43. To exhaust the exhaust gas out of the laser, the exhauster 43 further opens the valve EX-V2. Instead, to supply the laser gas regeneration system 50 with the exhaust gas, the exhauster 43 opens the valve C-V1 instead of the valve EX-V2.

The partial gas exchange described above allows a predetermined amount of gas having a small amount of impurities to be supplied to the laser chamber 10 and the gas in the laser chamber 10 to be exhausted by the amount comparable to the amount of the supplied gas. The partial gas exchange can thus reduce the impurities, such as hydrogen fluoride (HF), carbon tetrafluoride ($CF_4$), silicon tetrafluoride ($SiF_4$), nitrogen trifluoride ($NF_3$), and hexafluoroethane ($C_2F_6$), in the laser chamber 10. Further, supplying the laser chamber 10 with the first predetermined amount of buffer gas and the second predetermined amount of fluorine-containing gas allows the partial pressure of the fluorine gas after the partial gas exchange to be comparable to the partial pressure of the fluorine gas before the partial gas exchange.

1.2.2 Operation of Laser Gas Regeneration System

The gas regeneration controller 51 transmits and receives signals to and from the laser controller 31. The gas regeneration controller 51 controls the components of the laser gas regeneration system 50.

The recovery pressure sensor P2 attached to the recovery tank 63 measures the pressure of the gas in the recovery tank 63. The recovery pressure sensor P2 outputs data on the measured pressure of the gas to the gas regeneration controller 51.

The pressure boosting pump 64 is controlled by the gas regeneration controller 51. In a case where the pressure of the gas in the recovery tank 63 received from the recovery pressure sensor P2 is, for example, higher than or equal to the atmospheric pressure, the gas regeneration controller 51 controls the pressure boosting pump 64 in such a way that the pressure boosting pump 64 operates.

The heater and the temperature adjuster of the oxygen trap 67, which are not shown, are controlled by the gas regeneration controller 51.

The heater and the temperature adjuster of the xenon trap 68, which are not shown, are controlled by the gas regeneration controller 51.

The boosted pressure sensor P3 attached to the boosted pressure gas tank 65 measures the pressure of the gas in the boosted pressure gas tank 65. The boosted pressure sensor P3 outputs data on the measured pressure of the gas to the gas regeneration controller 51.

The flow rate controlled by the mass flow controller MFC1 is set by the gas regeneration controller 51.

In the xenon adder 75, the flow rate controlled by the mass flow controller MFC2 is set by the gas regeneration controller 51. The flow rate controlled by the mass flow controller MFC1 and the flow rate controlled by the mass flow controller MFC2 are so set that the xenon gas in the inert regenerated gas mixed by the mixer 79 with the xenon-containing has a desired concentration.

The inert gas pressure sensor P4 attached to the inert regenerated gas tank 81 measures the pressure of the gas in the inert regenerated gas tank 81. The inert gas pressure sensor P4 outputs data on the measured pressure of the gas to the gas regeneration controller 51.

The supply of the inert regenerated gas via the gas refinement channel to the gas supplier 42 through the pipe 27 is controlled by opening and closing the valve B-CV1. The opening and closing of the valve B-CV1 is controlled by the gas regeneration controller 51. The valve B-CV1 corresponds to the second valve in the present disclosure.

The supply of the inert new gas from the buffer gas supply source B to the gas supplier 42 through the pipe 27 is controlled by opening and closing the valve B-V2. The opening and closing of the valve B-V2 is controlled by the gas regeneration controller 51. The valve B-V2 corresponds to the first valve in the present disclosure.

The gas regeneration controller 51 controls the valves B-CV1 and B-V2 by selecting whether the valve B-CV1 is closed and the valve B-V2 is opened or the valve B-V2 is closed and the valve B-CV1 is opened.

1.2.2.1 Main Procedure

Figure 2:
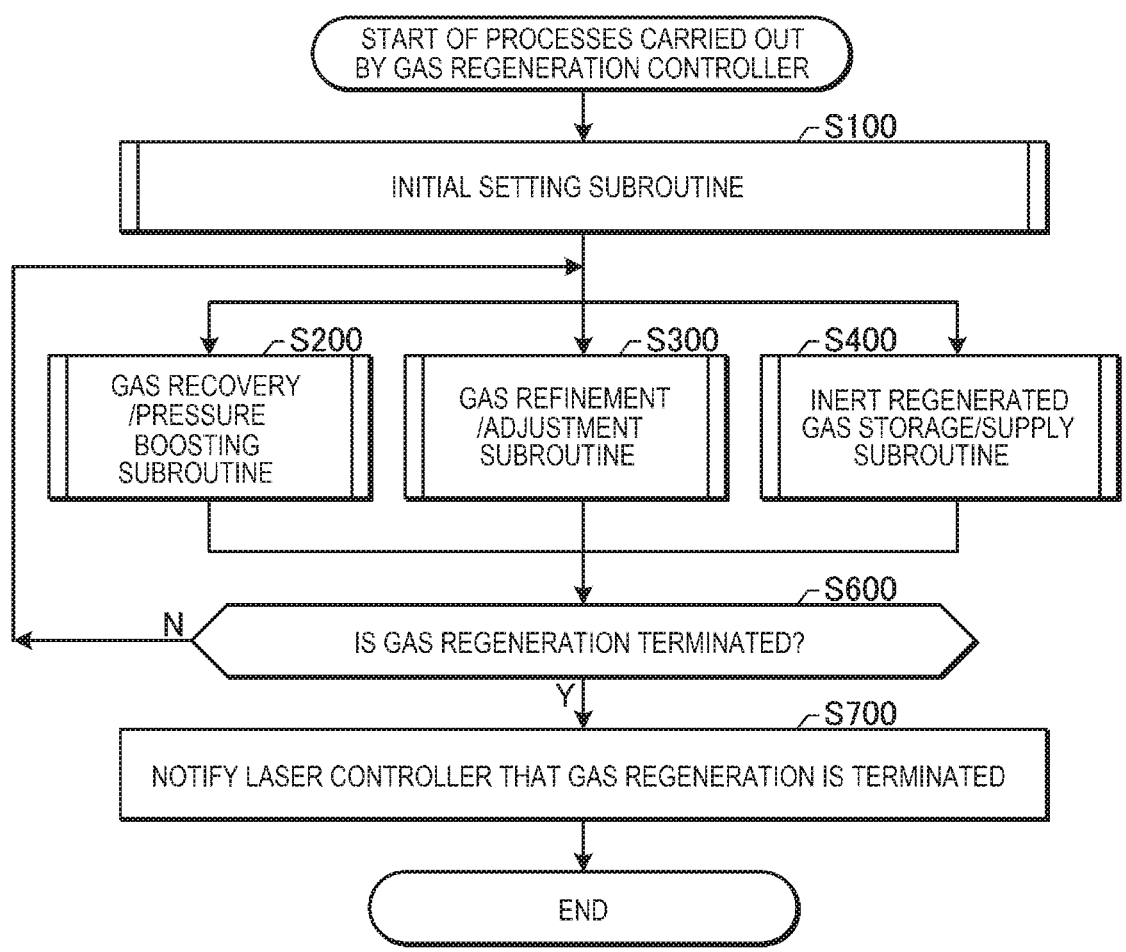
FIG. 2 is a flowchart showing the processes carried out by a gas regeneration controller 51 shown in FIG. 1.

FIG. 2 is a flowchart showing the processes carried out by the gas regeneration controller 51 shown in FIG. 1. The gas regeneration controller 51 regenerates the laser gas as follows: In the following flowchart, "Y" represents the branch destination in a case where the result of the evaluation is YES, and "N" represents the branch destination in a case where the result of the evaluation is NO.

First, in S100, the gas regeneration controller 51 carries out an initial setting subroutine to prepare the gas regeneration. The initial setting subroutine will be described later in detail with reference to FIG. 3.

After S100, the gas regeneration controller 51 concurrently carries out the processes in S200, S300, and S400. The gas regeneration controller 51 may instead sequentially carry out the processes in S200, S300, and S400. The order in which the processes in S200, S300, and S400 are carried out is not limited to a specific order.

In S200, the gas regeneration controller 51 carries out a gas recovery/pressure boosting subroutine to control the pressure boosting pump 64. The gas recovery/pressure boosting subroutine will be described later in detail with reference to FIG. 4.

In S300, the gas regeneration controller 51 carries out a gas refinement/adjustment subroutine to control the mass flow controllers MFC1 and MFC2. The gas refinement/adjustment subroutine will be described later in detail with reference to FIG. 5.

In S400, the gas regeneration controller 51 carries out an inert regenerated gas storage/supply subroutine to control the valves B-CV1 and B-V2. The inert regenerated gas storage/supply subroutine will be described later in detail with reference to FIG. 6.

After S200, S300, and S400, the gas regeneration controller 51 proceeds to the process in S600. In S600, the gas regeneration controller 51 evaluates whether or not the regeneration of the laser gas is terminated. For example, the gas regeneration controller 51 determines that the regeneration of the laser gas is terminated in a case where part of the laser gas regeneration system 50, such as the pressure boosting pump 64, is defective, or in a case where the life of any of the variety of filters has been reached.

In a case where the regeneration of the laser gas is not terminated (NO in S600), the gas regeneration controller 51 returns back to the processes in S200, S300, and S400 described above.

In a case where the regeneration of the laser gas is terminated (YES in S600), the gas regeneration controller 51 proceeds to the process in S700.

In S700, the gas regeneration controller 51 outputs a signal for notifying that the regeneration of the laser gas is terminated to the laser controller 31.

After S700, the gas regeneration controller 51 terminates the processes in the present flowchart.

1.2.2.2 Initial Setting Subroutine

Figure 3:
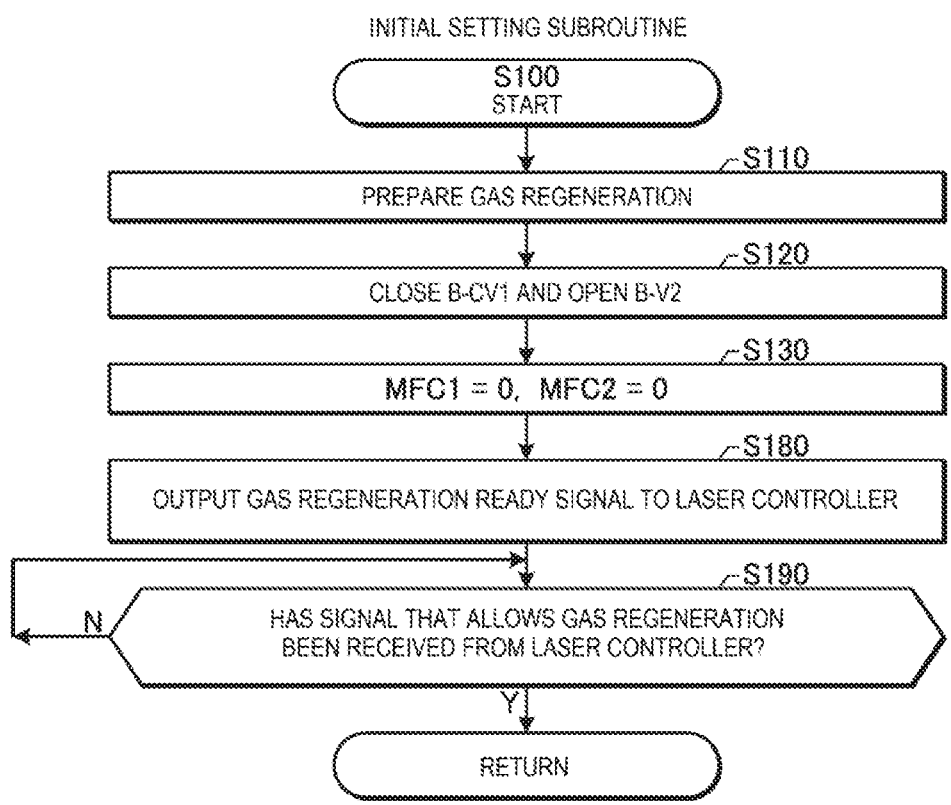
FIG. 3 is a flowchart showing in detail an initial setting subroutine in Comparative Example.

FIG. 3 is a flowchart showing in detail the initial setting subroutine in Comparative Example. The processes shown in FIG. 3 are carried out as a subroutine of S100 shown in FIG. 2 by the gas regeneration controller 51.

First, in S110, the gas regeneration controller 51 prepares the gas regeneration. In the preparation of the gas regeneration, the gas regeneration controller 51 may fill the pipes 24, 25, 26, 27, and 20 with the laser gas or may create a vacuum state in each of the pipes. The gas regeneration controller 51 may control the heater of the oxygen trap 67.

Thereafter, in S120, the gas regeneration controller 51 closes the valve B-CV1 and opens the valve B-V2. As a result, the laser gas regeneration system 50 stops supplying the laser chamber 10 with the inert regenerated gas and can supply the laser chamber 10 with the inert new gas.

Thereafter, in S130, the gas regeneration controller 51 sets the flow rate MFC1 controlled by the mass flow controller MFC1 and the flow rate MFC2 controlled by the mass flow controller MFC2 each at 0. As a result, in the laser gas regeneration system 50, no inert regenerated gas or xenon-containing gas flows into the mixer 79 of the xenon adder 75. In the following description, the mass flow controllers and the flow rates controlled by the mass flow controllers are represented by the same symbols, such as MFC1 and MFC2.

Thereafter, in S180, the gas regeneration controller 51 outputs a signal representing that the gas regeneration is ready to the laser controller 31. The laser controller 31 forwards the signal from the gas regeneration controller 51 to the gas controller 47. The gas controller 47 closes the valve EX-V2 of the exhauster 43 and opens the valve C-V1 of the exhauster 43. The laser controller 31 outputs a signal that allows the gas regeneration controller 51 to perform the gas regeneration.

Thereafter, in S190, the gas regeneration controller 51 evaluates whether or not it has received the signal that allows gas regeneration from the laser controller 31. In a case where the gas regeneration controller 51 has received no signal that allows gas regeneration, the gas regeneration controller 51 waits until it receives the signal that allows gas regeneration. In a case where the gas regeneration controller 51 has received the signal that allows gas regeneration, the gas regeneration controller 51 terminates the processes in the present flowchart and returns to the processes in FIG. 2.

1.2.2.3 Gas Recovery/Pressure Boosting Subroutine

Figure 4:
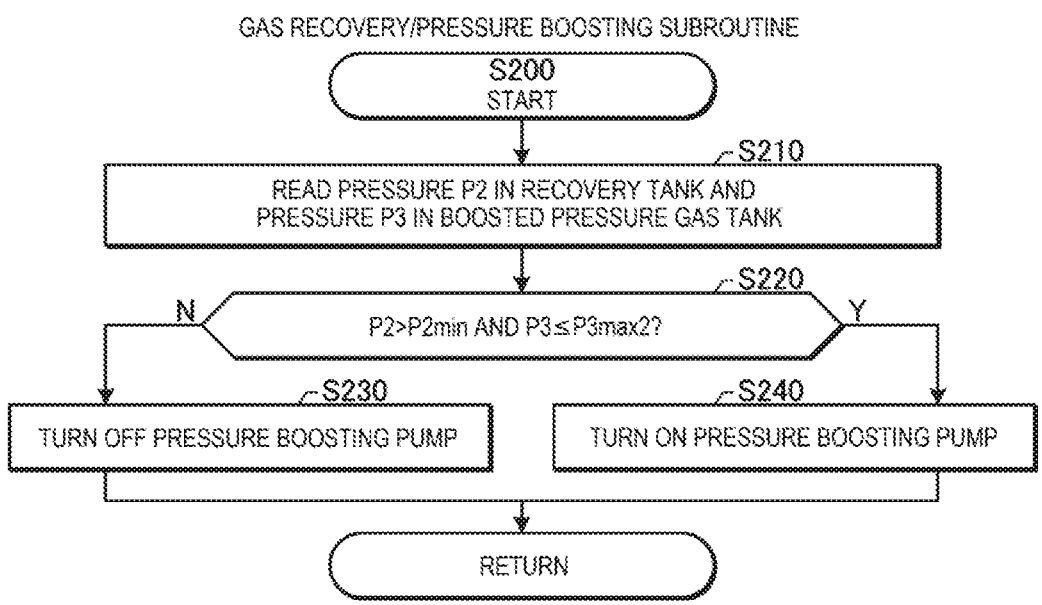
FIG. 4 is a flowchart showing in detail a gas recovery/pressure boosting subroutine in Comparative Example.

FIG. 4 is a flowchart showing in detail the gas recovery/pressure boosting subroutine in Comparative Example. The processes shown in FIG. 4 are carried out as a subroutine of S200 in FIG. 2 by the gas regeneration controller 51. The gas regeneration controller 51 carries out the following processes to control the pressure boosting pump 64 to cause it to boost the pressure of the exhaust gas contained in the recovery tank 63 and cause the boosted pressure gas tank 65 to contain the boosted pressure exhaust gas via the variety of traps.

First, in S210, the gas regeneration controller 51 reads the pressure P2 in the recovery tank 63 outputted from the recovery pressure sensor P2 and the pressure P3 in the boosted pressure gas tank 65 outputted from the boosted pressure sensor P3. In the following description, the pressure sensors and the pressure values outputted from the pressure sensors are represented by the same symbols, such as P2 and P3.

Thereafter, in S220, the gas regeneration controller 51 evaluates whether or not the pressure P2 in the recovery tank 63 is greater than a predetermined value P2min and the pressure P3 in the boosted pressure gas tank 65 is smaller than or equal to a predetermined value P3max2. The predetermined value P2min is set at a value slightly smaller than the atmospheric pressure, for example, a value greater than or equal to 900 hPa but smaller than 1,000 hPa. The predetermined value P3max2 is set, for example, at a value smaller than designed upper-limit pressure in the boosted pressure gas tank 65 but close thereto.

In a case where the pressure P2 is smaller than or equal to the predetermined value P2min or the pressure P3 is greater than the predetermined value P3max2 (NO in S220), the gas regeneration controller 51 proceeds to the process in S230.

In a case where the pressure P2 is greater than the predetermined value P2min and the pressure P3 is smaller than or equal to the predetermined value P3max2 (YES in S220), the gas regeneration controller 51 proceeds to the process in S240.

In S230, the gas regeneration controller 51 causes the pressure boosting pump 64 to stop operating. The pressure boosting pump 64 thus stops operating in a case where the pressure in the recovery tank 63 is too low or the pressure in the boosted pressure gas tank 65 is too high.

In S240, the gas regeneration controller 51 causes the pressure boosting pump 64 to start operating or keep operating in a case where the pressure boosting pump 64 has already started operating.

After S230 or S240, the gas regeneration controller 51 terminates the processes in the present flowchart and returns to the processes shown in FIG. 2.

1.2.2.4 Gas Refinement/Adjustment Subroutine

Figure 5:
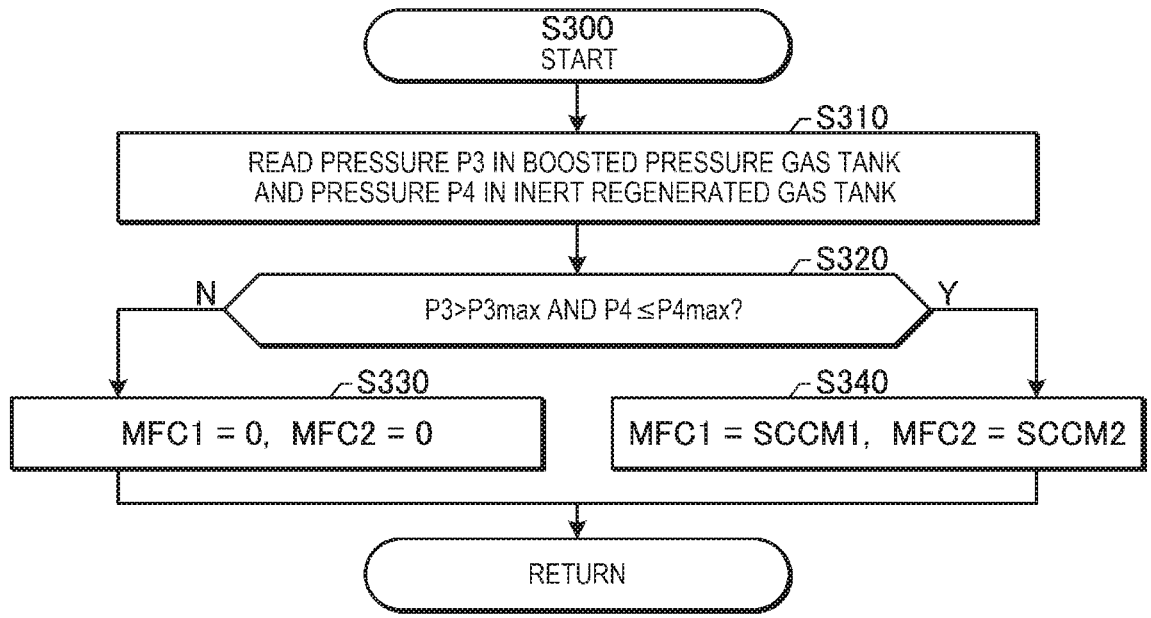
FIG. 5 is a flowchart showing in detail a gas refinement/adjustment subroutine in Comparative Example.

FIG. 5 is a flowchart showing in detail the gas refinement/adjustment subroutine in Comparative Example. The processes shown in FIG. 5 are carried out as a subroutine of S300 in FIG. 2 by the gas regeneration controller 51. The gas regeneration controller 51 carries out the following processes to control the mass flow controllers MFC1 and MFC2 to add the xenon gas to the inert regenerated gas contained in the boosted pressure gas tank 65 and cause the inert regenerated gas tank 81 to contain the xenon-gas-added inert regenerated gas.

First, in S310, the gas regeneration controller 51 reads the pressure P3 in the boosted pressure gas tank 65 outputted from the boosted pressure sensor P3 and the pressure P4 in the inert regenerated gas tank 81 outputted from the inert gas pressure sensor P4.

Thereafter, in S320, the gas regeneration controller 51 evaluates whether or not the pressure P3 in the boosted pressure gas tank 65 is greater than a predetermined value P3max and the pressure P4 in the inert regenerated gas tank 81 is smaller than or equal to a predetermined value P4max. The predetermined value P3max is set at a value smaller than the predetermined value P3max2 but greater than or comparable to the pressure at the regulator 86 for the buffer gas supply source B, for example, a value greater than or equal to 7,000 hPa but smaller than or equal to 8,000 hPa. The predetermined value P4max is set, for example, at a value smaller than designed upper-limit pressure in the inert regenerated gas tank 81 but close thereto.

In a case where the pressure P3 is smaller than or equal to the predetermined value P3max or the pressure P4 is greater than the predetermined value P4max (NO in S320), the gas regeneration controller 51 proceeds to the process in S330.

In a case where the pressure P3 is greater than the predetermined value P3max and the pressure P4 is smaller than or equal to the predetermined value P4max (YES in S320), the gas regeneration controller 51 proceeds to the process in S340.

In S330, the gas regeneration controller 51 sets the flow rate MFC1 controlled by the mass flow controller MFC1 and the flow rate MFC2 controlled by the mass flow controller MFC2 each at 0. As a result, in the laser gas regeneration system 50, no inert regenerated gas or xenon-containing gas flows into the mixer 79 of the xenon adder 75 in a case where the pressure in the boosted pressure gas tank 65 is too low or the pressure in the inert regenerated gas tank 81 is too high.

In S340, the gas regeneration controller 51 sets the flow rate MFC1 controlled by the mass flow controller MFC1 at a predetermined value SCCM1 and the flow rate MFC2 controlled by the mass flow controller MFC2 at a predetermined value SCCM2. As a result, the inert regenerated gas and the xenon-containing gas flow into the mixer 79 of the xenon adder 75, and the inert regenerated gas outputted from the mixer 79 is contained in the inert regenerated gas tank 81. The predetermined values SCCM1 and SCCM2 are each so set that the concentration of the xenon gas in the inert regenerated gas mixed by the mixer 79 with the xenon-containing gas has a desired value.

After S330 or S340, the gas regeneration controller 51 terminates the processes in the present flowchart and returns to the processes shown in FIG. 2.

1.2.2.5 Inert Regenerated Gas Storage/Supply Subroutine

Figure 6:
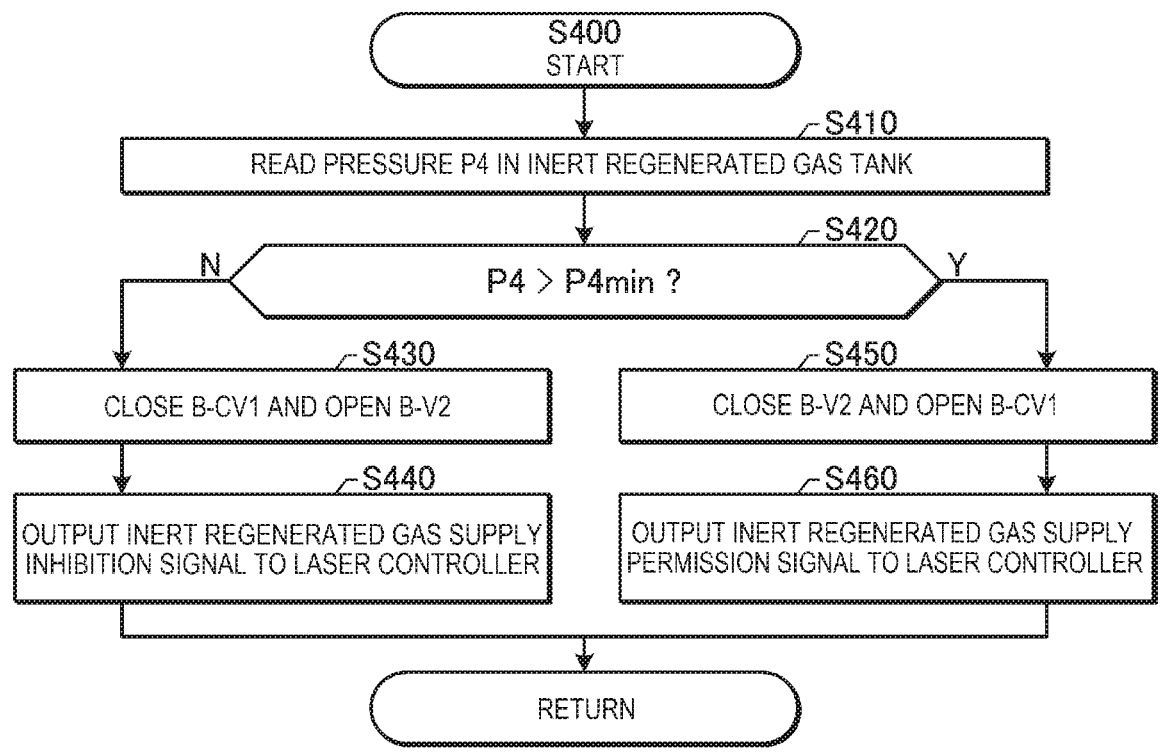
FIG. 6 is a flowchart showing in detail an inert regenerated gas storage/supply subroutine in Comparative Example.

FIG. 6 is a flowchart showing in detail the inert regenerated gas storage/supply subroutine in Comparative Example. The processes shown in FIG. 6 are carried out as a subroutine of S400 in FIG. 2 by the gas regeneration controller 51. The gas regeneration controller 51 carries out the following processes to control the valves B-CV1 and B-V2 to cause them to switch the buffer gas to be supplied to the laser chamber 10 between the inert regenerated gas and the inert new gas.

First, in S410, the gas regeneration controller 51 reads the pressure P4 in the inert regenerated gas tank 81 outputted from the inert gas pressure sensor P4.

Thereafter, in S420, the gas regeneration controller 51 evaluates whether or not the pressure P4 in the inert regenerated gas tank 81 is greater than a predetermined value P4min. The predetermined value P4min is set at a value comparable to the pressure at the regulator 86 for the buffer gas supply source B, for example, a value greater than or equal to 7,000 hPa but smaller than or equal to 8,000 hPa.

In a case where the pressure P4 is smaller than or equal to the predetermined value P4min (NO in S420), the gas regeneration controller 51 proceeds to the process in S430.

In a case where the pressure P4 is greater than to the predetermined value P4min (YES in S420), the gas regeneration controller 51 proceeds to the process in S450.

In S430, the gas regeneration controller 51 closes the valve B-CV1 and opens the valve B-V2. As a result, the laser gas regeneration system 50 stops supplying the laser chamber 10 with the inert regenerated gas and can supply the laser chamber 10 with the inert new gas.

After S430, in S440, the gas regeneration controller 51 outputs an inert regenerated gas supply inhibition signal to the laser controller 31.

In S450, the gas regeneration controller 51 closes the valve B-V2 and opens the valve B-CV1. As a result, the laser gas regeneration system 50 stops supplying the laser chamber 10 with the inert new gas and can supply the laser chamber 10 with the inert regenerated gas.

After S450, in S460, the gas regeneration controller 51 outputs an inert regenerated gas supply permission signal to the laser controller 31.

After S440 or S460, the gas regeneration controller 51 terminates the processes in the present flowchart and returns to the processes shown in FIG. 2.

1.3 Problems

In Comparative Example described above, the laser gas exhausted from the laser chamber 10 passes through the fluorine trap 45, which removes the fluorine gas from the laser gas. The laser gas regeneration system 50 refines the laser gas from which the fluorine gas has been removed and causes the refined laser gas to return as the inert regenerated gas to the laser chamber 10. Further, the laser gas control system 40 supplies the laser chamber 10 with the fluorine-containing gas separately from the inert regenerated gas to cause the partial pressure of the fluorine gas after the partial gas exchange to be comparable to the partial pressure of the fluorine gas before the partial gas exchange. As described above, since the fluorine-containing gas is supplied to the laser chamber 10 separately from the inert regenerated gas, the inert regenerated gas is not all allowed to return to the laser chamber 10, and the inert regenerated gas cannot be used with high efficiency in some cases.

In an embodiment described below, a laser gas regeneration system includes a gas refiner, a branch, a first regenerated gas supplier, and a second regenerated gas supplier. The inert regenerated gas having passed through the gas refiner is supplied to the first and second regenerated gas suppliers via the branch. The second regenerated gas supplier adds fluorine gas to the inert regenerated gas to generate a fluorine-added regenerated gas. Since the fluorine-added regenerated gas can be supplied to the laser chamber 10, the gas supplied from the fluorine-containing gas supply source F2 can be used with reduced efficiency, whereby the regenerated gas can be used with improved efficiency.

Figure 7:
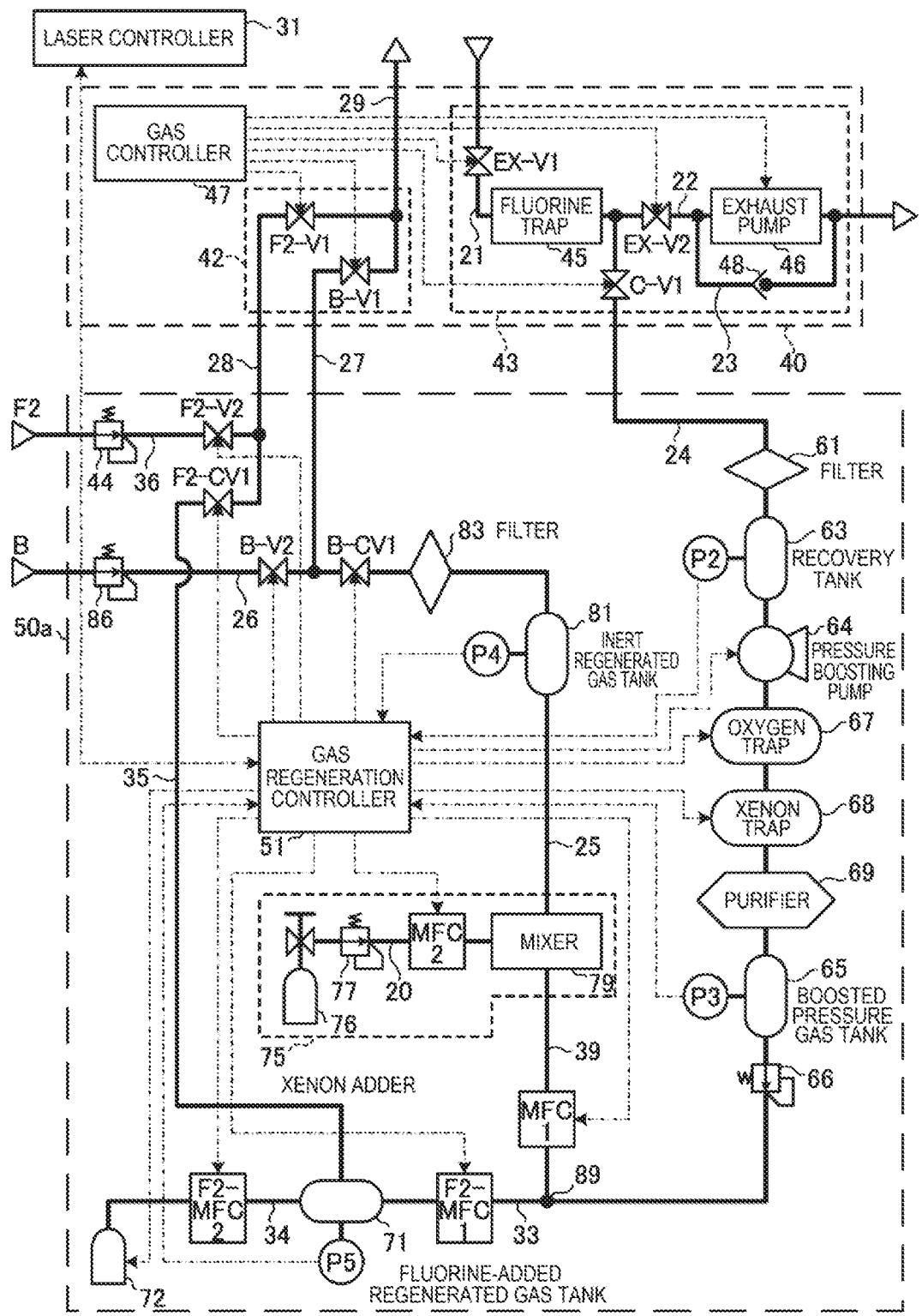
FIG. 7 schematically shows the configuration of a laser gas regeneration system 50a according to a first embodiment of the present disclosure.

2. Laser Gas Regeneration System in which Fluorine Gas is Added to Inert Regenerated Gas 2.1 Configuration FIG. 7 schematically shows the configuration of a laser gas regeneration system 50a according to a first embodiment of the present disclosure. In the first embodiment, the laser gas regeneration system 50a includes pipes 33, 34, and 35. The laser gas regeneration system 50a includes, in addition to the configuration in Comparative Example described above, a fluorine-added regenerated gas tank 71, a fluorine gas supply source 72, mass flow controllers F2-MFC1 and F2-MFC2, and valves F2-V2 and F2-CV1. The second regenerated gas supplier in the present disclosure includes at least one of the pipes 33, 34, and 35, the fluorine-added regenerated gas tank 71, the fluorine gas supply source 72, and the mass flow controllers F2-MFC1 and F2-MFC2.

The pipe 33 is connected to the pipe 24 on the downstream side of the regulator 66. The mass flow controller F2-MFC1 is disposed in the pipe 33. The pipe connected to the mixer 79 via the mass flow controller MFC1 described above is hereinafter referred to as a pipe 39. The portion where the pipe 24 divides into the pipes 33 and 39 is called a branch 89. The pipe 39 corresponds to the fourth pipe in the present disclosure, and the pipe 33 corresponds to the fifth pipe in the present disclosure.

The mass flow controller F2-MFC1 includes a mass flowmeter and a valve that are not shown and corresponds to the sixth valve in the present disclosure. The opening of the valve is controlled based on the flow rate measured with the mass flowmeter. The mass flow controller F2-MFC1 thus controls the flow rate of the inert regenerated gas.

The fluorine gas supply source 72 is an apparatus that supplies a laser gas containing fluorine the concentration of which is higher than that of the fluorine in the fluorine-containing gas from the fluorine-containing gas supply source F2. In the following description, the laser gas supplied from the fluorine gas supply source 72 is referred to as a high-concentration-fluorine gas. The fluorine gas supply source 72 is a gas cylinder containing the high-concentration-fluorine gas. The high-concentration-fluorine gas may have a fluorine concentration of, for example, about 5%.

The pipe 34 is connected to the fluorine gas supply source 72. The mass flow controller F2-MFC2 is disposed in the pipe 34.

The mass flow controller F2-MFC2 includes a mass flowmeter and a valve that are not shown. The opening of the valve is controlled based on the flow rate measured with the mass flowmeter. The mass flow controller F2-MFC2 thus controls the flow rate of the high-concentration-fluorine gas.

The fluorine-added regenerated gas tank 71 is disposed in the position where the pipes 33 and 34 merge with each other. The fluorine-added regenerated gas tank 71 is a container that mixes the inert regenerated gas supplied via the pipe 33 with the high-concentration-fluorine gas supplied via the pipe 34 and contains the mixed gas as the fluorine-added regenerated gas. A fluorine-add gas pressure sensor P5 is attached to the fluorine-added regenerated gas tank 71.

The pipe 35 is further connected to the fluorine-added regenerated gas tank 71. The pipe 35 is connected to the pipe 28 on the upstream side of the valve F2-V1 via the valve F2-CV1. The pipe 35 corresponds to the sixth pipe in the present disclosure. The supply of the fluorine-added regenerated gas from the fluorine-added regenerated gas tank 71 to the gas supplier 42 via the pipes 35 and 28 is controlled by opening and closing the valve F2-CV1. The valve F2-CV1 corresponds to the fourth valve in the present disclosure.

A pipe extending from the fluorine-containing gas supply source F2 via the regulator 44 and connected to the portion where the pipes 28 and 35 are connected to each other is hereinafter referred to as a pipe 36. The valve F2-V2 is disposed in the pipe 36 on the downstream side of the regulator 44. The fluorine-containing gas that has been supplied from the fluorine-containing gas supply source F2 but has not reached the laser chamber 10 is referred to as a fluorine-containing new gas in some cases in distinction from the fluorine-added regenerated gas supplied through the pipe 35. The supply of the fluorine-containing new gas from the fluorine-containing gas supply source F2 to the gas supplier 42 via the pipe 28 is controlled by opening and closing the valve F2-V2. The valve F2-V2 corresponds to the third valve in the present disclosure.

The other points are the same as those in Comparative Example described above.

2.2 Operation

The flow rate controlled by the mass flow controller F2-MFC1 and the flow rate controlled by the mass flow controller F2-MFC2 are each set by the gas regeneration controller 51. The flow rates are so set that the fluorine gas in the fluorine-added regenerated gas, which is the mixture generated in the fluorine-added regenerated gas tank 71 has a desired concentration. It is assumed that the concentration of the fluorine in the fluorine-added regenerated gas is comparable to the concentration of the fluorine in the fluorine-containing new gas supplied from the fluorine-containing gas supply source F2 and is, for example, 1%.

The fluorine-added gas pressure sensor P5 attached to the fluorine-added regenerated gas tank 71 measures the pressure of the gas in the fluorine-added regenerated gas tank 71. The fluorine-added gas pressure sensor P5 outputs data on the measured pressure of the gas to the gas regeneration controller 51.

2.2.1 Main Procedure

Figure 8:
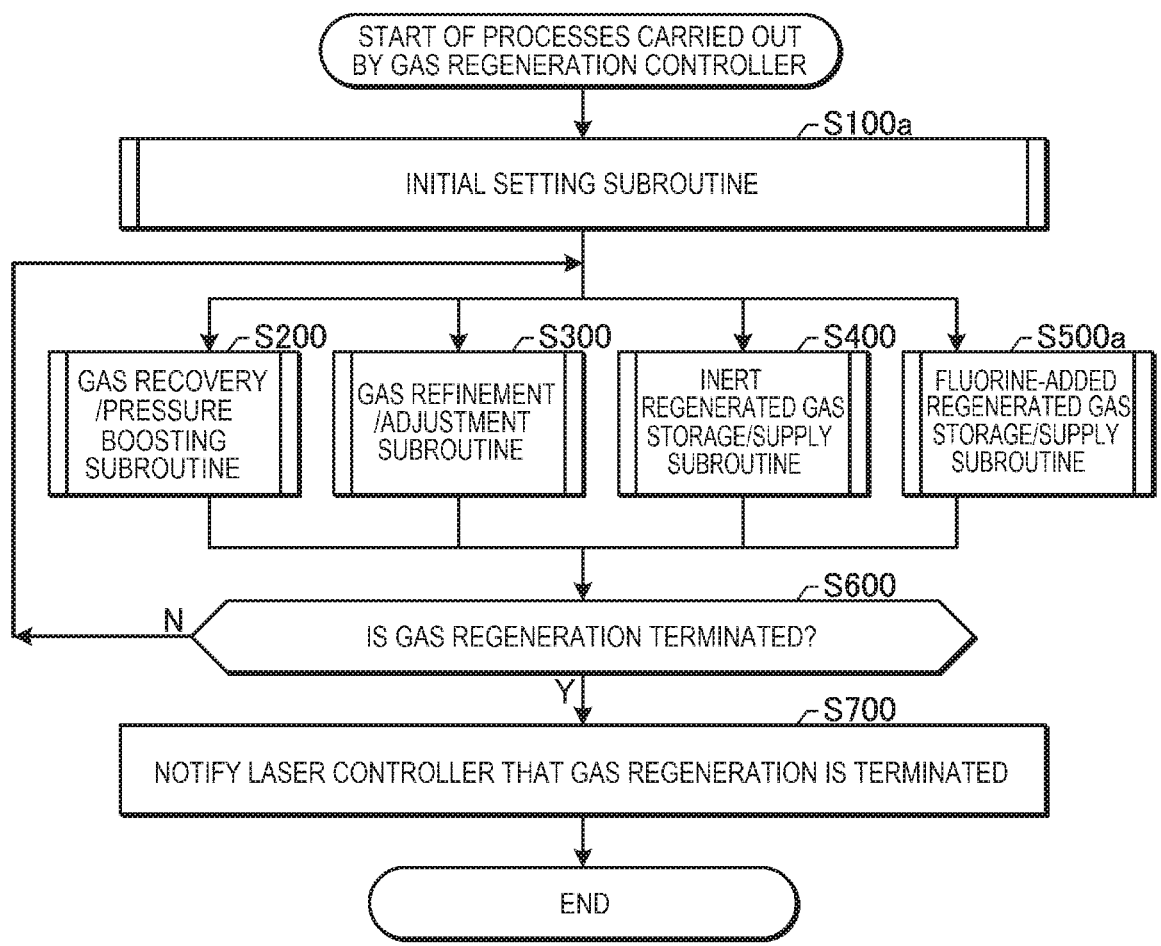
FIG. 8 is a flowchart showing the processes carried out by a gas regeneration controller 51 in the laser gas regeneration system 50a according to the first embodiment.

FIG. 8 is a flowchart showing the processes carried out by the gas regeneration controller 51 in the laser gas regeneration system according to the first embodiment. The gas regeneration controller 51 regenerates the laser gas as follows:

First, in S100a, the gas regeneration controller 51 carries out an initial setting subroutine to prepare the gas regeneration. The initial setting subroutine will be described later in detail with reference to FIG. 9.

After S100a, the gas regeneration controller 51 concurrently carries out the processes in S200, S300, S400, and S500a. The gas regeneration controller 51 may instead sequentially carry out the processes in S200, S300, S400, and S500a. The order in which the processes in S200, S300, S400, and S500a are carried out is not limited to a specific order.

The processes in S200, S300, and S400 are the same as the corresponding processes in Comparative Example described above.

In S500a, the gas regeneration controller 51 carries out a fluorine-added regenerated gas storage/supply subroutine to store the fluorine-added regenerated gas in the fluorine-added regenerated gas tank 71 and supplies the laser chamber 10 with the fluorine-added regenerated gas. The fluorine-added regenerated gas storage/supply subroutine will be described later in detail with reference to FIGS. 10 to 12.

After S200, S300, S400, and S500a, the gas regeneration controller 51 proceeds to the process in S600. The process in S600 and the process in S700, which follows S600 are the same as the corresponding processes in Comparative Example described above.

After S700, the gas regeneration controller 51 terminates the processes in the present flowchart.

2.2.2 Initial Setting Subroutine

Figure 9:
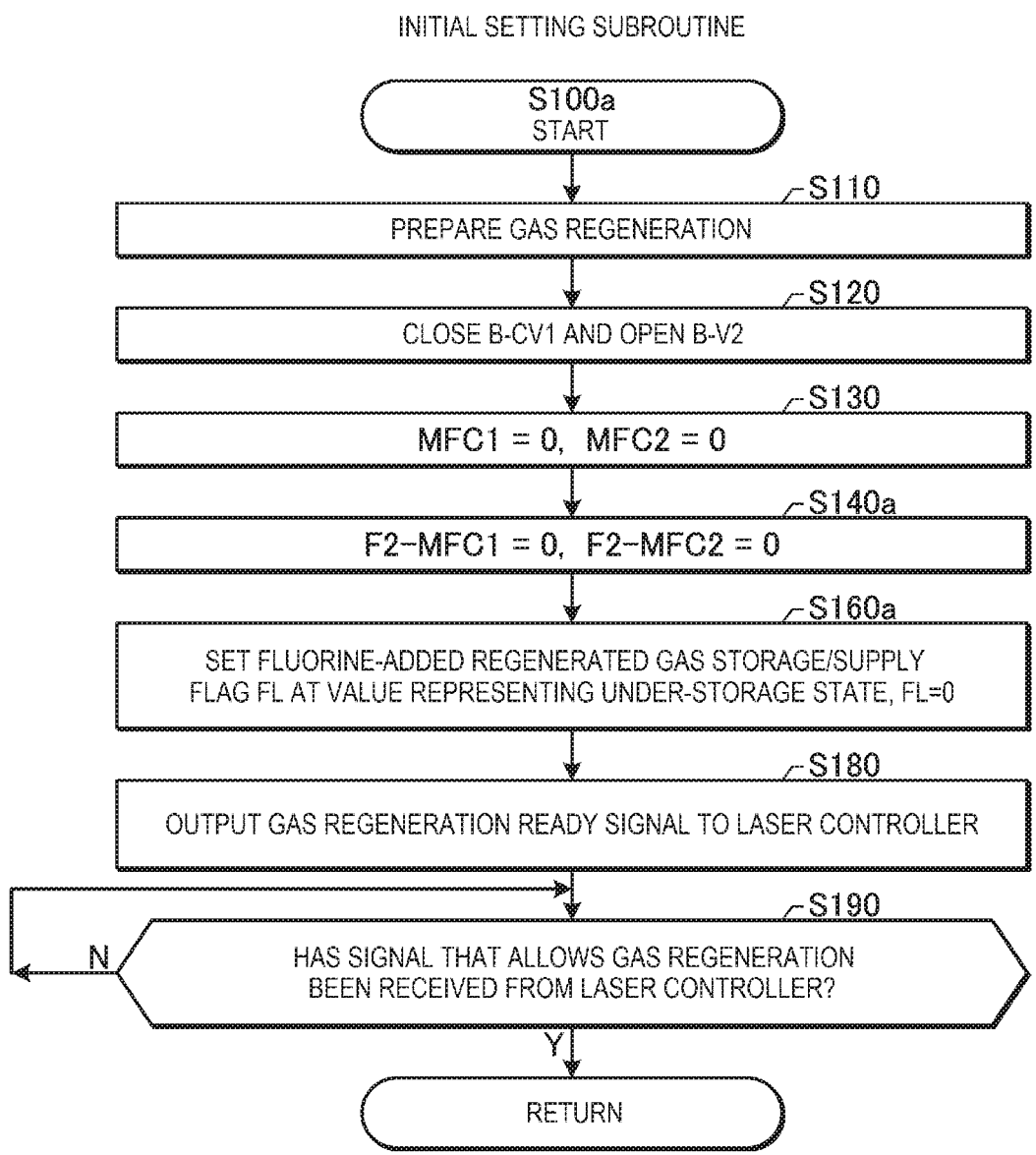
FIG. 9 is a flowchart showing in detail an initial setting subroutine in the first embodiment.

FIG. 9 is a flowchart showing in detail the initial setting subroutine in the first embodiment. The processes shown in FIG. 9 are carried out as a subroutine of S100a shown in FIG. 8 by the gas regeneration controller 51.

First, the processes in S110 to S130 are the same as the corresponding processes in Comparative Example described above.

Thereafter, in S140a, the gas regeneration controller 51 sets the flow rate F2-MFC1 controlled by the mass flow controller F2-MFC1 and the flow rate F2-MFC2 controlled by the mass flow controller F2-MFC2 each at 0. As a result, no inert regenerated gas or high-concentration-fluorine gas flows into the fluorine-added regenerated gas tank 71.

Thereafter, in S160a, the gas regeneration controller 51 sets a fluorine-added regenerated gas storage/supply flag FL at a value representing an under-storage state, for example, at 0. The fluorine-added regenerated gas storage/supply flag FL is hereinafter simply referred to as a flag FL in some cases.

The following processes in S180 and S190 are the same as the corresponding processes in Comparative Example described above.

After S190, the gas regeneration controller 51 terminates the processes in the present flowchart and returns to the processes in FIG. 8.

2.2.3 Fluorine-Added Regenerated Gas Storage/Supply Subroutine

FIG. 10 is a flowchart showing in detail the fluorine-added regenerated gas storage/supply subroutine in the first embodiment. The processes shown in FIG. 10 are carried out as a subroutine of S500a shown in FIG. 8 by the gas regeneration controller 51.

First, in S510a, the gas regeneration controller 51 evaluates the value of the fluorine-added regenerated gas storage/supply flag FL. The flag FL may, for example, have a value of 0 or 1. In a case where the flag FL has the value of 0 (YES in S510a), the gas regeneration controller 51 proceeds to the process in S520a. In a case where the flag FL has the value of 1 (NO in S510a), the gas regeneration controller 51 proceeds to the process in S530a.

In S520a, the gas regeneration controller 51 carries out a fluorine-added regenerated gas storage subroutine to store the fluorine-added regenerated gas in the fluorine-added regenerated gas tank 71. The fluorine-added regenerated gas storage subroutine will be described later in detail with reference to FIG. 11.

In S530a, the gas regeneration controller 51 carries out a fluorine-added regenerated gas supply subroutine to supply the laser chamber 10 with the fluorine-added regenerated gas from the fluorine-added regenerated gas tank 71. The fluorine-added regenerated gas supply subroutine will be described later in detail with reference to FIG. 12.

After S520a or S530a, the gas regeneration controller 51 terminates the processes in the present flowchart and returns to the processes shown in FIG. 8.

2.2.3.1 Fluorine-Added Regenerated Gas Storage Subroutine

FIG. 11 is a flowchart showing in detail the fluorine-added regenerated gas storage subroutine. The processes shown in FIG. 11 are carried out as a subroutine of S520a shown in FIG. 10 by the gas regeneration controller 51.

First, in S522a, the gas regeneration controller 51 closes the valve F2-CV1 and opens the valve F2-V2. As a result, the supply of the fluorine-added regenerated gas to the laser chamber 10 is terminated, and the fluorine-added new gas can be supplied to the laser chamber 10.

Thereafter, in S524a, the gas regeneration controller 51 reads the pressure P3 in the boosted pressure gas tank 65 outputted from the boosted pressure sensor P3 and the pressure P5 in the fluorine-added regenerated gas tank 71 outputted from the fluorine-added gas pressure sensor P5.

Thereafter, in S525a, the gas regeneration controller 51 evaluates whether or not the pressure P3 in the boosted pressure gas tank 65 is greater than the predetermined value P3max and the pressure P5 in the fluorine-added regenerated gas tank 71 is smaller than or equal to a predetermined value P5max. The predetermined value P3max is set at a value smaller than the predetermined value P3max2 but greater than or comparable to the pressure at the regulator 44 for the fluorine-containing gas supply source F2, for example, a value greater than or equal to 7,000 hPa but smaller than or equal to 8,000 hPa. The predetermined value P5max is set, for example, at a value smaller than designed upper-limit pressure in the fluorine-added regenerated gas tank 71 but close thereto.

In a case where the pressure P3 is smaller than or equal to the predetermined value P3max or the pressure P5 is greater than the predetermined value P5max (NO in S525a), the gas regeneration controller 51 proceeds to the process in S526a.

In a case where the pressure P3 is greater than the predetermined value P3max and the pressure P5 is smaller than or equal to the predetermined value P5max (YES in S525a), the gas regeneration controller 51 proceeds to the process in S527a.

In S526a, the gas regeneration controller 51 sets the flow rate F2-MFC1 controlled by the mass flow controller F2-MFC1 and the flow rate F2-MFC2 controlled by the mass flow controller F2-MFC2 each at 0. As a result, no inert regenerated gas or high-concentration-fluorine gas flows into the fluorine-added regenerated gas tank 71 in a case where the pressure in the boosted pressure gas tank 65 is too low or the pressure in the fluorine-added regenerated gas tank 71 is too high.

In S527a, the gas regeneration controller 51 sets the flow rate F2-MFC1 controlled by the mass flow controller F2-MFC1 at a predetermined value F2-SCCM1 and the flow rate F2-MFC2 controlled by the mass flow controller F2-MFC2 at a predetermined value F2-SCCM2. As a result, the inert regenerated gas and the fluorine-added regenerated gas tank 71 flow into the fluorine-added regenerated gas tank 71, and the fluorine-added regenerated gas is contained in the fluorine-added regenerated gas tank 71. The predetermined values F2-SCCM1 and F2-SCCM2 are each so set that the concentration of the fluorine in the fluorine-added regenerated gas generated in the fluorine-added regenerated gas tank 71 has a desired value.

After S526a or S527a, the gas regeneration controller 51 proceeds to the process in S528a.

In S528a, the gas regeneration controller 51 evaluates whether or not the pressure P5 in the fluorine-added regenerated gas tank 71 is greater than the predetermined value P5max. The predetermined value P5max is set, for example, at a value smaller than designed upper-limit pressure in the fluorine-added regenerated gas tank 71 but close thereto.

In a case where the pressure P5 is smaller than or equal to the predetermined value P5max (NO in S528a), the gas regeneration controller 51 terminates the processes in the present flowchart and returns to the processes in FIG. 10.

In a case where the pressure P5 is greater than the predetermined value P5max (YES in S528a), the gas regeneration controller 51 proceeds to the process in S529a.

In S529a, the gas regeneration controller 51 sets the fluorine-added regenerated gas storage/supply flag FL at a value representing an under-supply state, for example, at 1.

After S529a, the gas regeneration controller 51 terminates the processes in the present flowchart and returns to the processes in FIG. 10.

2.2.3.2 Fluorine-Added Regenerated Gas Supply Subroutine

FIG. 12 is a flowchart showing in detail the fluorine-added regenerated gas supply subroutine. The processes shown in FIG. 12 are carried out as a subroutine of S530a shown in FIG. 10 by the gas regeneration controller 51.

First, in S532a, the gas regeneration controller 51 closes the valve F2-V2 and opens the valve F2-CV1. As a result, the supply of the fluorine-added new gas to the laser chamber 10 is terminated, and the fluorine-added regenerated gas can be supplied to the laser chamber 10.

In S534a, the gas regeneration controller 51 sets the flow rate F2-MFC1 controlled by the mass flow controller F2-MFC1 and the flow rate F2-MFC2 controlled by the mass flow controller F2-MFC2 each at 0. As a result, no inert regenerated gas or high-concentration-fluorine gas flows into the fluorine-added regenerated gas tank 71.

Thereafter, in S535a, the gas regeneration controller 51 reads the pressure P5 in the fluorine-added regenerated gas tank 71 outputted from the fluorine-added gas pressure sensor P5.

Thereafter, in S538a, the gas regeneration controller 51 evaluates whether or not the pressure P5 in the fluorine-added regenerated gas tank 71 is smaller than a predetermined value P5min. The predetermined value P5min is set at a value greater than or comparable to the pressure at the regulator 44 for the fluorine-containing gas supply source F2, for example, a value greater than or equal to 7,000 hPa but smaller than or equal to 8,000 hPa.

In a case where the pressure P5 is greater than or equal to the predetermined value P5min (NO in S538a), the gas regeneration controller 51 terminates the processes in the present flowchart and returns to the processes in FIG. 10.

In a case where the pressure P5 is smaller than the predetermined value P5min (YES in S538a), the gas regeneration controller 51 proceeds to the process in S539a.

In S539a, the gas regeneration controller 51 sets the fluorine-added regenerated gas storage/supply flag FL at a value representing the under-storage state, for example, at 0.

After S539a, the gas regeneration controller 51 terminates the processes in the present flowchart and returns to the processes in FIG. 10.

2.3 Effects

According to the first embodiment, one of the portions into which the fluorine-added regenerated gas divides at the branch 89 is allowed to return as the buffer gas to the laser chamber 10, and fluorine gas can be added to the other one of the portions into which the fluorine-added regenerated gas divides at the branch 89 and the resultant gas is allowed to return to the laser chamber 10. Therefore, the fluorine-added new gas can be used with reduced efficiency, whereby the regenerated gas can be used with improved efficiency.

Further, according to the first embodiment, one of the fluorine-added regenerated gas storage subroutine S520a and the fluorine-added regenerated gas supply subroutine S530a is selectively carried out. That is, the storage of the fluorine-added regenerated gas in the fluorine-added regenerated gas tank 71 and the supply of the fluorine-added regenerated gas from the fluorine-added regenerated gas tank 71 to the laser chamber 10 are not simultaneously carried out. Unstable operation of the fluorine-added regenerated gas tank 71 can be suppressed.

According to the first embodiment, the valves F2-CV1 and F2-V2 allow whether the fluorine-added regenerated gas or the fluorine-containing gas is supplied to the laser chamber 10 to be switched from one to the other. The valves F2-CV1 and F2-V2 are controlled by the gas regeneration controller 51 based on the pressure of the gas in the fluorine-added regenerated gas tank 71. Since the gas controller 47 does not need to evaluate whether the fluorine-added regenerated gas or the fluorine-containing gas is supplied to the laser chamber 10, the control can be simplified.

Figure 13:
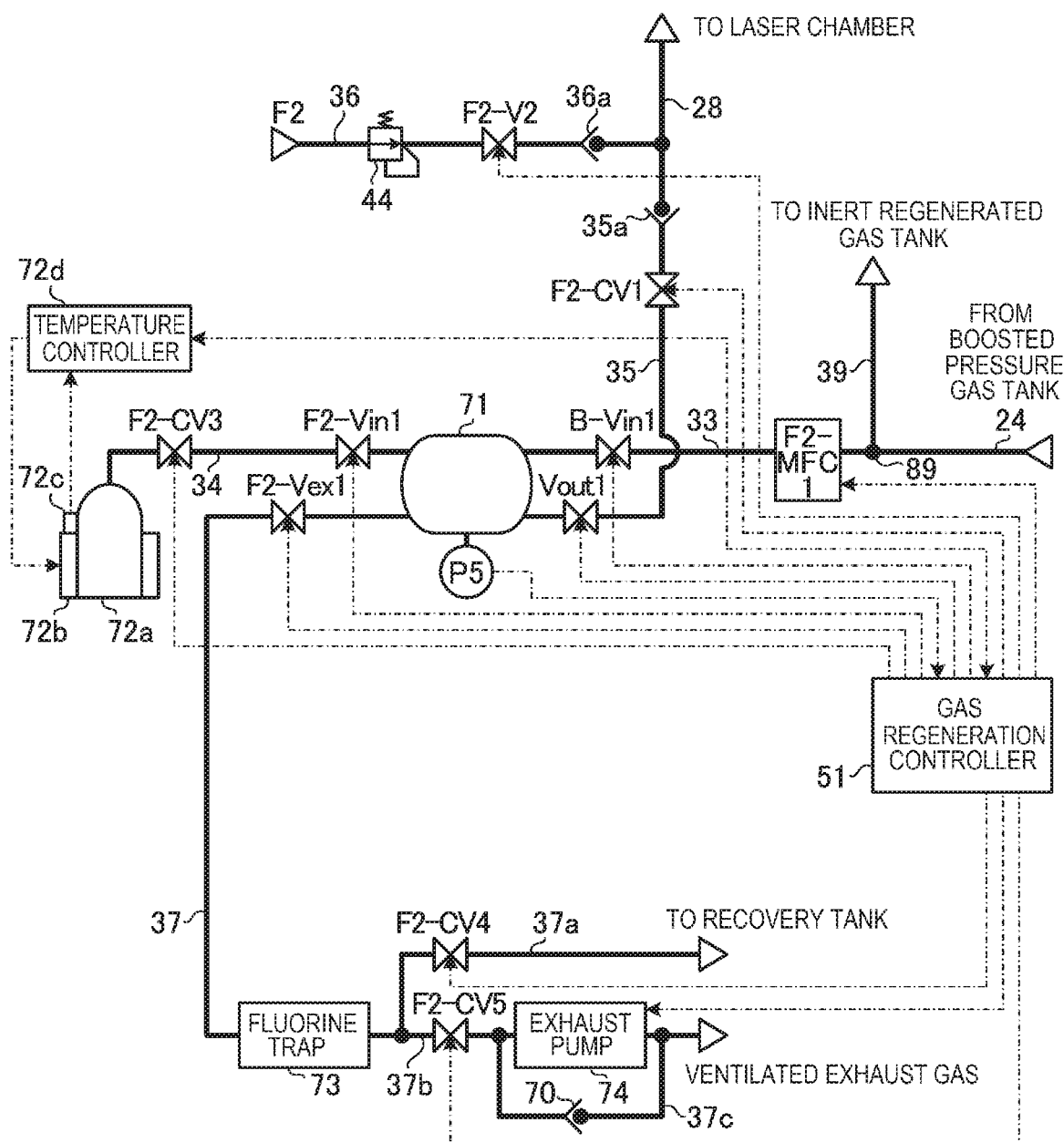
FIG. 13 schematically shows the configuration of a variety of pipes connected to a fluorine-added regenerated gas tank 71 and a fluorine gas supply source 72a in a second embodiment of the present disclosure.

3. Laser Gas Regeneration System Including Halogen Gas Supply Source Containing Solid Halogen 3.1 Configuration FIG. 13 schematically shows the configuration of a variety of pipes connected to the fluorine-added regenerated gas tank 71 and a fluorine gas supply source 72a in a second embodiment of the present disclosure.

In the second embodiment, the fluorine gas supply source 72a includes a container containing a solid fluorine, such as a metal fluoride. The fluorine gas supply source 72a further includes a heater 72b and a temperature sensor 72c.

The temperature sensor 72c measures the temperature in or of the container of the fluorine gas supply source 72a and outputs the measured data to a temperature controller 72d. The temperature controller 72d controls the heater 72b based on the temperature data outputted from the temperature sensor 72c under the control of the gas regeneration controller 51.

The solid fluorine contained in the fluorine gas supply source 72a, when heated by the heater 72b, generates fluorine gas at a vapor pressure according to the temperature. The generated fluorine gas is injected as a high-pressure fluorine gas into the fluorine-added regenerated gas tank 71 via the pipe 34.

The fluorine-add gas pressure sensor P5 is attached to the fluorine-added regenerated gas tank 71.

A valve B-Vin1 is disposed in the pipe 33 between the mass flow controller F2-MFC1 and the fluorine-added regenerated gas tank 71.

Valves F2-CV3 and F2-Vin1 are disposed in the presented order from the side facing the fluorine gas supply source 72a in the pipe 34 between the fluorine gas supply source 72a and the fluorine-added regenerated gas tank 71.

A valve Vout1 is disposed in the pipe 35 between the fluorine-added regenerated gas tank 71 and the valve F2-CV1. A check valve 35a is disposed in the pipe 35 on the downstream side of the valve F2-CV1. A check valve 36a is disposed in the pipe 36 on the downstream side of the valve F2-V2.

The fluorine-added regenerated gas tank 71 is connected not only to the pipes 33, 34, and 35 but to a pipe 37. The pipe 37 is a pipe through which the fluorine-added regenerated gas in the fluorine-added regenerated gas tank 71 is exhausted.

The pipe 37 divides into pipes 37a and 37b. The pipes 37 and 37a or the pipes 37 and 37b correspond to the seventh pipe in the present disclosure.

A valve F2-Vex1 and a fluorine trap 73 are disposed in the presented order in the pipe 37 from the side facing the fluorine-added regenerated gas tank 71. The pipe 37a is connected to the recovery tank 63 shown in FIG. 7 via a valve F2-CV4. A valve F2-CV5 and an exhaust pump 74 are disposed in the presented order in the pipe 37b from the side facing the fluorine trap 73.

A bypass pipe 37c is connected to and between the pipe 37b on the inlet side of the exhaust pump 74 and the pipe 37b on the outlet side of the exhaust pump 74. A check valve 70 is disposed in the bypass pipe 37c.

The other points are the same as those in the first embodiment described above.

3.2 Operation

The variety of valves and the exhaust pump 74 shown in FIG. 13 are controlled by the gas regeneration controller 51. The main procedure of the control performed by the gas regeneration controller 51 is the same as the procedure in the first embodiment described with reference to FIG. 8. Out of the subroutines shown in FIG. 8, different points between the first and second embodiments will be described with reference to FIGS. 14 to 22.

3.2.1 Initial Setting Subroutine

Figure 14:
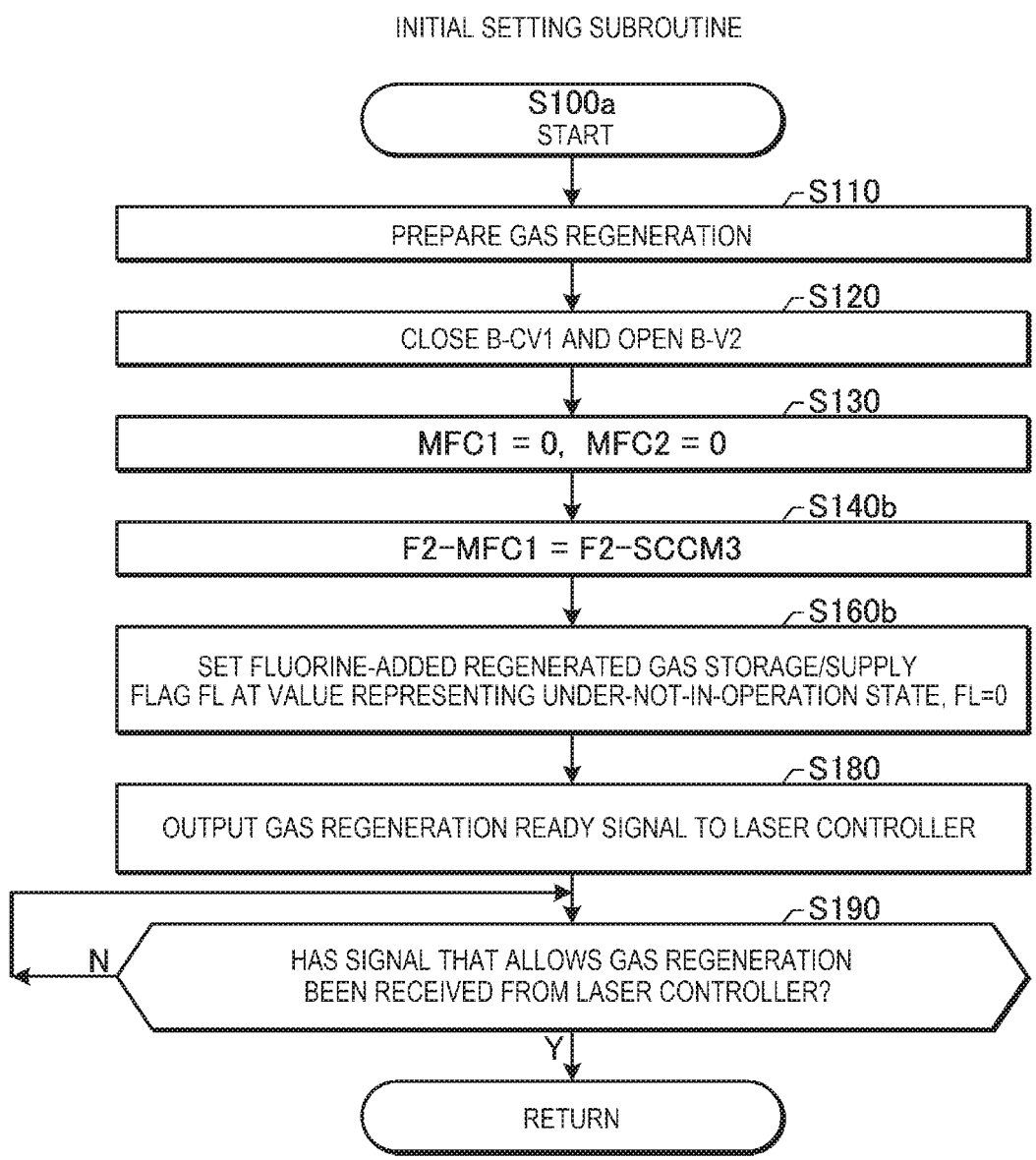
FIG. 14 is a flowchart showing in detail an initial setting subroutine in the second embodiment.

FIG. 14 is a flowchart showing in detail the initial setting subroutine in the second embodiment. The processes shown in FIG. 14 are carried out as a subroutine of S100a shown in FIG. 8 by the gas regeneration controller 51.

First, the processes in S110 to S130 are the same as the corresponding processes in Comparative Example described above.

Thereafter, in S140b, the gas regeneration controller 51 sets the flow rate F2-MFC1 controlled by the mass flow controller F2-MFC1 at a predetermined value F2-SCCM3. As a result, when the valve B-Vin1 is opened, the inert regenerated gas is allowed to flow into the fluorine-added regenerated gas tank 71.

Thereafter, in S160b, the gas regeneration controller 51 sets the fluorine-added regenerated gas storage/supply flag FL at a value representing an under-not-in-operation state, for example, at 0.

The following processes in S180 to S190 are the same as the corresponding processes in Comparative Example described above.

After S190, the gas regeneration controller 51 terminates the processes in the present flowchart and returns to the processes in FIG. 8.

3.2.2 Fluorine-Added Regenerated Gas Storage/Supply Subroutine

Figure 15:
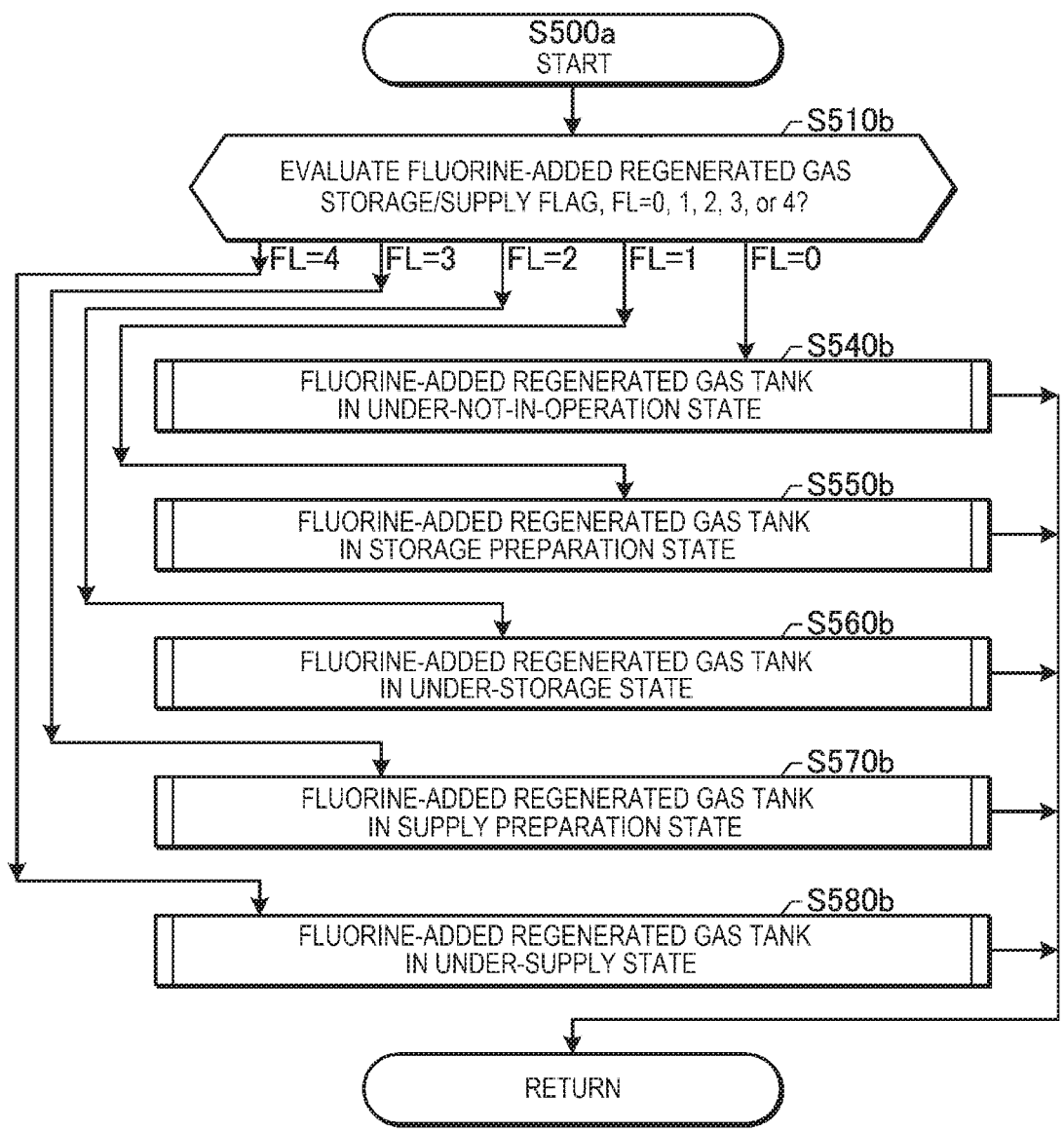
FIG. 15 is a flowchart showing in detail a fluorine-added regenerated gas storage/supply subroutine in the second embodiment.

FIG. 15 is a flowchart showing in detail the fluorine-added regenerated gas storage/supply subroutine in the second embodiment. The processes shown in FIG. 15 are carried out as a subroutine of S500a shown in FIG. 8 by the gas regeneration controller 51.

First, in S510b, the gas regeneration controller 51 evaluates the value of the fluorine-added regenerated gas storage/supply flag FL. The flag FL may, for example, have a value of 0, 1, 2, 3, or 4. The gas regeneration controller 51 proceeds to a process in a branch destination according to the value of the flag FL.

In the case where the flag FL has the value of 0, the gas regeneration controller 51 carries out the process of causing the fluorine-added regenerated gas tank to be not in operation in S540b. The process of causing the fluorine-added regenerated gas tank to be not in operation will be described later in detail with reference to FIG. 16.

In the case where the flag FL has the value of 1, the gas regeneration controller 51 carries out the process of preparing storage in the fluorine-added regenerated gas tank in S550b. The process of preparing storage in the fluorine-added regenerated gas tank will be described later in detail with reference to FIGS. 17 to 19.

In the case where the flag FL has the value of 2, the gas regeneration controller 51 carries out the process of causing the fluorine-added regenerated gas tank to be under storage in S560b. The process of causing the fluorine-added regenerated gas tank to be under storage will be described later in detail with reference to FIG. 20.

In the case where the flag FL has the value of 3, the gas regeneration controller 51 carries out the process of preparing supply from the fluorine-added regenerated gas tank in S570b. The process of preparing supply from the fluorine-added regenerated gas tank will be described later in detail with reference to FIG. 21.

In the case where the flag FL has the value of 4, the gas regeneration controller 51 carries out the process of causing the fluorine-added regenerated gas tank to be under supply in S580b. The process of causing the fluorine-added regenerated gas tank to be under supply will be described later in detail with reference to FIG. 22.

After S540b, S550b, S560b, S570b, or S580b, the gas regeneration controller 51 terminates the processes in the present flowchart and returns to the processes shown in FIG. 8.

3.2.2.1 Subroutine of Causing Fluorine-Added Regenerated Gas Tank to be not in Operation FIG. 16 is a flowchart showing in detail the process of causing the fluorine-added regenerated gas tank to be not in operation in the second embodiment. The processes shown in FIG. 16 are carried out as a subroutine of S540b shown in FIG. 15 by the gas regeneration controller 51.

First, in S541b, the gas regeneration controller 51 closes the valves B-Vin1, F2-Vin1, Vout1, and F2-Vex1. Closing the valves terminates the storage of the gas in the fluorine-added regenerated gas tank 71 and the supply of the gas from the fluorine-added regenerated gas tank 71 to the laser chamber 10.

Thereafter, in S542b, the gas regeneration controller 51 closes the valves F2-CV3, F2-CV4, and F2-CV5. Closing the valve F2-CV3 prevents the fluorine gas from flowing out of the fluorine gas supply source 72a. Closing the valve F2-CV4 prevents the laser gas from being supplied to the recovery tank 63 through the pipe 37. Closing the valve F2-CV5 prevents the laser gas from being exhausted through the pipe 37 to an external apparatus.

Thereafter, in S544b, the gas regeneration controller 51 sets a fluorine-added regenerated gas storage/supply flag FL at a value representing a storage preparation state, for example, at 1.

After S544b, the gas regeneration controller 51 terminates the processes in the present flowchart and returns to the processes in FIG. 15.

3.2.2.2 Subroutine of Preparing Storage in Fluorine-Added Regenerated Gas Tank

FIG. 17 is a flowchart showing in detail the process of preparing storage in the fluorine-added regenerated gas tank in the second embodiment. The processes shown in FIG. 17 are carried out as a subroutine of S550b shown in FIG. 15 by the gas regeneration controller 51.

First, in S553b, the gas regeneration controller 51 exhausts the interior of the fluorine-added regenerated gas tank 71 and the interior of the fluorine gas supply source 72a. The above process will be described later in detail with reference to FIG. 18.

Thereafter, in S555b, the gas regeneration controller 51 injects fluorine gas into the fluorine-added regenerated gas tank 71. The above process will be described later in detail with reference to FIG. 19.

Thereafter, in S557b, the gas regeneration controller 51 sets a fluorine-added regenerated gas storage/supply flag FL at a value representing an under-storage state, for example, at 2.

After S557b, the gas regeneration controller 51 terminates the processes in the present flowchart and returns to the processes in FIG. 15.

Figure 18:
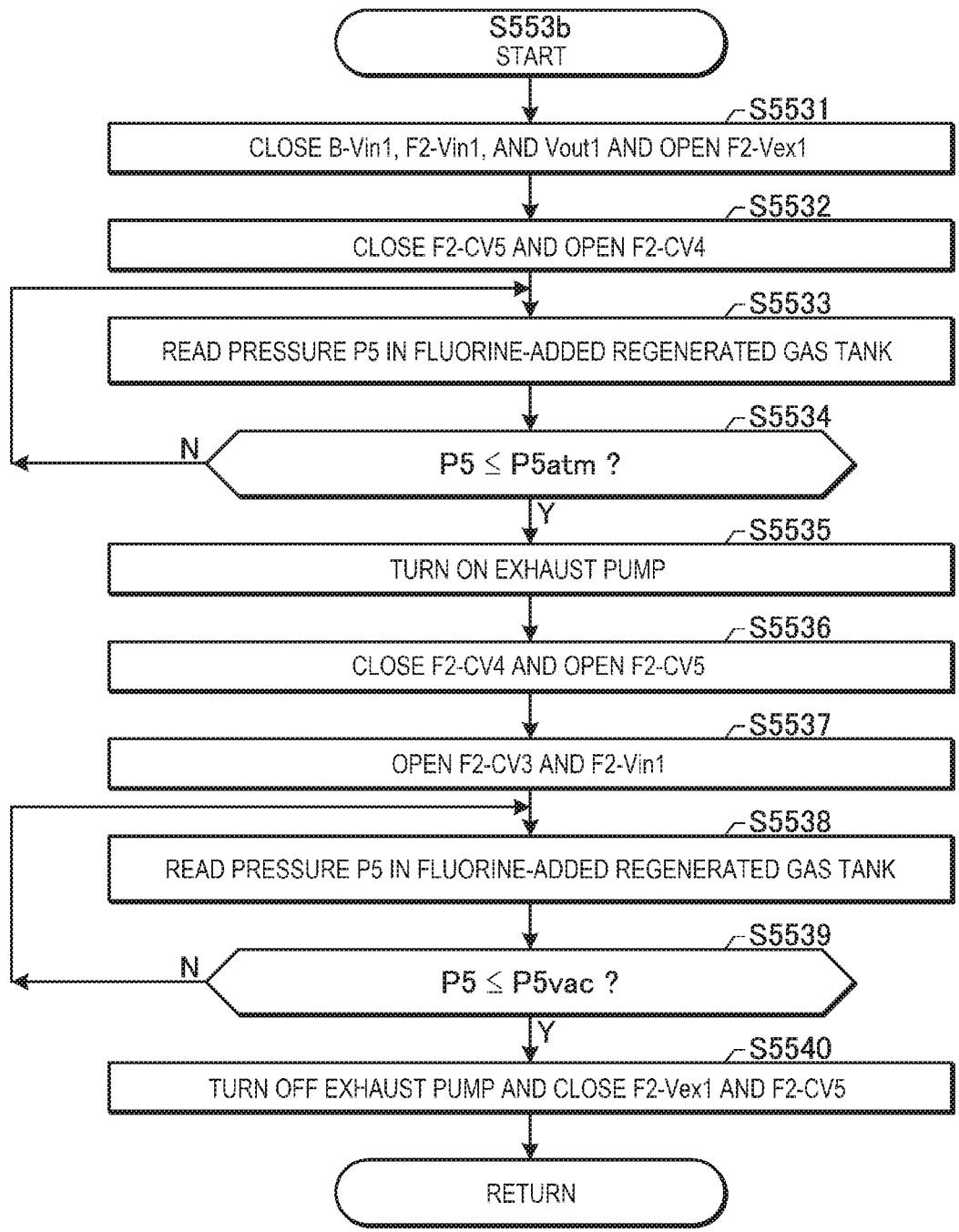
FIG. 18 is a flowchart showing in detail the process of exhausting the fluorine-added regenerated gas tank 71 and the fluorine gas supply source 72a in the second embodiment.

FIG. 18 is a flowchart showing in detail the process of exhausting the fluorine-added regenerated gas tank 71 and the fluorine gas supply source 72a in the second embodiment. The processes shown in FIG. 18 are carried out as a subroutine of S553b shown in FIG. 17 by the gas regeneration controller 51.

First, in S5531, the gas regeneration controller 51 closes the valves B-Vin1, F2-Vin1, and Vout1 and opens the valve F2-Vex1.

Thereafter, in S5532, the gas regeneration controller 51 closes the valve F2-CV5 and opens the valve F2-CV4. As a result, part of the fluorine-added regenerated gas stored in the fluorine-added regenerated gas tank 71 flows into the recovery tank 63. When the pressure of the gas in the recovery tank 63 reaches a value, for example, greater than or equal to the atmospheric pressure, the pressure boosting pump 64 operates and lowers the pressure of the gas in the recovery tank 63. In this case, another part of the fluorine-added regenerated gas stored in the fluorine-added regenerated gas tank 71 flows into the recovery tank 63.

Thereafter, in S5533, the gas regeneration controller 51 reads the pressure P5 in the fluorine-added regenerated gas tank 71 outputted from the fluorine-added gas pressure sensor P5.

Thereafter, in S5534, the gas regeneration controller 51 evaluates whether or not the pressure P5 in the fluorine-added regenerated gas tank 71 is smaller than or equal to a predetermined value P5atm. The predetermined value P5atm is set, for example, at a value slightly greater than the atmospheric pressure.

In a case where the pressure P5 is greater than the predetermined value P5atm (NO in S5534), the gas regeneration controller 51 returns to the process in S5533 described above and repeats the processes in S5533 and S5534 until the pressure P5 becomes smaller than equal to the predetermined value P5atm.

In a case where the pressure P5 is smaller than or equal to the predetermined value P5atm (YES in S5534), the gas regeneration controller 51 proceeds to the process in S5535.

In S5535, the gas regeneration controller 51 starts driving the exhaust pump 74.

Thereafter, in S5536, the gas regeneration controller 51 closes the valve F2-CV4 and opens the valve F2-CV5.

Thereafter, in S5537, the gas regeneration controller 51 opens the valves F2-CV3 and F2-Vin1.

As a result, the interiors of the fluorine-added regenerated gas tank 71 and the fluorine gas supply source 72a are exhausted by the exhaust pump 74.

Thereafter, in S5538, the gas regeneration controller 51 reads the pressure P5 in the fluorine-added regenerated gas tank 71 outputted from the fluorine-added gas pressure sensor P5.

Thereafter, in S5539, the gas regeneration controller 51 evaluates whether or not the pressure P5 in the fluorine-added regenerated gas tank 71 is smaller than or equal to a predetermined value P5vac. The predetermined value P5vac is set, for example, at nearly vacuum pressure.

In a case where the pressure P5 is greater than the predetermined value P5vac (NO in S5539), the gas regeneration controller 51 returns to the process in S5538 and repeats the processes in S5538 and S5539 until the pressure P5 becomes smaller than equal to the predetermined value P5vac.

In a case where the pressure P5 is smaller than or equal to the predetermined value P5vac (YES in S5539), the gas regeneration controller 51 proceeds to the process in S5540.

In S5540, the gas regeneration controller 51 causes the exhaust pump 74 to stop operating and closes the valves F2-Vex1 and F2-CV5. The operation of exhausting the gas from the fluorine-added regenerated gas tank 71 is thus terminated.

After S5540, the gas regeneration controller 51 terminates the processes in the present flowchart and returns to the processes in FIG. 17.

Figure 19:
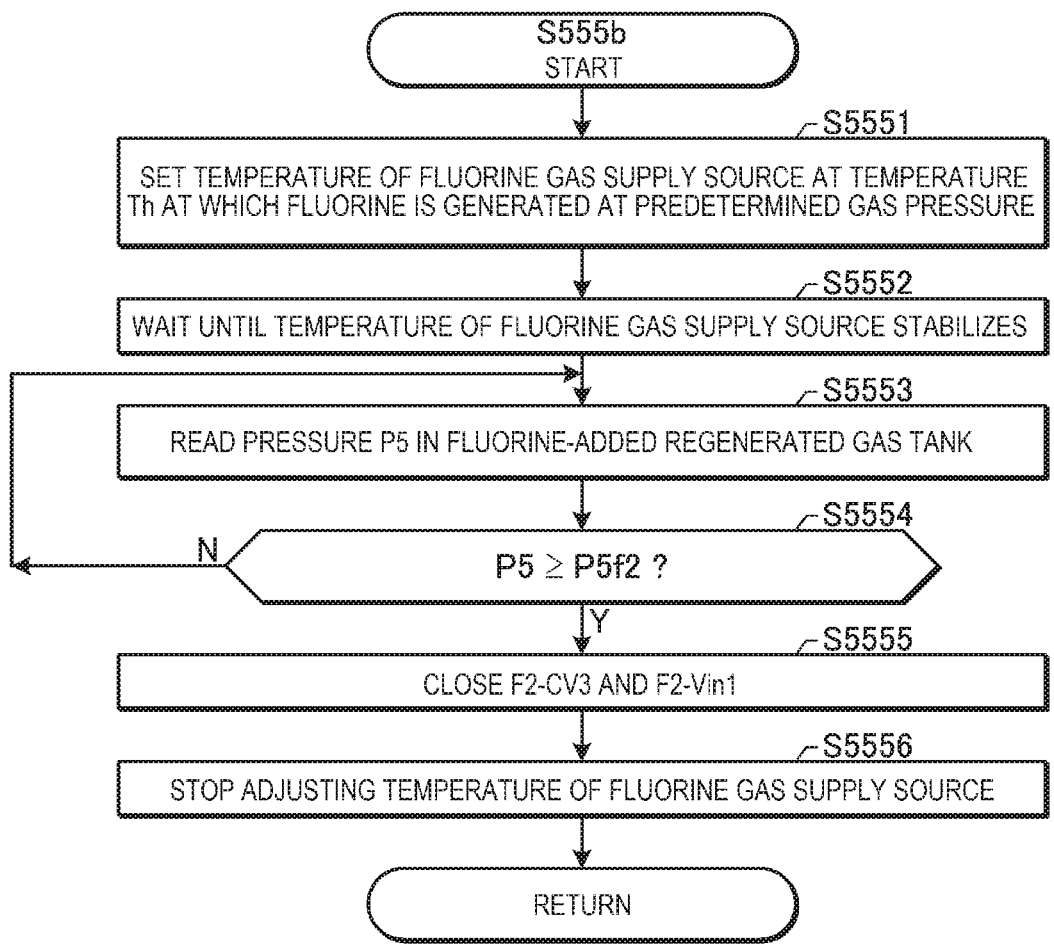
FIG. 19 is a flowchart showing in detail the process of injecting fluorine gas into the fluorine-added regenerated gas tank 71 in the second embodiment.

FIG. 19 is a flowchart showing in detail the process of injecting fluorine gas into the fluorine-added regenerated gas tank 71 in the second embodiment. The processes shown in FIG. 19 are carried out as a subroutine of S555b shown in FIG. 17 by the gas regeneration controller 51.

First, in S5551, the gas regeneration controller 51 sets the temperature of the fluorine gas supply source 72a at a predetermined temperature Th and controls the heater 72b. The predetermined temperature Th is the temperature at which fluorine gas is generated at predetermined gas pressure from the fluorine gas supply source 72a.

Thereafter, in S5552, the gas regeneration controller 51 waits until the temperature of the fluorine gas supply source 72a stabilizes. Once the temperature of the fluorine gas supply source 72a stabilizes, the gas regeneration controller 51 proceeds to the process in S5553.

In S5553, the gas regeneration controller 51 reads the pressure P5 in the fluorine-added regenerated gas tank 71 outputted from the fluorine-added gas pressure sensor P5.

Thereafter, in S5554, the gas regeneration controller 51 evaluates whether or not the pressure P5 in the fluorine-added regenerated gas tank 71 is greater than or equal to a predetermined value P5f2. The predetermined value P5f2 is set, for example, at a value corresponding to the fluorine gas partial pressure necessary for generation of fluorine-added regenerated gas having a desired concentration.

In a case where the pressure P5 is smaller than the predetermined value P5f2 (NO in S5554), the gas regeneration controller 51 returns to the process in S5553 and repeats the processes in S5553 and S5554 until the pressure P5 becomes greater than or equal to the predetermined value P5f2.

In a case where the pressure P5 is greater than or equal to the predetermined value P5f2 (YES in S5554), the gas regeneration controller 51 proceeds to the process in S5555.

In S5555, the gas regeneration controller 51 closes the valves F2-CV3 and F2-Vin1. As a result, the injection of the fluorine gas from the fluorine gas supply source 72a into the fluorine-added regenerated gas tank 71 is terminated.

Thereafter, in S5556, the gas regeneration controller 51 stops adjusting the temperature of the fluorine gas supply source 72a. As a result, the generation of the fluorine gas in the fluorine gas supply source 72a is terminated.

After S5556, the gas regeneration controller 51 terminates the processes in the present flowchart and returns to the processes in FIG. 17.

Figure 20:
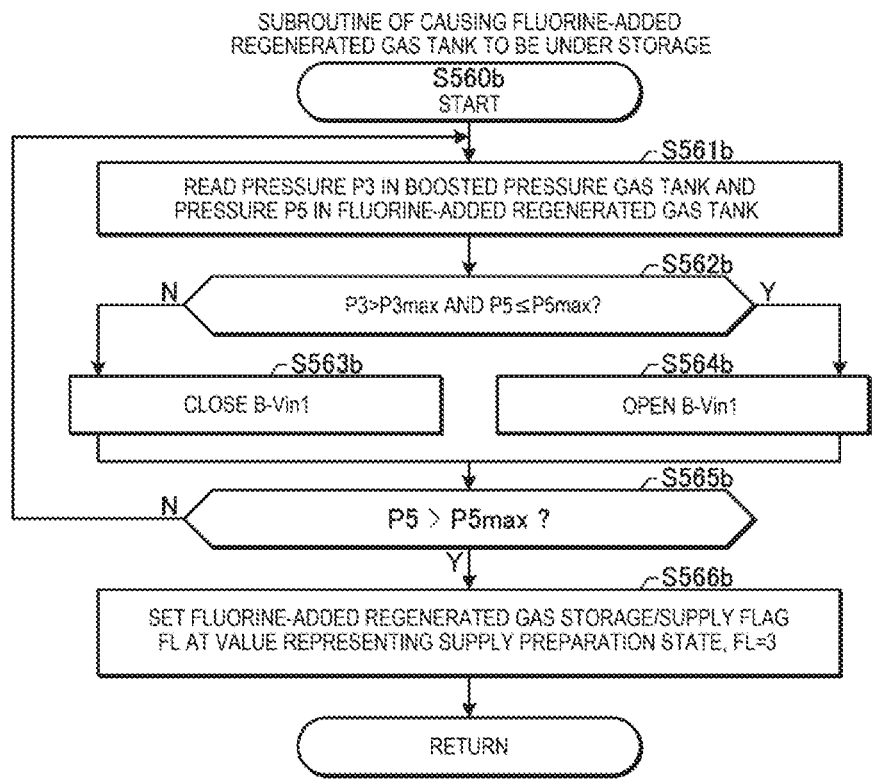
FIG. 20 is a flowchart showing in detail the process of causing the fluorine-added regenerated gas tank 71 to be under storage in the second embodiment.

3.2.2.3 Subroutine of Causing Fluorine-Added Regenerated Gas Tank to be Under Storage FIG. 20 is a flowchart showing in detail the process of causing the fluorine-added regenerated gas tank to be under storage in the second embodiment. The processes shown in FIG. 20 are carried out as a subroutine of S560b shown in FIG. 15 by the gas regeneration controller 51.

First, in S561b, the gas regeneration controller 51 reads the pressure P3 in the boosted pressure gas tank 65 outputted from the boosted pressure sensor P3 and the pressure P5 in the fluorine-added regenerated gas tank 71 outputted from the fluorine-added gas pressure sensor P5.

Thereafter, in S562b, the gas regeneration controller 51 evaluates whether or not the pressure P3 in the boosted pressure gas tank 65 is greater than the predetermined value P3max and the pressure P5 in the fluorine-added regenerated gas tank 71 is smaller than or equal to the predetermined value P5max. The predetermined value P3max is set at a value smaller than the predetermined value P3max2 but greater than or comparable to the pressure at the regulator 44 for the fluorine-containing gas supply source F2, for example, a value greater than or equal to 7,000 hPa but smaller than or equal to 8,000 hPa. The predetermined value P5max is set, for example, at a value smaller than designed upper-limit pressure in the fluorine-added regenerated gas tank 71 but close thereto.

In a case where the pressure P3 is smaller than or equal to the predetermined value P3max or the pressure P5 is greater than the predetermined value P5max (NO in S562b), the gas regeneration controller 51 proceeds to the process in S563b.

In a case where the pressure P3 is greater than the predetermined value P3max and the pressure P5 is smaller than or equal to the predetermined value P5max (YES in S562b), the gas regeneration controller 51 proceeds to the process in S564b.

In S563b, the gas regeneration controller 51 closes the valve B-Vin1. As a result, no inert regenerated gas flows into the fluorine-added regenerated gas tank 71 in a case where the pressure in the boosted pressure gas tank 65 is too low or the pressure in the fluorine-added regenerated gas tank 71 is too high.

In S564b, the gas regeneration controller 51 opens the valve B-Vin1. In this case, since the flow rate controlled by the mass flow controller F2-MFC1 has already been set at F2-SCCM3 in S140b in FIG. 14, the inert regenerated gas flows into the fluorine-added regenerated gas tank 71.

After S563b or S564b, the gas regeneration controller 51 proceeds to the process in S565b.

In S565b, the gas regeneration controller 51 evaluates whether or not the pressure P5 in the fluorine-added regenerated gas tank 71 is greater than the predetermined value P5max. The predetermined value P5max is set, for example, at a value smaller than designed upper-limit pressure in the fluorine-added regenerated gas tank 71 but close thereto.

In a case where the pressure P5 is smaller than or equal to the predetermined value P5max (NO in S565b), the gas regeneration controller 51 returns to the process in S561b described above to keep storing the fluorine-added regenerated gas.

In a case where the pressure P5 is greater than the predetermined value P5max (YES in S565b), the gas regeneration controller 51 proceeds to the process in S566b.

In S566b, the gas regeneration controller 51 sets the fluorine-added regenerated gas storage/supply flag FL at a value representing a supply preparation state, for example, at 3.

After S566b, the gas regeneration controller 51 terminates the processes in the present flowchart and returns to the processes in FIG. 15.

3.2.2.4 Subroutine of Preparing Supply from Fluorine-Added Regenerated Gas Tank

Figure 21:
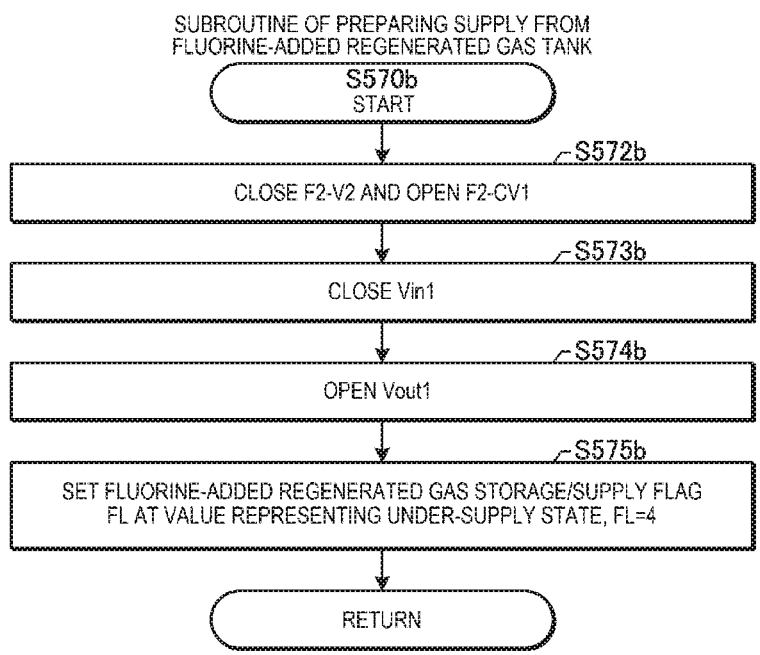
FIG. 21 is a flowchart showing in detail the process of preparing supply from fluorine-added regenerated gas tank 71 in the second embodiment.

FIG. 21 is a flowchart showing in detail the process of preparing supply from the fluorine-added regenerated gas tank in the second embodiment. The processes shown in FIG. 21 are carried out as a subroutine of S570b shown in FIG. 15 by the gas regeneration controller 51.

First, in S572b, the gas regeneration controller 51 closes the valve F2-V2 and opens the valve F2-CV1. Closing the valve F2-V2 prevents the fluorine-containing new gas from being supplied from the fluorine-containing gas supply source F2 to the laser chamber 10. Opening the valve F2-CV1 allows the fluorine-added regenerated gas to be supplied from the fluorine-added regenerated gas tank 71 to the laser chamber 10 when the valve Vout1 is opened.

Thereafter, in S573b, the gas regeneration controller 51 closes the valve B-Vin1. Closing the valve B-Vin1 prevents the inert regenerated gas from flowing from the boosted pressure gas tank 65 into the fluorine-added regenerated gas tank 71.

Thereafter, in S574b, the gas regeneration controller 51 opens the valve Vout1. Opening the valve Vout1 starts supply of the fluorine-added regenerated gas from the fluorine-added regenerated gas tank 71 to the laser chamber 10.

In S575b, the gas regeneration controller 51 sets the fluorine-added regenerated gas storage/supply flag FL at a value representing an under-supply state, for example, at 4.

After S575b, the gas regeneration controller 51 terminates the processes in the present flowchart and returns to the processes in FIG. 15.

Figure 22:
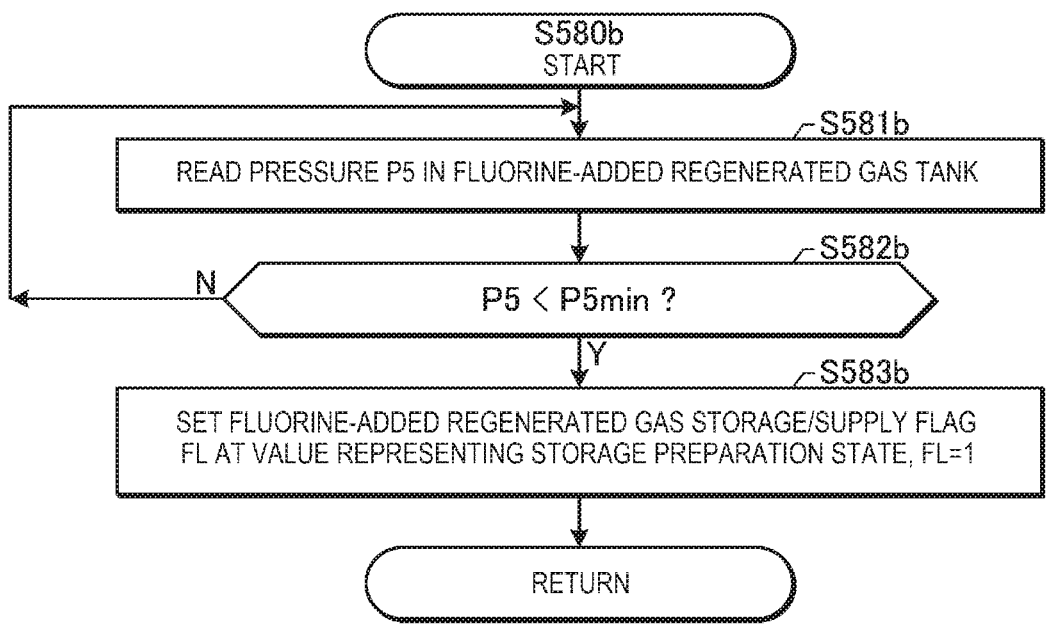
FIG. 22 is a flowchart showing in detail the process of causing the fluorine-added regenerated gas tank 71 to be under supply in the second embodiment.

3.2.2.5 Subroutine of Causing Fluorine-Added Regenerated Gas Tank to be Under Supply FIG. 22 is a flowchart showing in detail the process of causing the fluorine-added regenerated gas tank to be under supply in the second embodiment. The processes shown in FIG. 22 are carried out as a subroutine of S580b shown in FIG. 15 by the gas regeneration controller 51.

First, in S581b, the gas regeneration controller 51 reads the pressure P5 in the fluorine-added regenerated gas tank 71 outputted from the fluorine-added gas pressure sensor P5.

Thereafter, in S582b, the gas regeneration controller 51 evaluates whether or not the pressure P5 in the fluorine-added regenerated gas tank 71 is smaller than the predetermined value P5min. The predetermined value P5min is set at a value greater than or comparable to the pressure at the regulator 44 for the fluorine-containing gas supply source F2, for example, a value greater than or equal to 7,000 hPa but smaller than or equal to 8,000 hPa.

In a case where the pressure P5 is greater than or equal to the predetermined value P5min (NO in S582b), the gas regeneration controller 51 returns to the process in S581b described above to keep supplying the fluorine-added regenerated gas.

In a case where the pressure P5 is smaller than the predetermined value P5min (YES in S582b), the gas regeneration controller 51 proceeds to the process in S583b.

In S583b, the gas regeneration controller 51 sets the fluorine-added regenerated gas storage/supply flag FL at the value representing the storage preparation state, for example, at 1.

After S583b, the gas regeneration controller 51 terminates the processes in the present flowchart and returns to the processes in FIG. 15.

3.3. Effects

According to the second embodiment, the following effects are provided in addition to the effects provided by the first embodiment described above.

According to the second embodiment, since the fluorine gas supply source 72a uses a solid halogen, the fluorine gas supply source 72a can be usually chemically stable, and a necessary amount of fluorine gas can be extracted when necessary.

Further, according to the second embodiment, the interiors of the fluorine-added regenerated gas tank 71 and the fluorine gas supply source 72a are exhausted before the fluorine-added regenerated gas is stored in the fluorine-added regenerated gas tank 71. Roughly 100%-purity fluorine gas can therefore be generated at predetermined pressure from a metal fluoride.

Moreover, according to the second embodiment, part of the regenerated gas is caused to return to the recovery tank 63 when the fluorine-added regenerated gas tank 71 and the fluorine gas supply source 72a are exhausted. The regenerated gas can therefore be used at improved efficiency.

Figure 23:
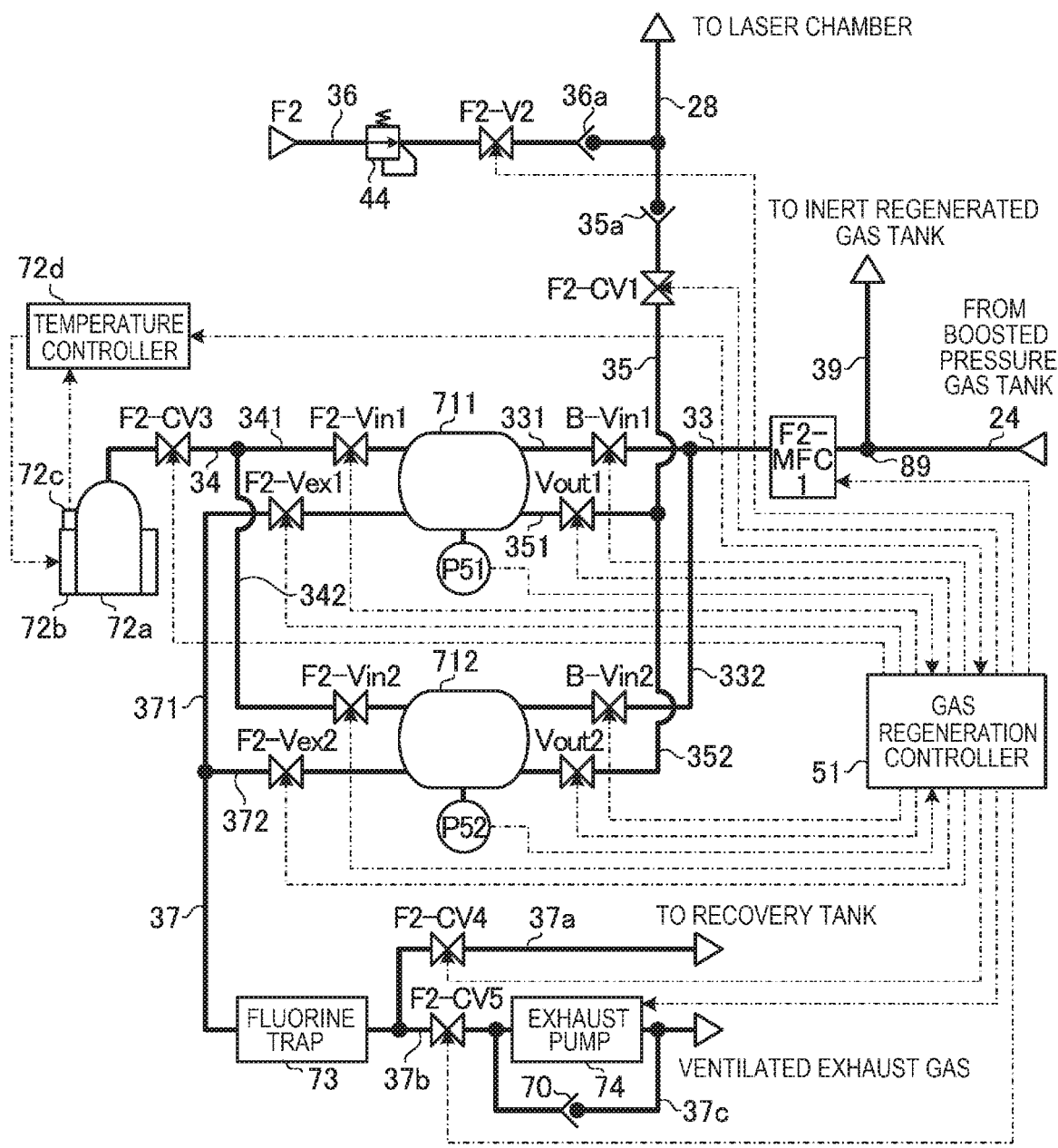
FIG. 23 schematically shows the configurations of a first fluorine-added regenerated gas tank 711, a second fluorine-added regenerated gas tank 712, and a variety of pipes connected thereto in a third embodiment of the present disclosure.

4. Laser Gas Regeneration System Including a Plurality of Fluorine-Added Regenerated Gas Tanks 4.1 Configuration FIG. 23 schematically shows the configurations of a first fluorine-added regenerated gas tank 711, a second fluorine-added regenerated gas tank 712, and a variety of pipes connected thereto in a third embodiment of the present disclosure.

In the third embodiment, the pipe 33 divides into pipes 331 and 332. The valve B-Vin1 is disposed in the pipe 331, and a valve B-Vin2 is disposed in the pipe 332.

The pipe 34 divides into pipes 341 and 342. The valve F2-Vin1 is disposed in the pipe 341, and a valve F2-Vin2 is disposed in the pipe 342.

The pipe 35 divides into pipes 351 and 352. The valve Vout1 is disposed in the pipe 351, and a valve Vout2 is disposed in the pipe 352.

The pipe 37 divides into pipes 371 and 372. The valve F2-Vex1 is disposed in the pipe 371, and a valve F2-Vex2 is disposed in the pipe 372.

The first fluorine-added regenerated gas tank 711 is connected to the pipes 331, 341, 351, and 371. A fluorine-added gas pressure sensor P51 is attached to the first fluorine-added regenerated gas tank 711.

The second fluorine-added regenerated gas tank 712 is connected to the pipes 332, 342, 352, and 372. A fluorine-added gas pressure sensor P52 is attached to the second fluorine-added regenerated gas tank 712.

The other points are the same as those in the second embodiment described above.

4.2 Operation

The variety of valves shown in FIG. 23 are controlled by the gas regeneration controller 51. The main procedure of the control performed by the gas regeneration controller 51 is the same as the procedure in the first embodiment described with reference to FIG. 8. In this regard, the third embodiment is the same as the second embodiment. Different points between the second and third embodiments will be described with reference to FIGS. 24 to 38.

4.2.1 Initial Setting Subroutine

Figure 24:
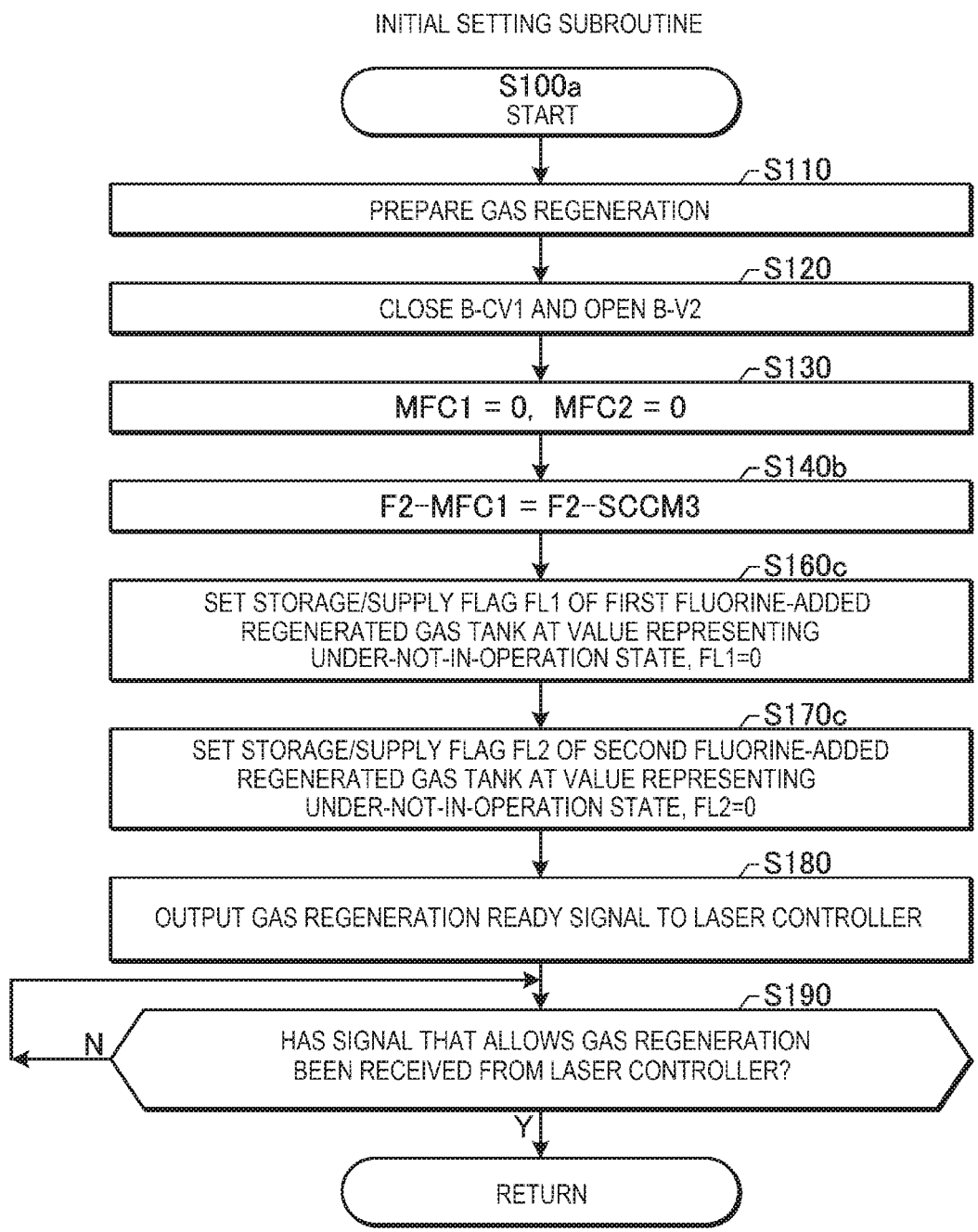
FIG. 24 is a flowchart showing in detail an initial setting subroutine in the third embodiment.

FIG. 24 is a flowchart showing in detail the initial setting subroutine in the third embodiment. The processes shown in FIG. 24 are carried out as a subroutine of S100a shown in FIG. 8 by the gas regeneration controller 51.

First, the processes in S110 to S130 are the same as the corresponding processes in Comparative Example described above. The process in following S140b is the same as the corresponding process in the second embodiment described above.

Thereafter, in S160c, the gas regeneration controller 51 sets a storage/supply flag FL1 of the first fluorine-added regenerated gas tank 711 at the value representing an under-not-in-operation state, for example, at 0.

Thereafter, in S170c, the gas regeneration controller 51 sets a storage/supply flag FL2 of the second fluorine-added regenerated gas tank 712 at the value representing an under-not-in-operation state, for example, at 0.

The following processes in S180 to S190 are the same as the corresponding processes in Comparative Example described above.

After S190, the gas regeneration controller 51 terminates the processes in the present flowchart and returns to the processes in FIG. 8.

4.2.2 Fluorine-Added Regenerated Gas Storage/Supply Subroutine

Figure 25:
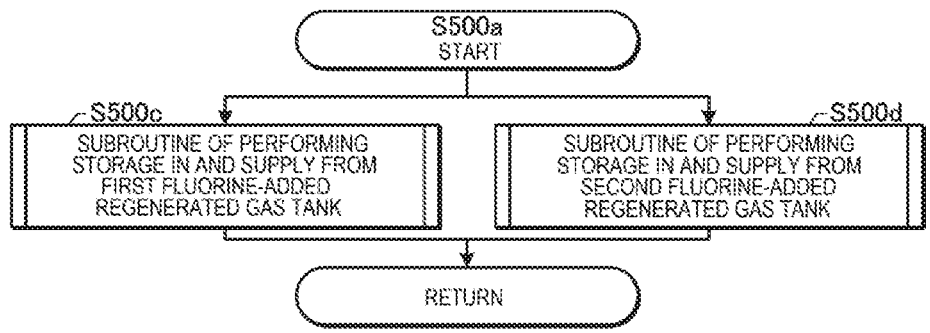
FIG. 25 is a flowchart showing in detail a fluorine-added regenerated gas storage/supply subroutine in the third embodiment.

FIG. 25 is a flowchart showing in detail the fluorine-added regenerated gas storage/supply subroutine in the third embodiment. The processes shown in FIG. 25 are carried out as a subroutine of S500a shown in FIG. 8 by the gas regeneration controller 51.

The processes shown in FIG. 25 include a subroutine S500c of performing storage in and supply from the first fluorine-added regenerated gas tank 711 and a subroutine S500d of performing storage in and supply from the second fluorine-added regenerated gas tank 712. The gas regeneration controller 51 concurrently carries out the processes in S500c and S500d. The gas regeneration controller 51 may instead sequentially carry out the processes in S500c and S500d. The order in which the processes in S500c and S500d are carried out is not limited to a specific order.

After S500c or S500d, the gas regeneration controller 51 terminates the processes in the present flowchart and returns to the processes in FIG. 8.

Figure 26:
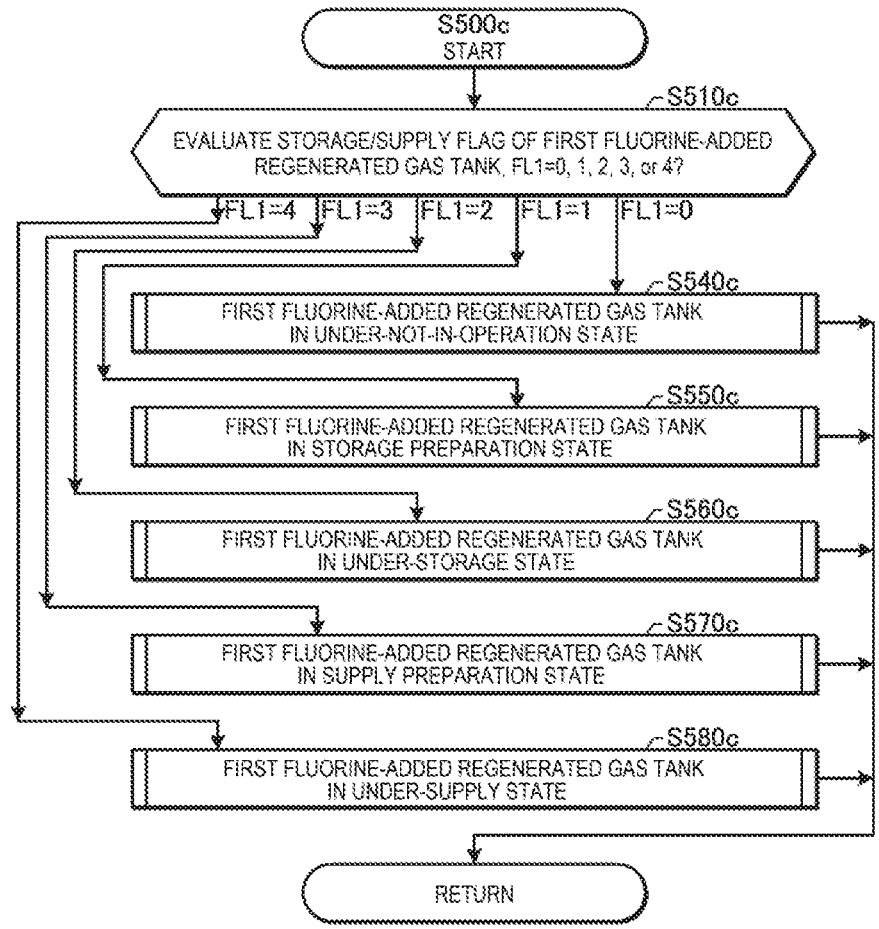
FIG. 26 is a flowchart showing in detail the subroutine of performing storage in and supply from the first fluorine-added regenerated gas tank 711 in the third embodiment.

FIG. 26 is a flowchart showing in detail the subroutine of performing storage in and supply from the first fluorine-added regenerated gas tank 711 in the third embodiment. The processes shown in FIG. 26 are carried out as a subroutine of S500c shown in FIG. 25 by the gas regeneration controller 51.

The processes shown in FIG. 26 are the same as those in the second embodiment described with reference to FIG. 15 except that the last letter of each of the step numbers is replaced with "c" and the storage in and supply from the first fluorine-added regenerated gas tank 711 are performed based on the storage/supply flag FL1 of the first fluorine-added regenerated gas tank 711. However, each subroutine contained in the processes shown in FIG. 26 partially differs from the subroutine in the second embodiment, and the different portions will therefore be described with reference to FIGS. 28 to 38.

Figure 27:
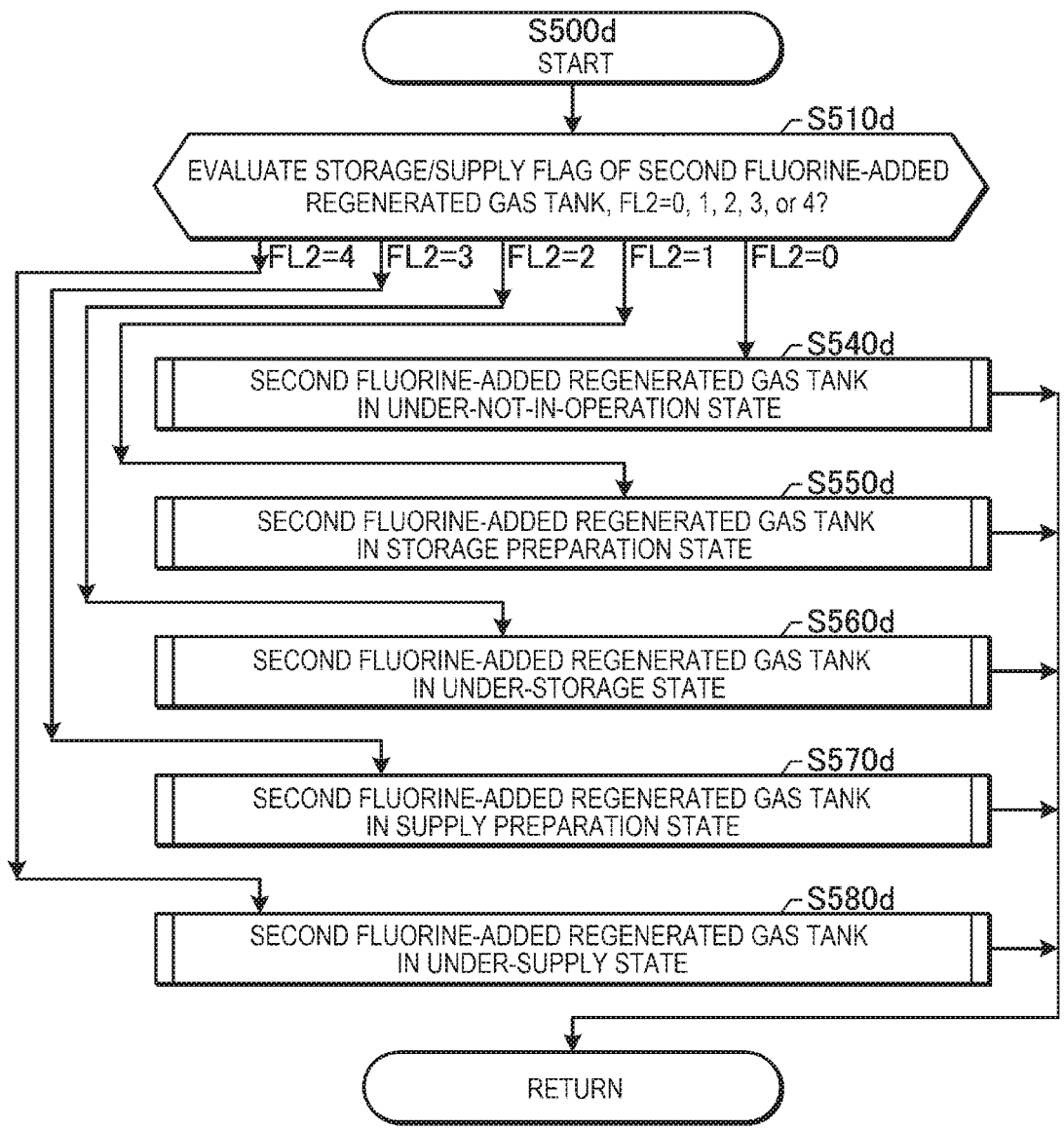
FIG. 27 is a flowchart showing in detail the subroutine of performing storage in and supply from the second fluorine-added regenerated gas tank 712 in the third embodiment.

FIG. 27 is a flowchart showing in detail the subroutine of performing storage in and supply from the second fluorine-added regenerated gas tank 712 in the third embodiment. The processes shown in FIG. 27 are carried out as a subroutine of S500d shown in FIG. 25 by the gas regeneration controller 51.

The processes shown in FIG. 27 are the same as those in the second embodiment described with reference to FIG. 15 except that the last letter of each of the step numbers is replaced with "d" and the storage in and supply from the second fluorine-added regenerated gas tank 712 are performed based on the storage/supply flag FL2 of the second fluorine-added regenerated gas tank 712. However, each subroutine contained in the processes shown in FIG. 27 partially differs from the subroutine in the second embodiment, and the different portions will therefore be described with reference to FIGS. 28 to 38.

Figure 28:
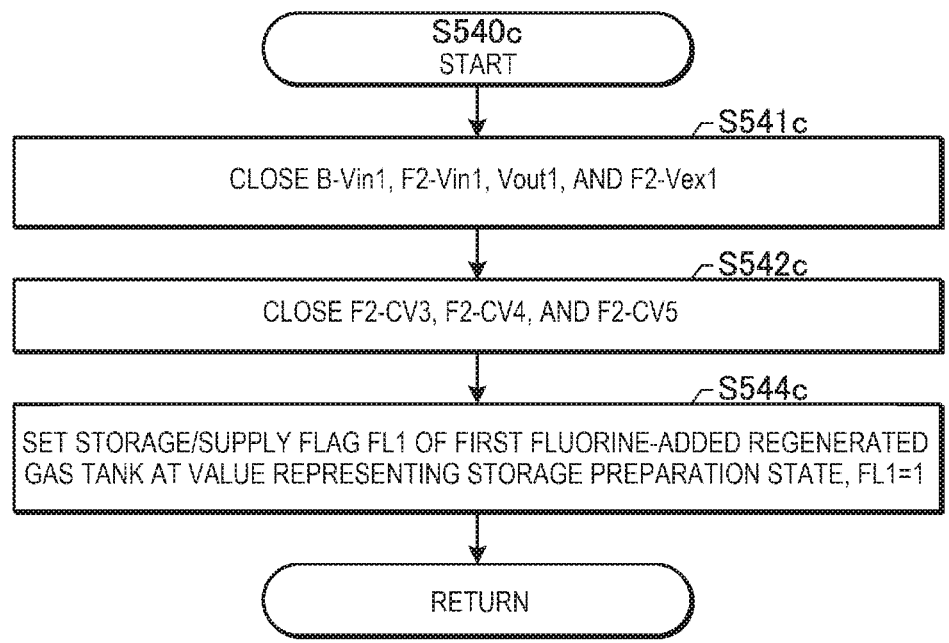
FIG. 28 is a flowchart showing in detail the process of causing the first fluorine-added regenerated gas tank 711 to be not in operation in the third embodiment.

4.2.2.1 Subroutine of Causing First and Second Fluorine-Added Regenerated Gas Tanks to be not in Operation FIG. 28 is a flowchart showing in detail the process of causing the first fluorine-added regenerated gas tank 711 to be not in operation in the third embodiment. The processes shown in FIG. 28 are carried out as a subroutine of S540c shown in FIG. 26 by the gas regeneration controller 51.

The processes shown in FIG. 28 are the same as those in the second embodiment described with reference to FIG. 16 except that the last letter of each of the step numbers is replaced with "c", the valves connected to the first fluorine-added regenerated gas tank 711 are controlled, and the storage/supply flag FL1 of the first fluorine-added regenerated gas tank 711 is then set.

Figure 29:
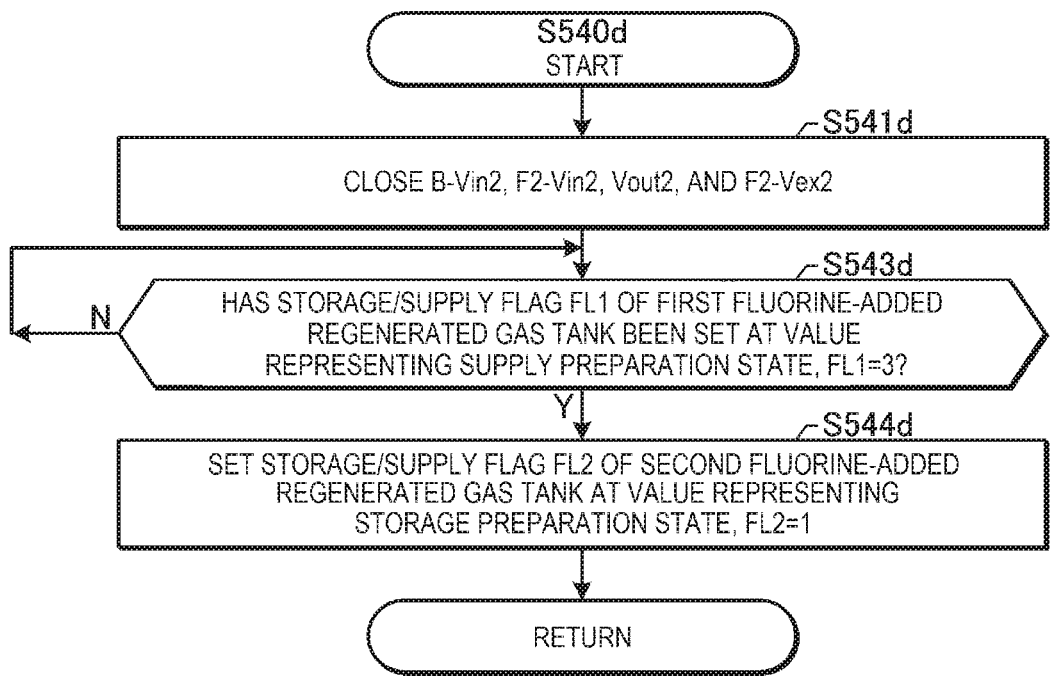
FIG. 29 is a flowchart showing in detail the process of causing the second fluorine-added regenerated gas tank 712 to be not in operation in the third embodiment.

FIG. 29 is a flowchart showing in detail the process of causing the second fluorine-added regenerated gas tank 712 to be not in operation in the third embodiment. The processes shown in FIG. 29 are carried out as a subroutine of S540d shown in FIG. 27 by the gas regeneration controller 51.

In the processes shown in FIG. 29, the processes in S541d and S544d are the same as those in the second embodiment described with reference to FIG. 16 except that the last letter of each of the step numbers is replaced with "d", the valves connected to the second fluorine-added regenerated gas tank 712 are controlled, and the storage/supply flag FL2 of the second fluorine-added regenerated gas tank 712 is then set.

The processes shown in FIG. 29 differ from the processes shown in FIG. 16 in that no process corresponding to S542b in FIG. 16 is carried out. The reason for this is that process corresponding to S542b in FIG. 16 has been already carried out in FIG. 28.

The processes shown in FIG. 29 differ from the processes shown in FIG. 16 in that the process in S543d is carried out between S541d and 544d described above.

In S543d, the gas regeneration controller 51 evaluates whether or not the flag FL of the first fluorine-added regenerated gas tank 711 has been set at the value representing the supply preparation state. The value representing the supply preparation state is, for example, 3.

In a case where the storage/supply flag FL1 has not been set at the value representing the supply preparation state (NO in S543d), the gas regeneration controller 51 waits until the storage/supply flag FL1 is set at the value representing the supply preparation state.

In the case where the storage/supply flag FL1 has been set at the value representing the supply preparation state (YES in S543d), the gas regeneration controller 51 proceeds to the process in S544d.

As a result, after the first fluorine-added regenerated gas tank 711 is ready for the supply, the second fluorine-added regenerated gas tank 712 is ready for the storage.

Figure 30:
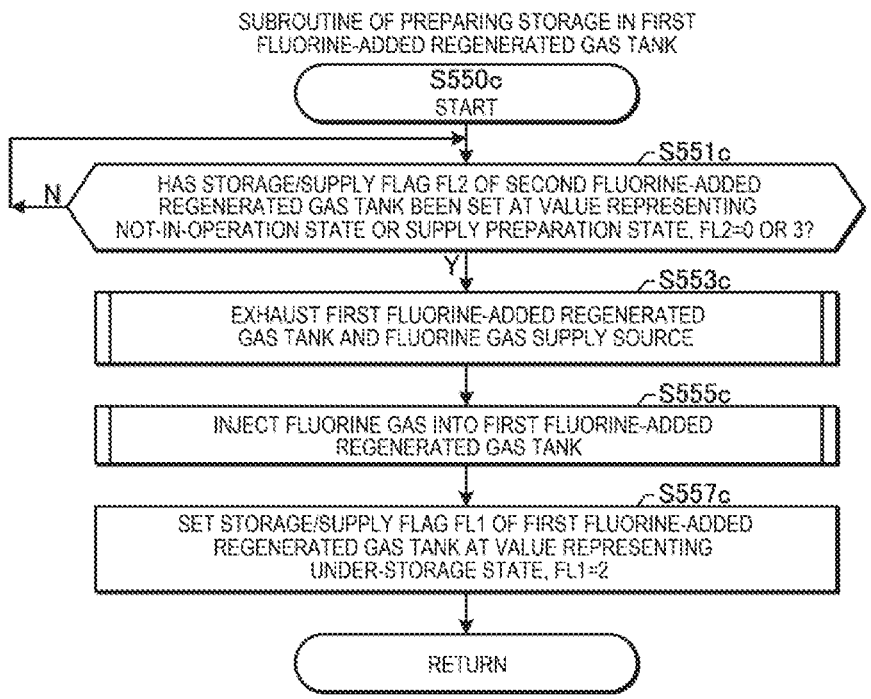
FIG. 30 is a flowchart showing in detail the process of preparing storage in the first fluorine-added regenerated gas tank 711 in the third embodiment.

4.2.2.2 Subroutine of Preparing Storage in First and Second Fluorine-Added Regenerated Gas Tanks FIG. 30 is a flowchart showing in detail the process of preparing storage in the first fluorine-added regenerated gas tank 711 in the third embodiment. The processes shown in FIG. 30 are carried out as a subroutine of S550c shown in FIG. 26 by the gas regeneration controller 51.

First, in S551c, the gas regeneration controller 51 evaluates whether or not the storage/supply flag FL2 of the second fluorine-added regenerated gas tank 712 has been set at the value representing the not-in-operation state or the value representing the supply preparation state. The value representing the not-in-operation state is, for example, 0. The value representing the supply preparation state is, for example, 3.

In a case where the storage/supply flag FL2 has not been set at the value representing the not-in-operation state or the value representing the supply preparation state (NO in S551c), the gas regeneration controller 51 waits until the storage/supply flag FL2 is set at the value representing the not-in-operation state or the value representing the supply preparation state.

In a case where the storage/supply flag FL2 has been set at the value representing the not-in-operation state or the value representing the supply preparation state (YES in S551c), the gas regeneration controller 51 proceeds to the process in S553c.

As a result, in the case where the second fluorine-added regenerated gas tank 712 is not in operation or has prepared the supply, the first fluorine-added regenerated gas tank 711 prepares the storage.

The processes from S553c to S557c are the same as those in the second embodiment described with reference to FIG. 17 except that the last letter of each of the step numbers is replaced with "c", the valves connected to the first fluorine-added regenerated gas tank 711 are controlled, and the storage/supply flag FL1 of the first fluorine-added regenerated gas tank 711 is then set.

Figure 31:
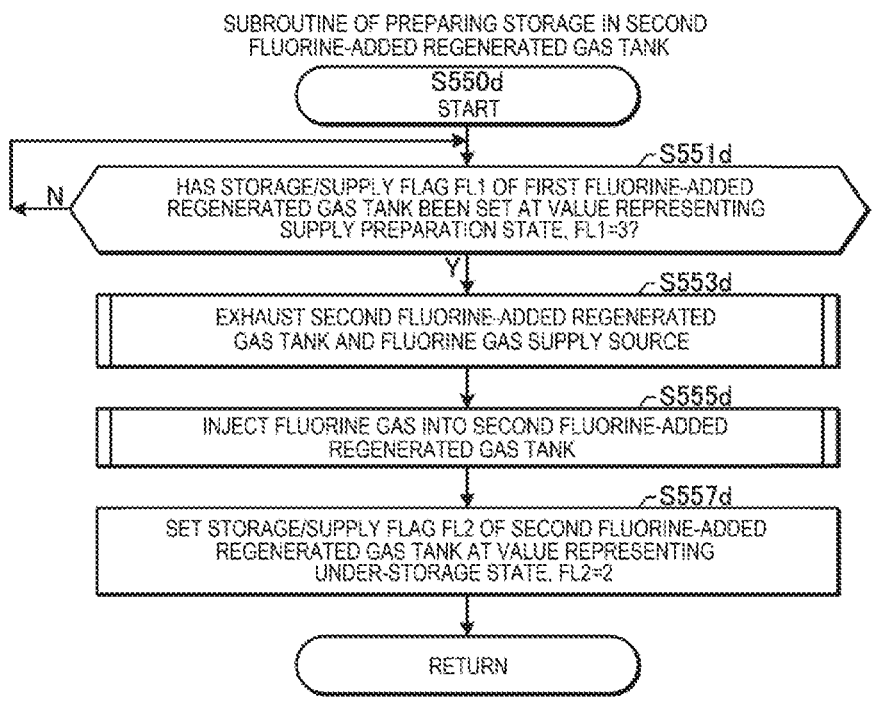
FIG. 31 is a flowchart showing in detail the process of preparing storage in the second fluorine-added regenerated gas tank 712 in the third embodiment.

FIG. 31 is a flowchart showing in detail the process of preparing storage in the second fluorine-added regenerated gas tank 712 in the third embodiment. The processes shown in FIG. 31 are carried out as a subroutine of S550d shown in FIG. 27 by the gas regeneration controller 51.

First, in S551d, the gas regeneration controller 51 evaluates whether or not the storage/supply flag FL1 of the first fluorine-added regenerated gas tank 711 has been set at the value representing the supply preparation state. The value representing the supply preparation state is, for example, 3.

In a case where the storage/supply flag FL1 has not been set at the value representing the supply preparation state (NO in S551d), the gas regeneration controller 51 waits until the storage/supply flag FL1 is set at the value representing the supply preparation state.

In a case where the storage/supply flag FL1 has been set at the value representing the supply preparation state (YES in S551d), the gas regeneration controller 51 proceeds to the process in S553d.

As a result, after the first fluorine-added regenerated gas tank 711 has prepared the supply, the second fluorine-added regenerated gas tank 712 prepares the storage.

The processes from S553d to S557d are the same as those in the second embodiment described with reference to FIG. 17 except that the last letter of each of the step numbers is replaced with "d", the valves connected to the second fluorine-added regenerated gas tank 712 are controlled, and the storage/supply flag FL2 of the second fluorine-added regenerated gas tank 712 is then set.

Figure 32:
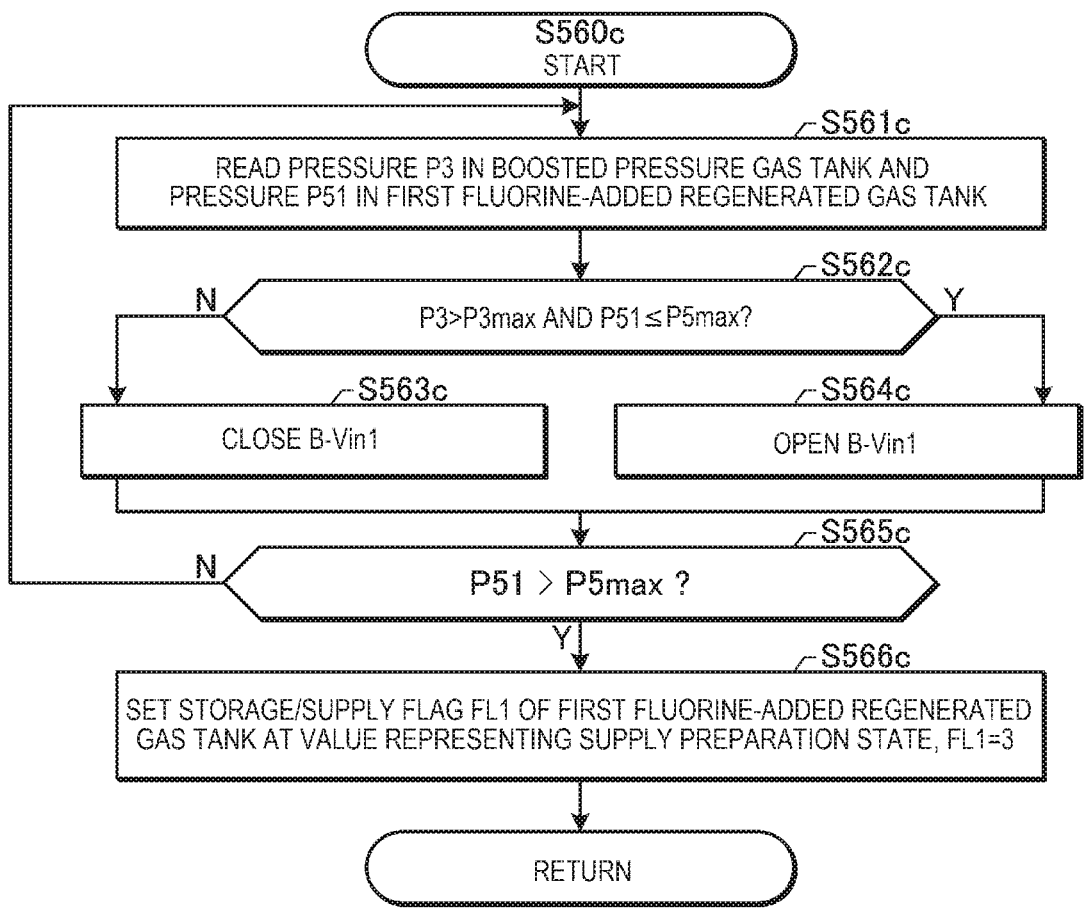
FIG. 32 is a flowchart showing in detail the process of causing the first fluorine-added regenerated gas tank 711 to be under storage in the third embodiment.

4.2.2.3 Subroutine of Causing First and Second Fluorine-Added Regenerated Gas Tanks to be Under Storage FIG. 32 is a flowchart showing in detail the process of causing the first fluorine-added regenerated gas tank 711 to be under storage in the third embodiment. The processes shown in FIG. 32 are carried out as a subroutine of S560c shown in FIG. 26 by the gas regeneration controller 51.

The processes shown in FIG. 32 are the same as those in the second embodiment described with reference to FIG. 20 except that the last letter of each of the step numbers is replaced with "c", the valves connected to the first fluorine-added regenerated gas tank 711 are controlled, and the storage/supply flag FL1 of the first fluorine-added regenerated gas tank 711 is then set.

Figure 33:
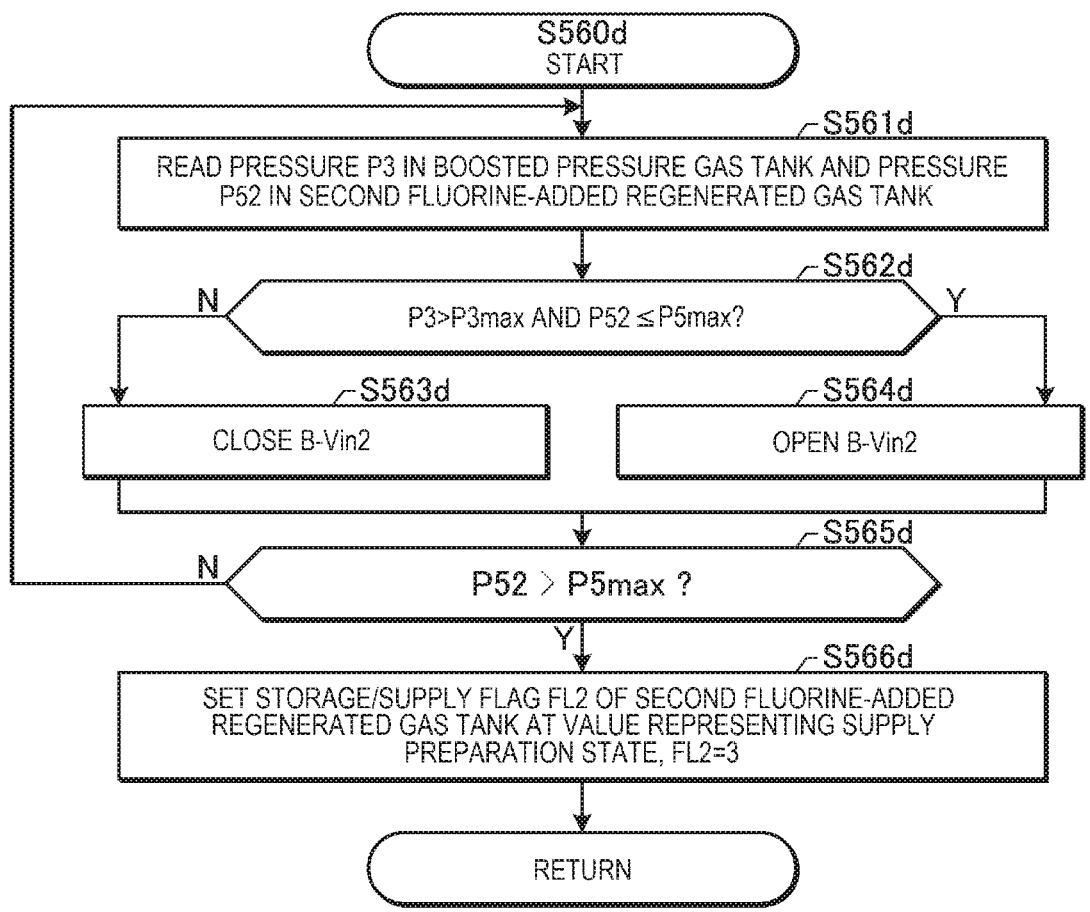
FIG. 33 is a flowchart showing in detail the process of causing the second fluorine-added regenerated gas tank 712 to be under storage in the third embodiment.

FIG. 33 is a flowchart showing in detail the process of causing the second fluorine-added regenerated gas tank 712 to be under storage in the third embodiment. The processes shown in FIG. 33 are carried out as a subroutine of S560d shown in FIG. 27 by the gas regeneration controller 51.

The processes shown in FIG. 33 are the same as those in the second embodiment described with reference to FIG. 20 except that the last letter of each of the step numbers is replaced with "d", the valves connected to the second fluorine-added regenerated gas tank 712 are controlled, and the storage/supply flag FL2 of the second fluorine-added regenerated gas tank 712 is then set.

Figure 34:
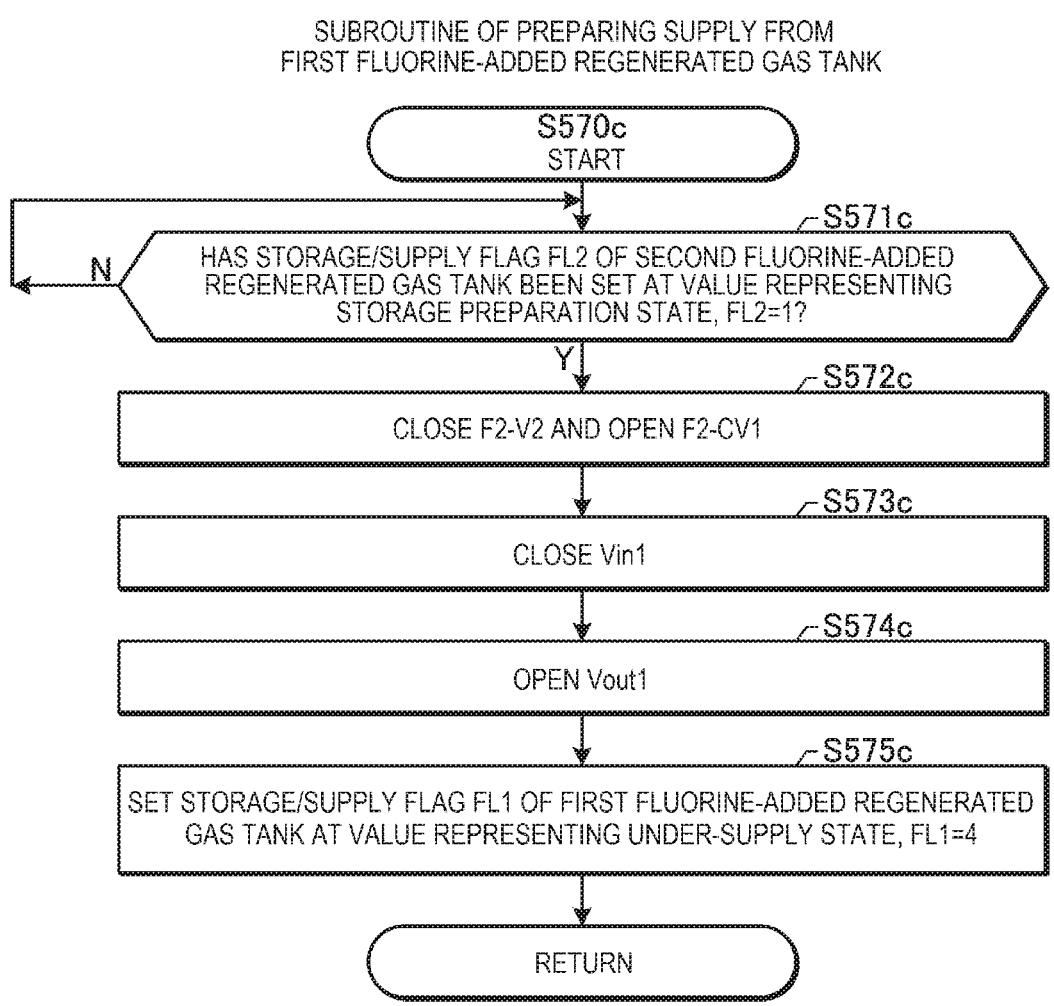
FIG. 34 is a flowchart showing in detail the process of preparing supply from the first fluorine-added regenerated gas tank 711 in the third embodiment.

4.2.2.4 Subroutine of Preparing Supply from First and Second Fluorine-Added Regenerated Gas Tanks FIG. 34 is a flowchart showing in detail the process of preparing supply from the first fluorine-added regenerated gas tank 711 in the third embodiment. The processes shown in FIG. 34 are carried out as a subroutine of S570c shown in FIG. 26 by the gas regeneration controller 51.

First, in S571c, the gas regeneration controller 51 evaluates whether or not the storage/supply flag FL2 of the second fluorine-added regenerated gas tank 712 has been set at the value representing the storage preparation state. The value representing the storage preparation state is, for example, 1.

In a case where the storage/supply flag FL2 has not been set at the value representing the storage preparation state (NO in S571c), the gas regeneration controller 51 waits until the storage/supply flag FL2 is set at the value representing the storage preparation state.

In a case where the storage/supply flag FL2 has been set at the value representing the storage preparation state (YES in S571c), the gas regeneration controller 51 proceeds to the process in S572c.

As a result, after the second fluorine-added regenerated gas tank 712 has prepared the storage, the first fluorine-added regenerated gas tank 711 prepares the supply.

The processes in S572c to S575c are the same as those in the second embodiment described with reference to FIG. 21 except that the last letter of each of the step numbers is replaced with "c", the valves connected to the first fluorine-added regenerated gas tank 711 are controlled, and the storage/supply flag FL1 of the first fluorine-added regenerated gas tank 711 is then set.

Figure 35:
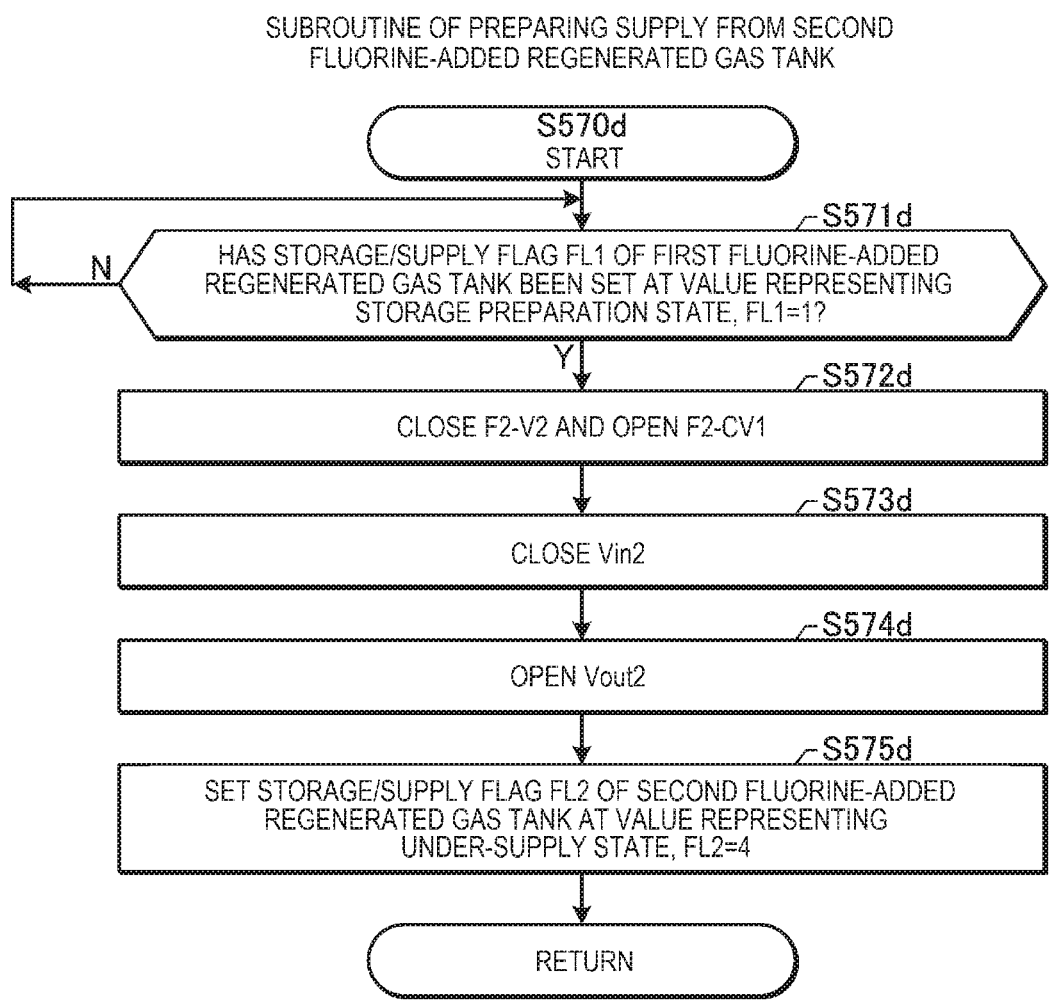
FIG. 35 is a flowchart showing in detail the process of preparing supply from the second fluorine-added regenerated gas tank 712 in the third embodiment.

FIG. 35 is a flowchart showing in detail the process of preparing supply from the second fluorine-added regenerated gas tank 712 in the third embodiment. The processes shown in FIG. 35 are carried out as a subroutine of S570d shown in FIG. 27 by the gas regeneration controller 51.

First, in S571d, the gas regeneration controller 51 evaluates whether or not the storage/supply flag FL1 of the first fluorine-added regenerated gas tank 711 has been set at the value representing the storage preparation state. The value representing the storage preparation state is, for example, 1.

In a case where the storage/supply flag FL1 has not been set at the value representing the storage preparation state (NO in S571d), the gas regeneration controller 51 waits until the storage/supply flag FL1 is set at the value representing the storage preparation state.

In a case where the storage/supply flag FL1 has been set at the value representing the storage preparation state (YES in S571d), the gas regeneration controller 51 proceeds to the process in S572d.

As a result, after the first fluorine-added regenerated gas tank 711 has prepared the storage, the second fluorine-added regenerated gas tank 712 prepares the supply.

The processes in S572d to S575d are the same as those in the second embodiment described with reference to FIG. 21 except that the last letter of each of the step numbers is replaced with "d", the valves connected to the second fluorine-added regenerated gas tank 712 are controlled, and the storage/supply flag FL2 of the second fluorine-added regenerated gas tank 712 is then set.

Figure 36:
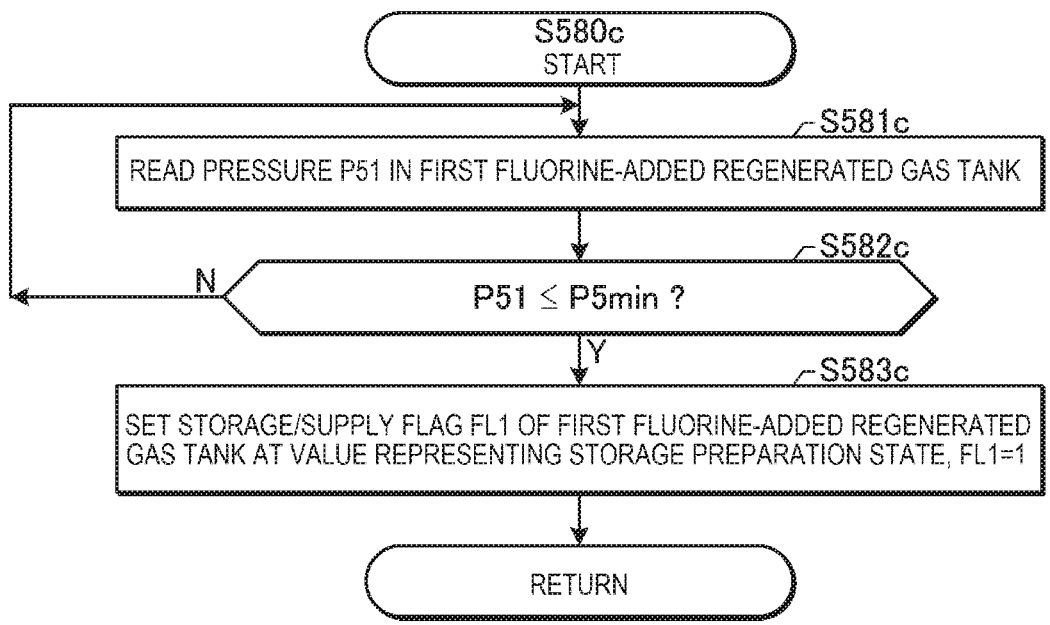
FIG. 36 is a flowchart showing in detail the process of causing the first fluorine-added regenerated gas tank 711 to be under supply in the third embodiment.

4.2.2.5 Subroutine of Causing First and Second Fluorine-Added Regenerated Gas Tanks to be Under Supply FIG. 36 is a flowchart showing in detail the process of causing the first fluorine-added regenerated gas tank 711 to be under supply in the third embodiment. The processes shown in FIG. 36 are carried out as a subroutine of S580c shown in FIG. 26 by the gas regeneration controller 51.

The processes in FIG. 36 are the same as those in the second embodiment described with reference to FIG. 22 except that the last letter of each of the step numbers is replaced with "c", the valves connected to the first fluorine-added regenerated gas tank 711 are controlled, and the storage/supply flag FL1 of the first fluorine-added regenerated gas tank 711 is then set.

Figure 37:
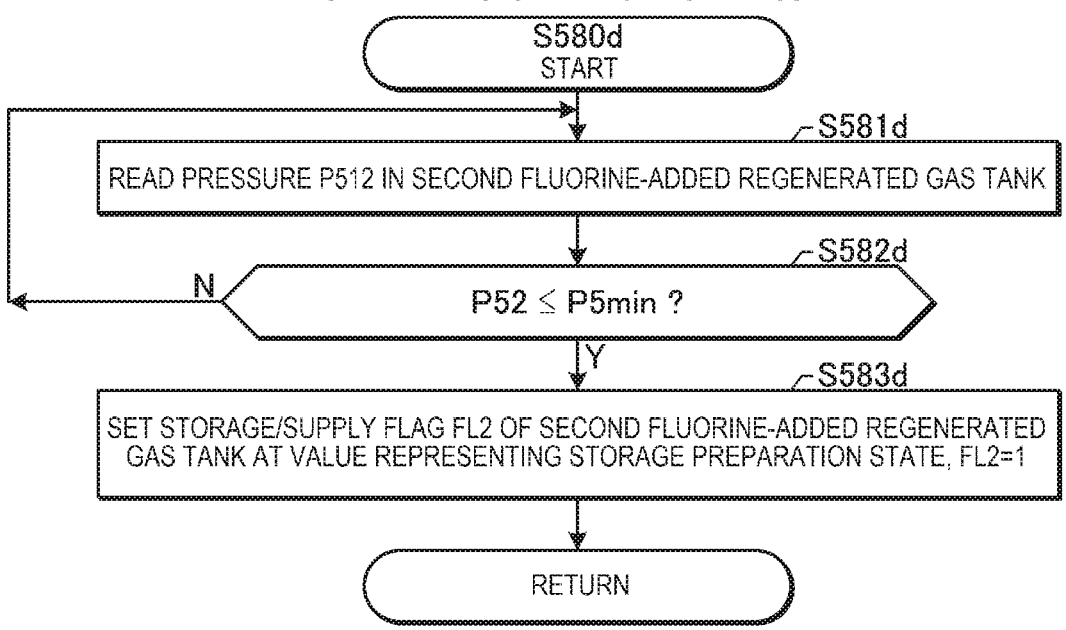
FIG. 37 is a flowchart showing in detail the process of causing the second fluorine-added regenerated gas tank 712 to be under supply in the third embodiment.

FIG. 37 is a flowchart showing in detail the process of causing the second fluorine-added regenerated gas tank 712 to be under supply in the third embodiment. The processes shown in FIG. 37 are carried out as a subroutine of S580d shown in FIG. 27 by the gas regeneration controller 51.

The processes in FIG. 37 are the same as those in the second embodiment described with reference to FIG. 22 except that the last letter of each of the step numbers is replaced with "d", the valves connected to the second fluorine-added regenerated gas tank 712 are controlled, and the storage/supply flag FL2 of the second fluorine-added regenerated gas tank 712 is then set.

4.3 Effects

FIG. 38 shows changes in the states of the first fluorine-added regenerated gas tank 711 and the second fluorine-added regenerated gas tank 712. In FIG. 38, time elapses in the direction from an upper portion to a lower portion.

In the case of the first fluorine-added regenerated gas tank 711, the storage/supply flag FL1 is first set at 0 representing the not-in-operation state in accordance with the flowcharts described above. The storage/supply flag FL1 then sequentially transitions to 1 representing the storage preparation state, 2 representing the under-storage state, 3 representing the supply preparation state, and 4 representing the under-supply state. After 4 representing the under-supply state, the storage/supply flag FL1 transitions to 1 representing the storage preparation state and repeats the transition from 1 to 4 afterward.

In the case of the second fluorine-added regenerated gas tank 712, the storage/supply flag FL2 is first set at 0 representing the not-in-operation state in accordance with the flowcharts described above. The storage/supply flag FL2 then sequentially transitions to 1 representing the storage preparation state, 2 representing the under-storage state, 3 representing the supply preparation state, and 4 representing the under-supply state. After 4 representing the under-supply state, the storage/supply flag FL2 transitions to 1 representing the storage preparation state and repeats the transition from 1 to 4 afterward.

The storage/supply flag FL1 of the first fluorine-added regenerated gas tank 711 and the storage/supply flag FL2 of the second fluorine-added regenerated gas tank 712 transition in such a way that the states thereof are not equal to each other except the case where the two tanks are not in operation.

For example, the first fluorine-added regenerated gas tank 711 and the second fluorine-added regenerated gas tank 712 transition in such a way that the preparation of storage in the first fluorine-added regenerated gas tank 711 coincides with the preparation of supply from the second fluorine-added regenerated gas tank 712.

For example, the first fluorine-added regenerated gas tank 711 and the second fluorine-added regenerated gas tank 712 transition in such a way that the storage in the first fluorine-added regenerated gas tank 711 coincides with the supply from the second fluorine-added regenerated gas tank 712.

For example, the first fluorine-added regenerated gas tank 711 and the second fluorine-added regenerated gas tank 712 transition in such a way that the preparation of supply from the first fluorine-added regenerated gas tank 711 coincides with the preparation of storage in the second fluorine-added regenerated gas tank 712.

For example, the first fluorine-added regenerated gas tank 711 and the second fluorine-added regenerated gas tank 712 transition in such a way that the supply from the first fluorine-added regenerated gas tank 711 coincides with the storage in the second fluorine-added regenerated gas tank 712.

According to the third embodiment, the following effects are provided in addition to the effects provided by the second embodiment described above.

If the first fluorine-added regenerated gas tank 711 and the second fluorine-added regenerated gas tank 712 are simultaneously under storage, the supply to the laser chamber 10 can be performed from none of the tanks in some cases. According to the third embodiment, however, the tanks are so controlled as not to be simultaneously under storage, whereby occurrence of the situation in which no fluorine-added regenerated gas can be supplied to the laser chamber 10 can be reduced.

If the first fluorine-added regenerated gas tank 711 and the second fluorine-added regenerated gas tank 712 are simultaneously under supply, the storage can be performed in none of the tanks in some cases. According to the third embodiment, however, the tanks are so controlled as not to be simultaneously under supply, whereby occurrence of the situation in which no fluorine-added regenerated gas can be stored can be reduced.

Further, according to the configuration described above, the gas can be intensively stored in one of the first fluorine-added regenerated gas tank 711 and the second fluorine-added regenerated gas tank 712, whereby the one fluorine-added regenerated gas tank can be filled earlier than the other with the gas to the point where the pressure that allows the gas to be supplied to the laser chamber 10. The gas regeneration efficiency in the initial stage of the operation of the laser gas regeneration system is therefore improved.

The description has been made of the case where the second regenerated gas supplier includes two supply tanks, and the second regenerated gas supplier may instead include three or more supply tanks.

5. Laser Gas Regeneration System for Laser Using No Xenon Gas

Figure 39:
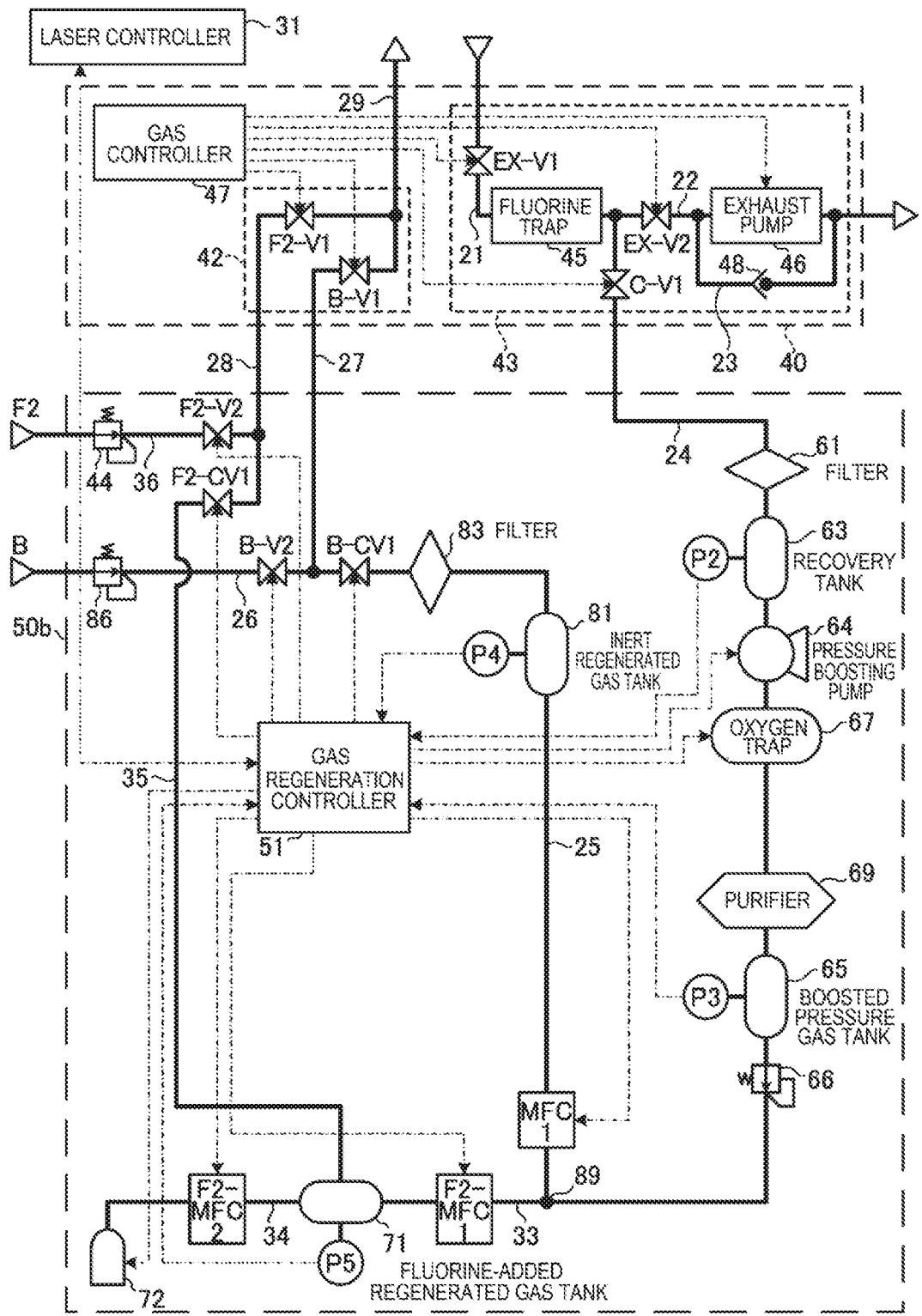
FIG. 39 schematically shows the configuration of a laser gas regeneration system 50b according to a fourth embodiment of the present disclosure.

FIG. 39 schematically shows the configuration of a laser gas regeneration system 50b according to a fourth embodiment of the present disclosure. In the fourth embodiment, the laser gas regeneration system 50b may include no xenon trap 68 or xenon adder 75.

For example, in a case where the laser oscillation system 32 is not an ArF excimer laser using argon gas, neon gas or helium gas, and a small amount of xenon gas but is a KrF excimer laser using krypton gas and neon gas or helium gas, no xenon trap 68 or xenon adder 75 is required. The laser gas regeneration system according to the present disclosure is also used with both an ArF excimer laser and a KrF excimer laser by using the configuration including the xenon trap 68 and the xenon adder 75 shown in FIG. 7 but by detaching the xenon trap 68 and the xenon adder 75 and allowing the pipes on the upstream and downstream sides of each of the xenon trap 68 and the xenon adder 75 to be connected to each other.

The other points are the same as those in the first embodiment described with reference to FIG. 7.

6. Laser Gas Regeneration System Connected to Plurality of Lasers

6.1 Configuration

Figure 40:
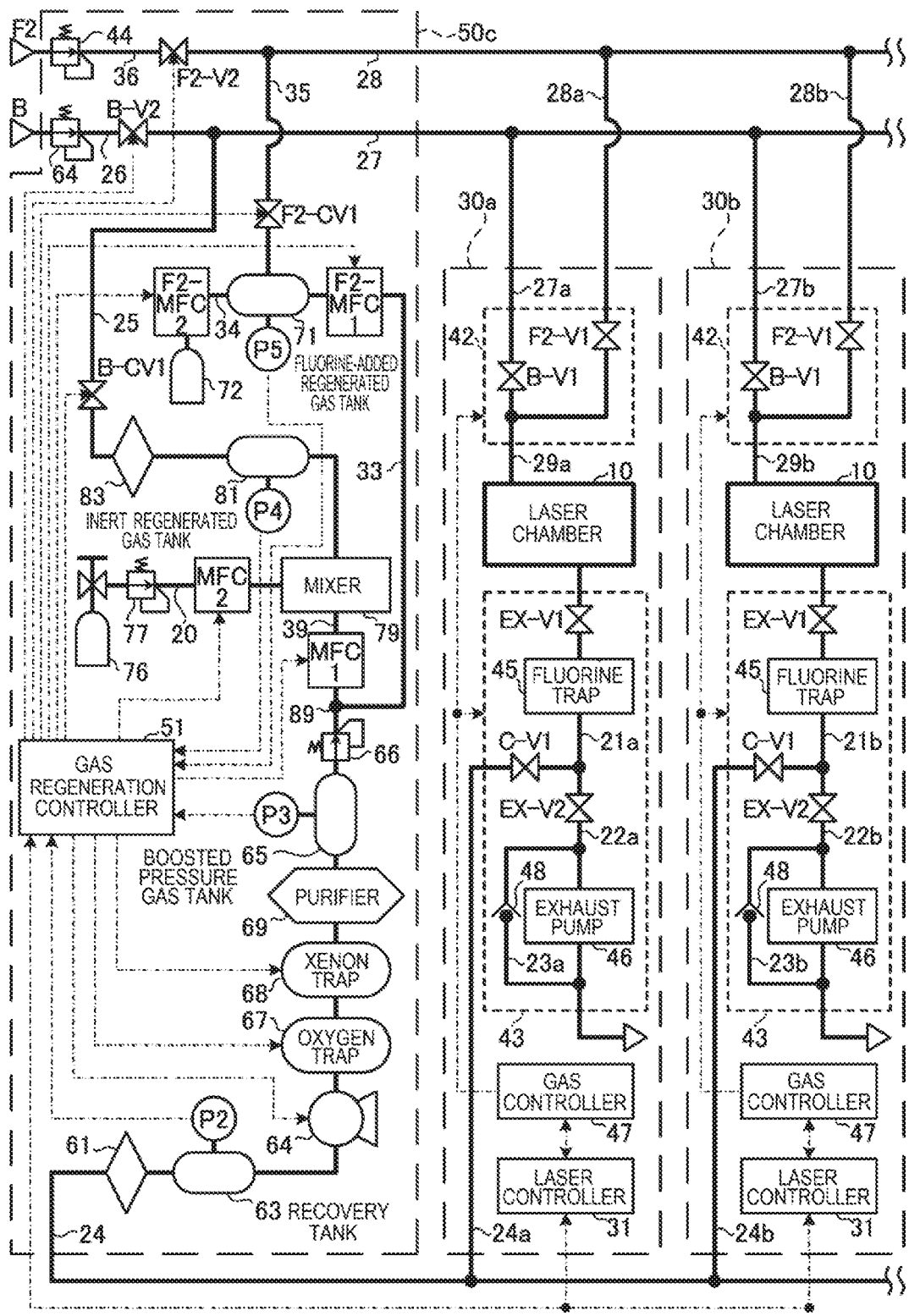
FIG. 40 schematically shows the configuration of excimer lasers 30a and 30b and a laser gas regeneration system 50c according to a fifth embodiment of the present disclosure.

FIG. 40 schematically shows the configuration of excimer lasers 30a and 30b and a laser gas regeneration system 50c according to a fifth embodiment of the present disclosure. In the fifth embodiment, the laser gas regeneration system 50c is connected to the plurality of laser chambers 10 of the plurality of excimer lasers. The laser gas regeneration system 50c reduces impurities in the gas exhausted from the plurality of excimer lasers and supplies the plurality of excimer lasers with the inert regenerated gas having the reduced impurities. The laser gas regeneration system 50c further supplies the plurality of excimer lasers with the fluorine-added regenerated gas, which is the inert regenerated gas to which fluorine gas is added. The plurality of excimer lasers 30a and 30b may each have the same configuration as that of the excimer laser 30 in each of the embodiments described above.

The pipe 24 in the laser gas regeneration system 50c divides at a position on the upstream side of the filter 61 into a plurality of pipes 24a and 24b corresponding to the plurality of excimer lasers. The valve C-V1 is disposed in each of the plurality of pipes 24a and 24b. Whether or not the exhaust gas is introduced into the laser gas regeneration system 50c from the exhauster 43 provided in each of the plurality of excimer lasers 30a and 30b is controlled by opening and closing the valves C-V1.

The pipe 27, through which the buffer gas is supplied to the excimer lasers, divides into a plurality of pipes 27a and 27b corresponding to the plurality of excimer lasers. The valve B-V1 is disposed in each of the plurality of pipes 27a and 27b. Whether or not the buffer gas is supplied to the gas supplier 42 provided in each of the plurality of excimer lasers 30a and 30b is controlled by opening and closing the valves B-V1.

The pipe 28, through which the fluorine-containing gas is supplied to the excimer lasers, divides into a plurality of pipes 28a and 28b corresponding to the plurality of excimer lasers. The valve F2-V1 is disposed in each of the plurality of pipes 28a and 28b. Whether or not the fluorine-containing gas is supplied to the gas supplier 42 provided in each of the plurality of excimer lasers 30a and 30b is controlled by opening and closing the valves F2-V1.

The gas regeneration controller 51 is connected to the gas controller 47 provided in each of the plurality of excimer lasers 30a and 30b via a signal line.

The other points may be the same as those in the embodiments described above.

6.2 Operation

The operation of each of the plurality of excimer lasers 30a and 30b may be the same as the operation of the excimer layer 30 in each of the embodiments described above.

The laser gas regeneration system 50c reduces impurities in the exhaust gas exhausted from each of the plurality of excimer lasers and supplies each of the plurality of excimer lasers with the inert regenerated gas having the reduced impurities. The laser gas regeneration system 50c further supplies each of the plurality of excimer lasers with the fluorine-added regenerated gas, which is the inert regenerated gas to which fluorine gas is added. As for the other points, the operation of the laser gas regeneration system 50c may be the same as the operation of the laser gas regeneration systems 50a and 50b in the embodiments described above.

The laser gas regeneration system 50c may simultaneously accept the exhaust gas exhausted from the plurality of excimer lasers 30a and 30b or may accept the exhaust gas exhausted from the plurality of excimer lasers 30a and 30b at different timings. The laser gas regeneration system 50c may simultaneously supply the plurality of excimer lasers 30a and 30b with the inert regenerated gas or may supply the plurality of excimer lasers 30a and 30b with the inert regenerated gas at different timings. The laser gas regeneration system 50c may simultaneously supply the plurality of excimer lasers 30a and 30b with the fluorine-added regenerated gas or may supply the plurality of excimer lasers 30a and 30b with the fluorine-added regenerated gas at different timings.

In a case where the inert new gas is supplied to one of the excimer lasers or the excimer laser 30a and the inert regenerated gas is supplied to the other excimer laser or the excimer laser 30b, the laser gas regeneration system 50c may supply these gases not simultaneously but at different timings.

In a case where the fluorine-containing new gas is supplied to one of the excimer lasers or the excimer laser 30a and the fluorine-added regenerated gas is supplied to the other excimer laser or the excimer laser 30b, the laser gas regeneration system 50c may supply these gases not simultaneously but at different timings.

6.3 Effects

According to the fifth embodiment, the laser gas regeneration system 50c can refine the exhaust gas exhausted from the plurality of excimer lasers and supply the plurality of excimer lasers with the inert regenerated gas and the fluorine-added regenerated gas. The amount of consumed inert gas is therefore reduced, whereby the running cost can be reduced. Further, since the inert regenerated gas and the fluorine-added regenerated gas may be supplied to the plurality of excimer lasers, the laser performance of each of the plurality of excimer lasers can be stabilized. Moreover, in a case where one laser gas regeneration system 50c is installed for the plurality of excimer lasers, the installation space and the facility cost can be reduced.

7. Laser Gas Regeneration System in which a Variety of Traps are Disposed on Downstream Side of Boosted Pressure Gas Tank

7.1 Configuration

Figure 41:
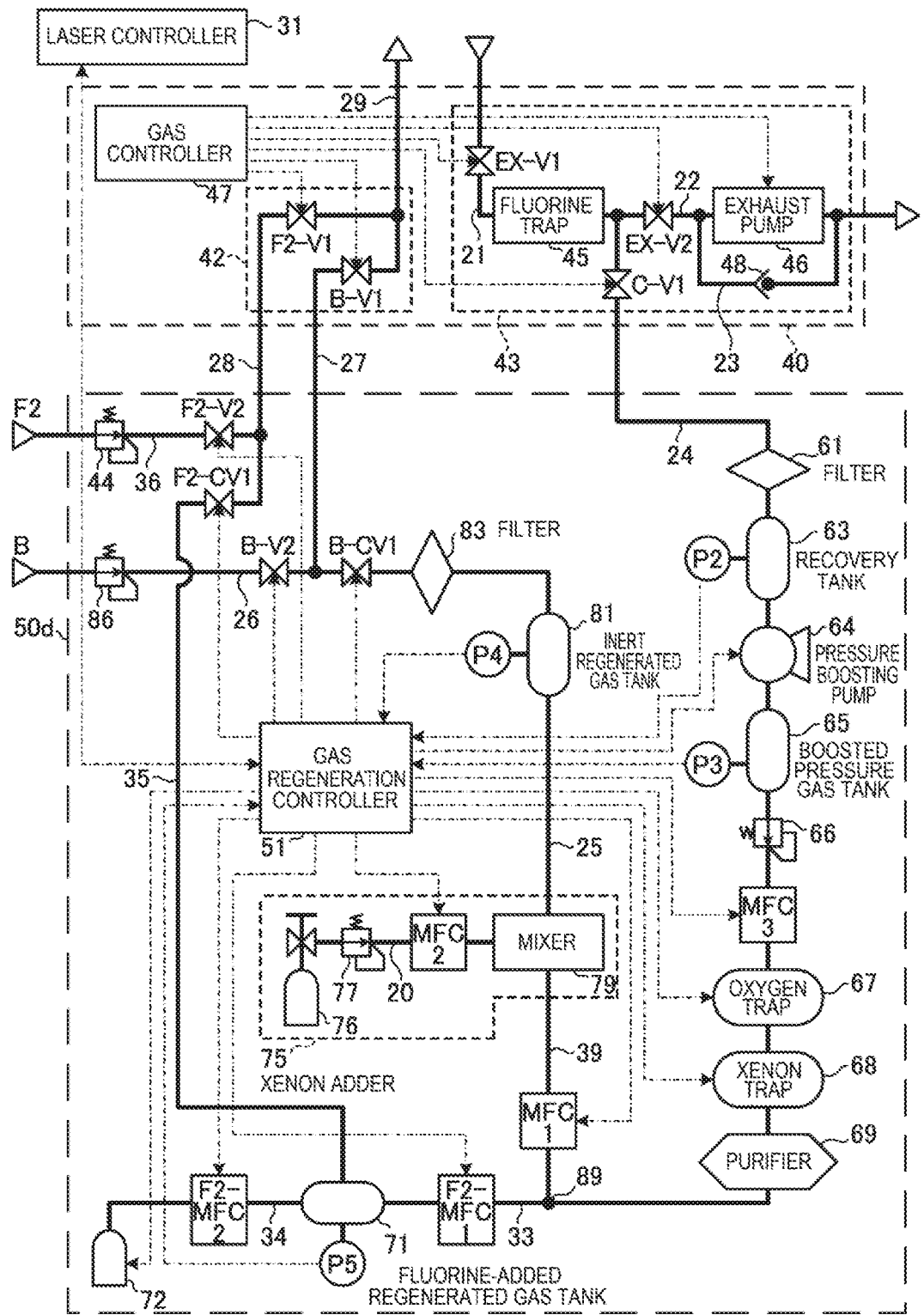
FIG. 41 schematically shows the configuration of a laser gas regeneration system 50d according to a sixth embodiment of the present disclosure.

FIG. 41 schematically shows the configuration of a laser gas regeneration system 50d according to a sixth embodiment of the present disclosure. In the sixth embodiment, a variety of traps including the oxygen trap 67, the xenon trap 68, and the purifier 69 are disposed in the pipe 24 on the downstream side of the recovery tank 63, the pressure boosting pump 64, the boosted pressure gas tank 65, and the regulator 66. The boosted pressure gas tank 65, the regulator 66, the oxygen trap 67, the xenon trap 68, and the purifier 69 may have the same configurations as those in the first embodiment.

A mass flow controller MFC3 is disposed between the regulator 66 and the oxygen trap 67. The flow rate controlled by the mass flow controller MFC3 is so set that the oxygen trap 67, the xenon trap 68, and the purifier 69 stably operate.

7.2 Effects

According to the sixth embodiment, even in a case where the flow rate of the exhaust gas exhausted from the laser chamber 10 greatly varies, or even in a case where the operation status of the pressure boosting pump 64 greatly varies, variation in the flow rate of the exhaust gas that flows into each of the variety of traps can be reduced. As a result, the life of each of the variety of traps can be prolonged.

Figure 42:
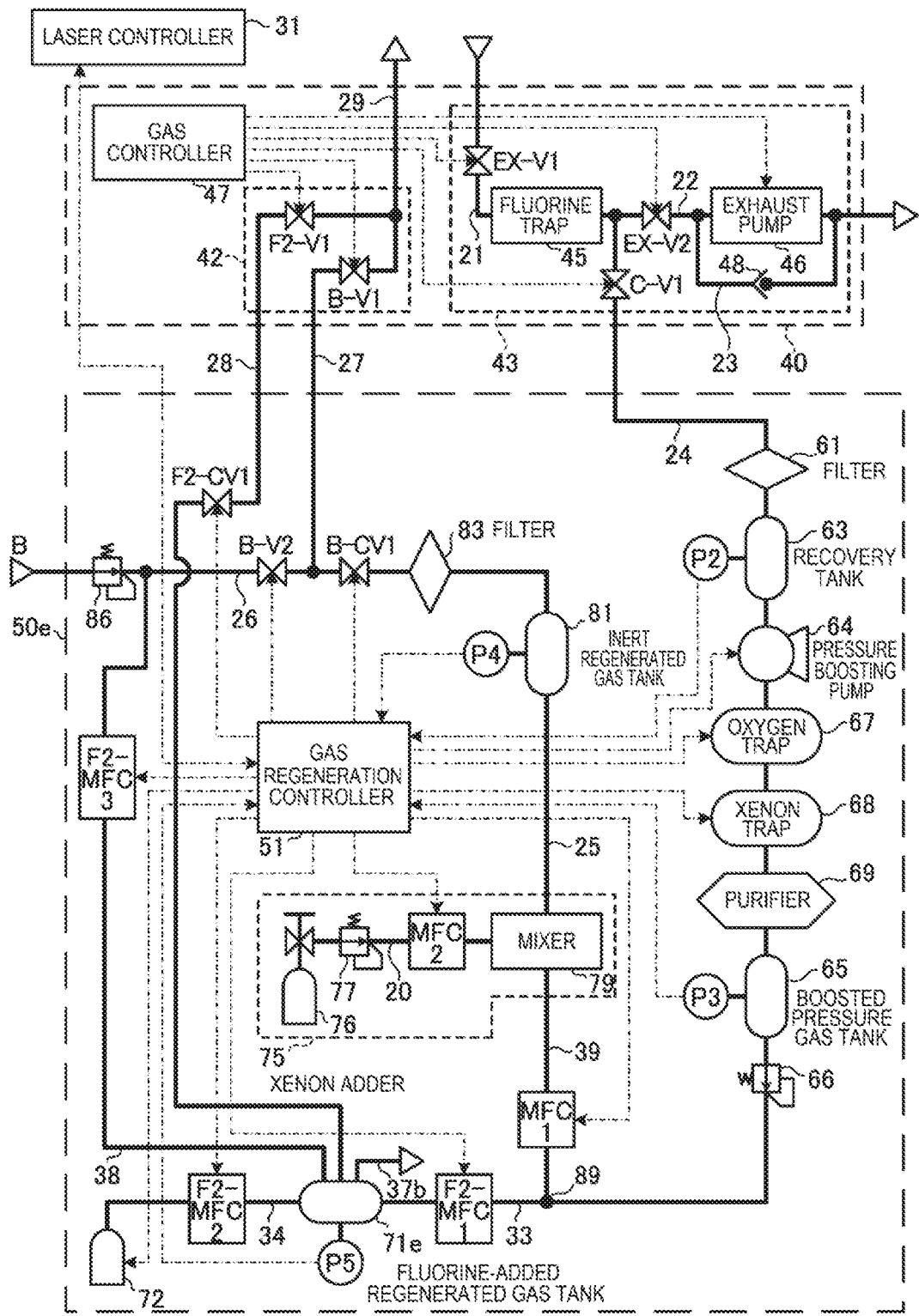
FIG. 42 schematically shows the configuration of a laser gas regeneration system 50e according to a seventh embodiment of the present disclosure.

8. Laser Gas Regeneration System in which Fluorine Gas is Added to Inert New Gas 8.1 Configuration FIG. 42 schematically shows the configuration of a laser gas regeneration system 50e according to a seventh embodiment of the present disclosure. In the seventh embodiment, the laser gas regeneration system 50e includes a fluorine-added gas tank 71e in place of the fluorine-added regenerated gas tank 71 shown in FIG. 7. The laser gas regeneration system 50e further includes a pipe 38 extending from the pipe 26 connected to the buffer gas supply source B and connected to the fluorine-added gas tank 71e. A mass flow controller F2-MFC3 is disposed in the pipe 38. The mass flow controller F2-MFC3 includes a mass flowmeter and a valve that are not shown and corresponds to the fifth valve in the present disclosure. The opening of the valve is controlled based on the flow rate measured with the mass flowmeter. The mass flow controller MFC3 thus controls the flow rate of the inert new gas. The output of the fluorine-added gas tank 71e is connected to the pipe 28. In the seventh embodiment, the fluorine-containing gas supply source F2, the regulator 44, the valve F2-V2, and the pipe 36 shown in FIG. 7 may be omitted.

A compact gas cylinder may be disposed in the laser gas regeneration system 50e as the buffer gas supply source B filled with the buffer gas.

8.2 Operation

The inert new gas is introduced into the fluorine-added gas tank 71e from the buffer gas supply source B via the pipe 38. The high-concentration fluorine gas is also introduced into the fluorine-added gas tank 71e from the fluorine gas supply source 72 via the pipe 34. The fluorine-added gas tank 71e mixes the inert new gas with the high-concentration fluorine gas and supplies the laser chamber 10 with the mixture as a fluorine-added new gas via the pipe 28.

The flow rate of the inert new gas supplied from the buffer gas supply source B to the fluorine-added gas tank 71e is controlled by the mass flow controller F2-MFC3. The flow rate of the high-concentration fluorine gas supplied from the fluorine gas supply source 72 to the fluorine-added gas tank 71e is controlled by the mass flow controller F2-MFC2.

The fluorine-added new gas, which is the inert new gas to which the high-concentration fluorine gas has been added, can be supplied to the laser chamber 10, for example, when the laser is activated. After the laser is activated, the fluorine-added regenerated gas, which is the inert regenerated gas to which the high-concentration fluorine gas has been added and introduced through the pipe 33, can be supplied to the laser chamber 10, as in the embodiments described above.

The other points are the same as those in the first embodiment described with reference to FIG. 7.

The main procedure of the control performed by the gas regeneration controller 51 is the same as that in the first embodiment described with reference to FIG. 8. The fluorine-added regenerated gas storage/supply subroutines are also the same as those in the first embodiment described with reference to FIG. 10.

8.2.1 Initial Setting Subroutine

Figure 43:
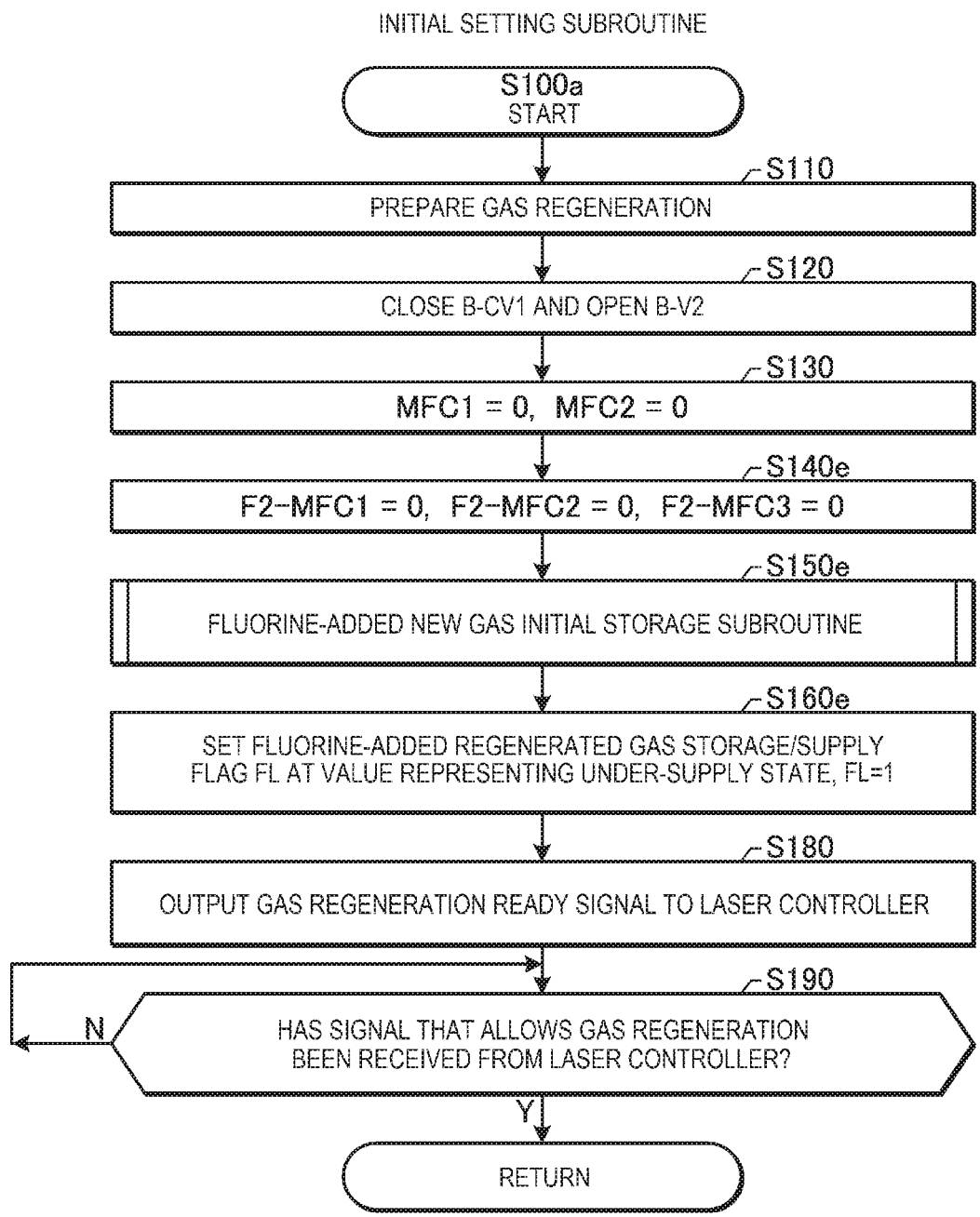
FIG. 43 is a flowchart showing in detail an initial setting subroutine in the seventh embodiment.

FIG. 43 is a flowchart showing in detail the initial setting subroutine in the seventh embodiment. The processes shown in FIG. 43 are carried out as a subroutine of S100a shown in FIG. 8 by the gas regeneration controller 51.

First, the processes in S110 to S130 are the same as the corresponding processes in Comparative Example described above.

Thereafter, in S140e, the gas regeneration controller 51 sets the flow rate F2-MFC1 controlled by the mass flow controller F2-MFC1, the flow rate F2-MFC2 controlled by the mass flow controller F2-MFC2, and the flow rate F2-MFC3 controlled by the mass flow controller F2-MFC3 each at 0. As a result, no inert regenerated gas, high-concentration-fluorine gas, or inert new gas flows into the fluorine-added gas tank 71e.

Thereafter, in S150e, the gas regeneration controller 51 carries out a fluorine-added new gas initial storage subroutine to store the fluorine-added new gas in the fluorine-added gas tank 71e. The fluorine-added new gas initial storage subroutine will be described later in detail with reference to FIG. 44.

Thereafter, in S160e, the gas regeneration controller 51 sets the fluorine-added regenerated gas storage/supply flag FL at the value representing the under-supply state, for example, at 1.

The following processes in S180 to S190 are the same as the corresponding processes in Comparative Example described above.

After S190, the gas regeneration controller 51 terminates the processes in the present flowchart and returns to the processes in FIG. 8.

In S160e described above, the fluorine-added regenerated gas storage/supply flag FL has been set at the value representing the under-supply state, for example, at 1. Therefore, in the seventh embodiment, when S500a is carried out for the first time after S100a in FIG. 8, the fluorine-added regenerated gas is supplied in S530a, as shown in FIG. 10. Thereafter, whenever S500a is carried out, the gas storage in S520a or the gas supply in S530a is performed. The process in S530a in the seventh embodiment will be described later with reference to FIG. 46. The process in S520a in the seventh embodiment will be described later with reference to FIG. 45.

Figure 44:
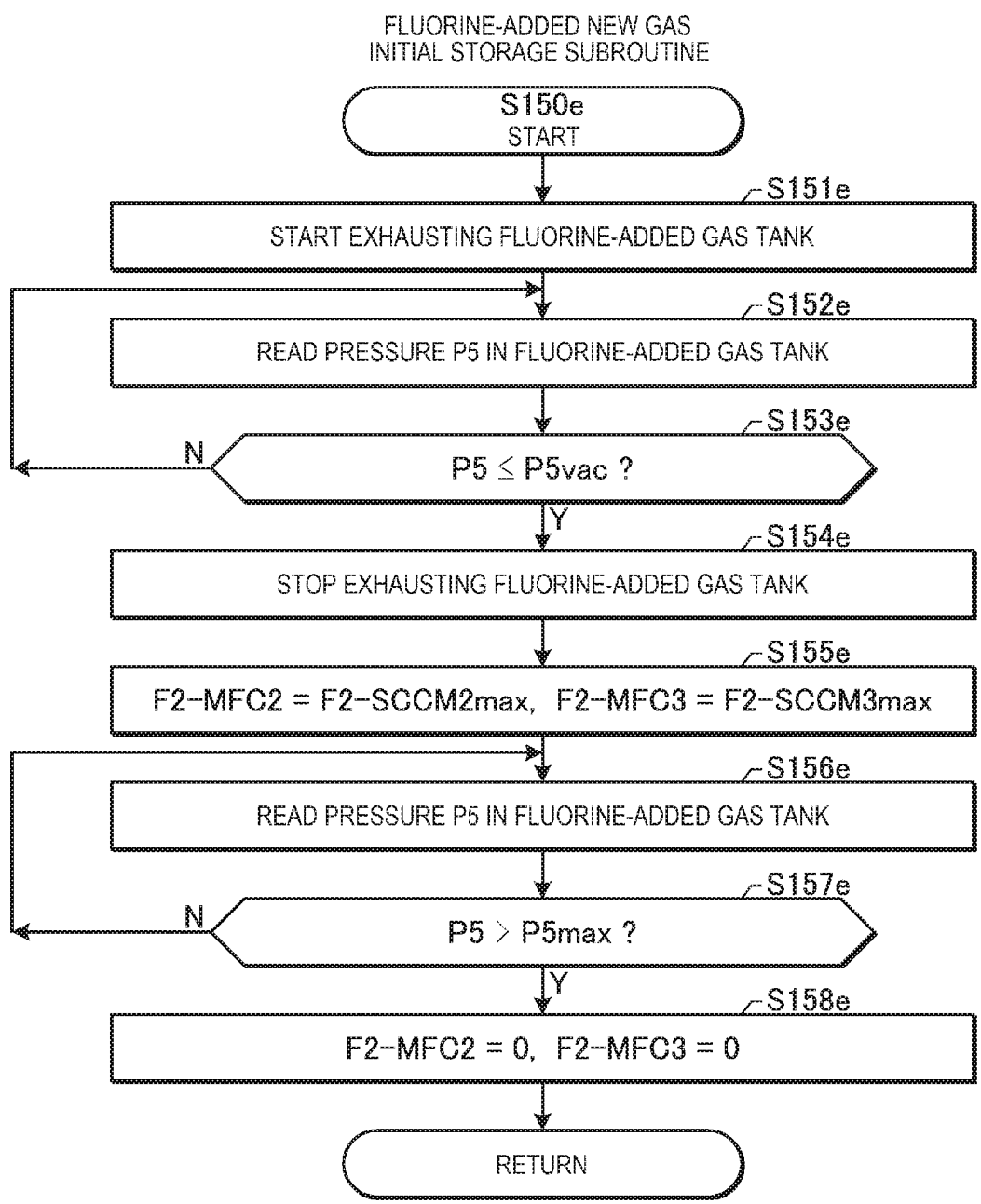
FIG. 44 is a flowchart showing in detail a fluorine-added new gas initial storage subroutine in the seventh embodiment.

FIG. 44 is a flowchart showing in detail the fluorine-added new gas initial storage subroutine in the seventh embodiment. The processes shown in FIG. 44 are carried out as a subroutine of S150e shown in FIG. 43 by the gas regeneration controller 51.

First, in S151e, the gas regeneration controller 51 starts exhausting the fluorine-added gas tank 71e. The fluorine-added gas tank 71e is exhausted via the pipe 37b shown in FIG. 42. The pipe 37b corresponds to the pipe 37b described with reference to FIG. 13 and may be provided with the exhaust pump 74 and other components.

Thereafter, in S152e, the gas regeneration controller 51 reads the pressure P5 in the fluorine-added gas tank 71e outputted from the fluorine-added gas pressure sensor P5.

Thereafter, in S153e, the gas regeneration controller 51 evaluates whether or not the pressure P5 in the fluorine-added gas tank 71e is smaller than or equal to the predetermined value P5vac. The predetermined value P5vac is set, for example, at nearly vacuum pressure.

In a case where the pressure P5 is greater than the predetermined value P5vac (NO in S153e), the gas regeneration controller 51 returns to the process in S152e and repeats the processes in S152e and S153e until the pressure P5 becomes smaller than equal to the predetermined value P5vac.

In a case where the pressure P5 is smaller than or equal to the predetermined value P5vac (YES in S153e), the gas regeneration controller 51 proceeds to the process in S154e.

In S154e, the gas regeneration controller 51 stops the gas exhausting operation performed on the fluorine-added gas tank 71e.

Thereafter, in S155e, the gas regeneration controller 51 sets the flow rate F2-MFC2 controlled by the mass flow controller F2-MFC2 at a predetermined value F2-SCCM2max and the flow rate F2-MFC3 controlled by the mass flow controller F2-MFC3 at a predetermined value F2-SCCM3max. As a result, the inert new gas and the high-concentration fluorine gas flow into the fluorine-added gas tank 71e. The predetermined values F2-SCCM2max and F2-SCCM3max are each so set that the fluorine-added new gas, which is the mixture generated in the fluorine-added gas tank 71e, has a desired fluorine concentration.

Thereafter, in S156e, the gas regeneration controller 51 reads the pressure P5 in the fluorine-added gas tank 71e outputted from the fluorine-added gas pressure sensor P5.

Thereafter, in S157e, the gas regeneration controller 51 evaluates whether or not the pressure P5 in the fluorine-added gas tank 71e is greater than the predetermined value P5max. The predetermined value P5max is set, for example, at a value smaller than designed upper-limit pressure in the fluorine-added gas tank 71e but close thereto.

In a case where the pressure P5 is smaller than or equal to the predetermined value P5max (NO in S157e), the gas regeneration controller 51 returns to the process in S156e and repeats the processes in S156e and S157e until the pressure P5 becomes greater than the predetermined value P5max.

In a case where the pressure P5 is greater than the predetermined value P5max (YES in S157e), the gas regeneration controller 51 proceeds to the process in S158e.

In S158e, the gas regeneration controller 51 sets the flow rate F2-MFC2 controlled by the mass flow controller F2-MFC2 and the flow rate F2-MFC3 controlled by the mass flow controller F2-MFC3 each at 0. As a result, the inert new gas and the high-concentration-fluorine gas flow into the fluorine-added gas tank 71e.

After S158e, the gas regeneration controller 51 terminates the processes in the present flowchart and returns to the processes in FIG. 43.

8.2.2 Fluorine-Added Regenerated Gas Storage Subroutine

Figure 45:
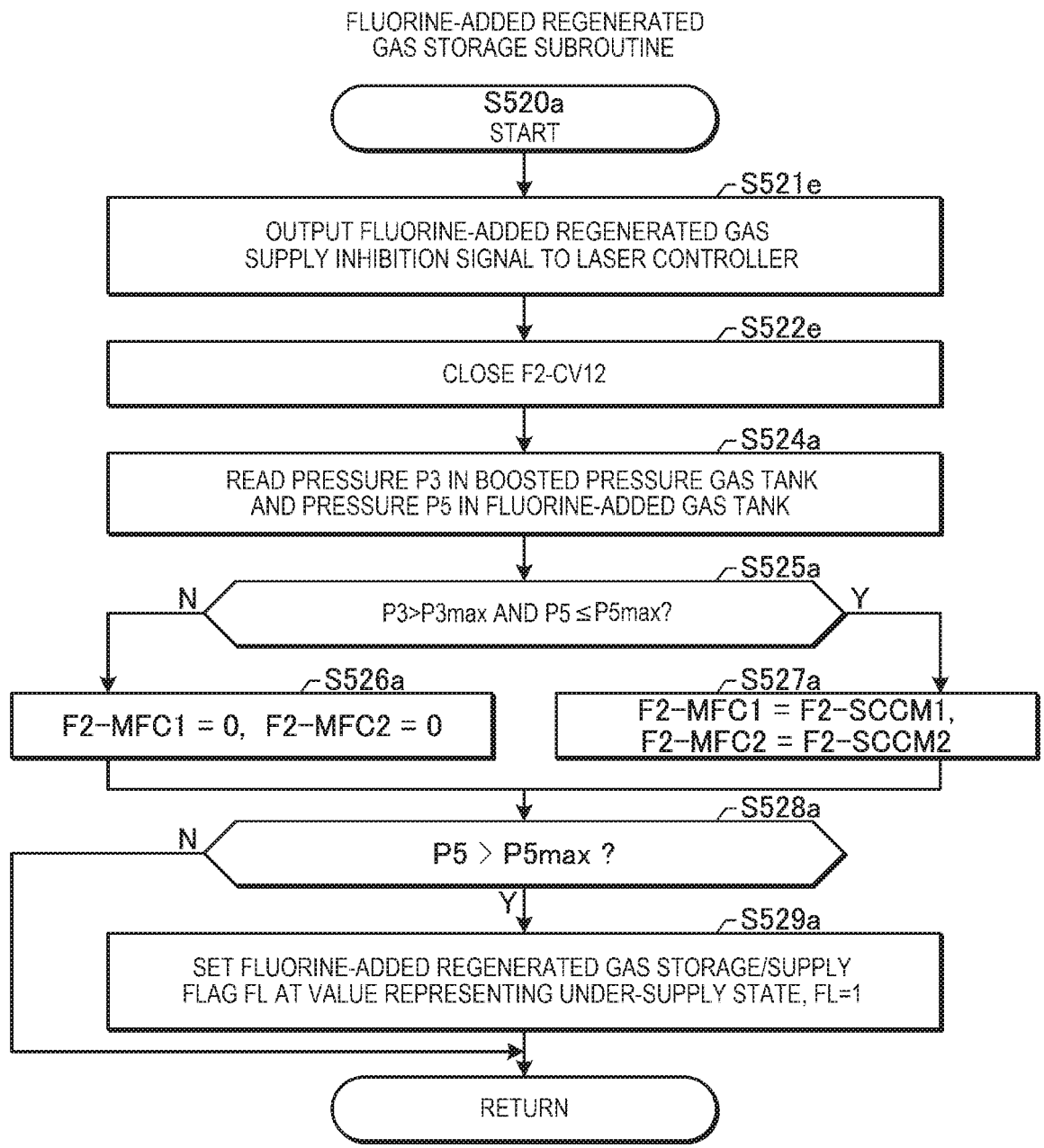
FIG. 45 is a flowchart showing in detail a fluorine-added regenerated gas storage subroutine in the seventh embodiment.

FIG. 45 is a flowchart showing in detail the fluorine-added regenerated gas storage subroutine in the seventh embodiment. The processes shown in FIG. 45 are carried out as a subroutine of S520a shown in FIG. 10 by the gas regeneration controller 51.

First, in S521e, the gas regeneration controller 51 outputs a fluorine-added regenerated gas supply inhibition signal to the laser controller 31.

Thereafter, in S522e, the gas regeneration controller 51 closes the valve F2-CV1. As a result, the supply of the fluorine-added regenerated gas to the laser chamber 10 is terminated.

The processes in S524a to S529a after S522e are the same as the corresponding processes in the first embodiment described with reference to FIG. 11.

8.2.3 Fluorine-Added Regenerated Gas Supply Subroutine

Figure 46:
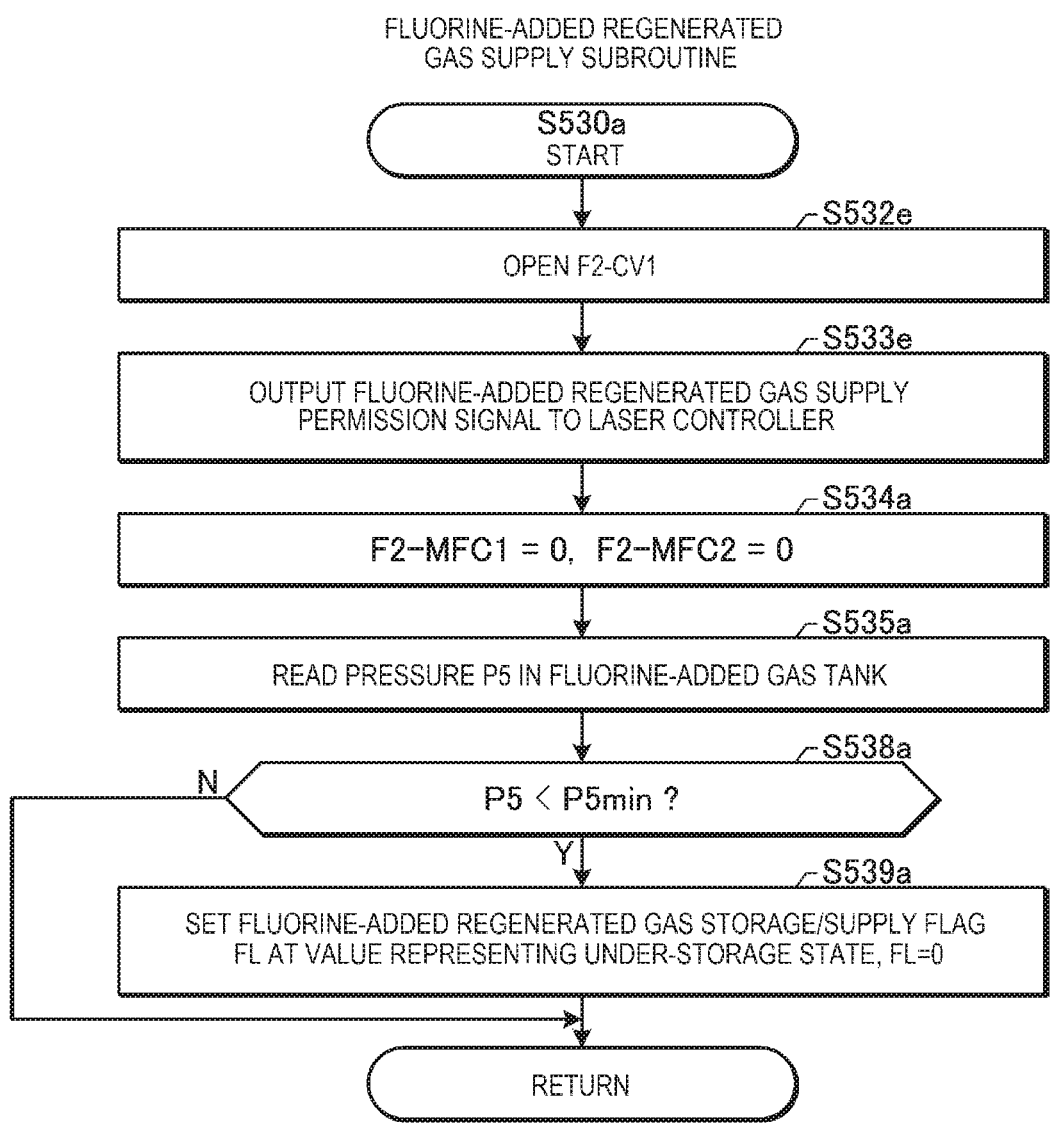
FIG. 46 is a flowchart showing in detail a fluorine-added regenerated gas supply subroutine in the seventh embodiment.

FIG. 46 is a flowchart showing in detail the fluorine-added regenerated gas supply subroutine in the seventh embodiment. The processes shown in FIG. 46 are carried out as a subroutine of S530a shown in FIG. 10 by the gas regeneration controller 51.

The description will be primarily made of a case where the fluorine-added regenerated gas is supplied to the laser chamber 10. It is, however, noted that when the processes shown in FIG. 46 are carried out for the first time after the initial setting described with reference to FIGS. 43 and 44, the fluorine-added new gas is supplied in place of the fluorine-added regenerated gas to the laser chamber 10. In FIG. 46, the name of a signal or a flag contains a word "regenerated" in some cases, the signal and flag are also used in a case where the fluorine-added new gas is supplied to the laser chamber 10.

First, in S532e, the gas regeneration controller 51 opens the valve F2-CV1. As a result, the fluorine-added regenerated gas or the fluorine-added new gas can be supplied to the laser chamber 10.

Thereafter, in S533e, the gas regeneration controller 51 outputs a fluorine-added regenerated gas supply permission signal to the laser controller 31.

The processes in S534a to S539a after S533e are the same as the corresponding processes in the first embodiment described with reference to FIG. 12.

8.3 Effects

According to the seventh embodiment, since the inert new gas is mixed with the high-concentration fluorine gas to generate the fluorine-added new gas, no fluorine-containing gas supply source F2 is required. Further, the buffer gas supply source B can be built in the laser gas regeneration system 50e, so that no facilities of the gas cylinders of the buffer gas supply source B and the fluorine-containing gas supply source F2 or the laser gas pipes are required, whereby the cost for the facilities can be reduced.

9. Others

The above description is intended not to be limiting but merely to exemplary. It will therefore be apparent for a person skilled in the art that the embodiments of the present disclosure can be changed without departing from the accompanying claims.

The terms used in the entire specification and accompanying claims should each be construed as a "non-limiting" term. For example, the term "include" or "included" should be construed as "does not necessarily include only what is described." The term "have" should be construed as "does not necessarily have only what is described." Further, an indefinite article "a" described in the present specification and the accompanying claims should be construed as a term that means "at least one" or "one or more."

What is claimed is:

1. A laser gas regeneration system for an excimer laser including a first pipe configured to be capable of supplying a laser chamber with a first laser gas, a second pipe configured to be capable of supplying the laser chamber with a second laser gas having a halogen gas concentration higher than a halogen gas concentration of the first laser gas, and a third pipe configured to allow a gas exhausted from the laser chamber to pass therethrough, the laser gas regeneration system comprising:
   a gas refiner that refines the gas having passed through the third pipe;

a branch that causes a gas having flowed into the gas refiner and having been refined by the gas refiner to divide and flow into a fourth pipe and a fifth pipe;
a first regenerated gas supplier that supplies the first pipe with a gas having divided and flowed into the fourth pipe; and
a second regenerated gas supplier that adds a halogen gas to a gas having divided and flowed into the fifth pipe and supplies the second pipe with the gas to which the halogen gas has been added.

2. The laser gas regeneration system according to claim 1, further comprising:
a first valve that controls the first laser gas that flows into the first pipe from a first laser gas supply source containing the first laser gas;
a second valve that controls the gas that flows into the first pipe from the first regenerated gas supplier;
a third valve that controls the second laser gas that flows into the second pipe from a second laser gas supply source containing the second laser gas; and
a fourth valve that controls the gas that flows into the second pipe from the second regenerated gas supplier.

3. The laser gas regeneration system according to claim 1, wherein the second regenerated gas supplier includes a halogen gas supply source that supplies a third laser gas having a halogen gas concentration higher than the halogen gas concentration of the second laser gas and a halogen-added gas tank into which the gas having divided and flowed into the fifth pipe and the third laser gas flow, and the gases having flowed into the halogen-added gas tank are supplied to the second pipe via a sixth pipe.

4. The laser gas regeneration system according to claim 3, further comprising:
a first valve that controls the first laser gas that flows into the first pipe from a first laser gas supply source containing the first laser gas;
a second valve that controls the gas that flows into the first pipe from the first regenerated gas supplier;
a fifth valve that controls the gas that flows from the first laser gas supply source into the halogen-added gas tank; and
a sixth valve that controls the gas that flows through the fifth pipe into the halogen-added gas tank.

5. The laser gas regeneration system according to claim 3, wherein the halogen gas supply source includes a container that contains a metal fluoride and a heater that heats an interior of the container.

6. The laser gas regeneration system according to claim 3, wherein the second regenerated gas supplier further includes a seventh pipe connected to the halogen-added gas tank and a halogen gas trap and an exhaust pump disposed in the seventh pipe.

7. The laser gas regeneration system according to claim 3, wherein the gas refiner includes a recovery tank that recovers the gas having passed through the third pipe and a trap that refines a gas having passed through the recovery tank, and
the second regenerated gas supplier includes a seventh pipe connected to and between the halogen-added gas tank and the recovery tank and a halogen gas trap disposed in the seventh pipe.

8. The laser gas regeneration system according to claim 3, wherein the second regenerated gas supplier stores a predetermined amount of the third laser gas from the halogen gas supply source in the halogen-added gas tank before storing the gas having divided and flowed into the fifth pipe in the halogen-added gas tank.

9. The laser gas regeneration system according to claim 3, wherein the gas refiner includes a recovery tank that recovers the gas having passed through the third pipe and a trap that refines a gas having passed through the recovery tank, and
the second regenerated gas supplier causes part of the gas stored in the halogen-added gas tank to return to the recovery tank via a seventh pipe and a halogen gas trap disposed in the seventh pipe before storing the gas having divided and flowed into the fifth pipe in the halogen-added gas tank and then stores a predetermined amount of the third laser gas from the halogen gas supply source in the halogen-added gas tank.

10. The laser gas regeneration system according to claim 3, wherein the second regenerated gas supplier further includes a seventh pipe connected to the halogen-added gas tank and a halogen gas trap and an exhaust pump disposed in the seventh pipe,
the gas refiner includes a recovery tank that recovers the gas having passed through the third pipe and a trap that refines a gas having passed through the recovery tank, and
the second regenerated gas supplier causes part of the gas stored in the halogen-added gas tank to return to the recovery tank via the seventh pipe and the halogen gas trap before storing the gas having divided and flowed into the fifth pipe in the halogen-added gas tank, then exhausts another part of the gas stored in the halogen-added gas tank via the seventh pipe, the halogen gas trap, and the exhaust pump, and then stores a predetermined amount of the third laser gas from the halogen gas supply source in the halogen-added gas tank.

11. The laser gas regeneration system according to claim 1, wherein the second regenerated gas supplier includes a halogen gas supply source that supplies a third laser gas having a halogen gas concentration higher than the halogen gas concentration of the second laser gas and a plurality of halogen-added gas tanks into which the gas having divided and flowed into the fifth pipe and the third laser gas flow, and the gases having flowed into at least one of the plurality of halogen-added gas tanks are supplied to the second pipe via a sixth pipe.

12. The laser gas regeneration system according to claim 11, wherein the plurality of halogen-added gas tanks include a first halogen-added gas tank and a second halogen-added gas tank,
the gas storage in the first halogen-added gas tank through the fifth pipe and the gas supply from the second halogen-added gas tank to the sixth pipe are simultaneously performed, and
the gas storage in the second halogen-added gas tank through the fifth pipe and the gas supply from the first halogen-added gas tank to the sixth pipe are simultaneously performed.

13. The laser gas regeneration system according to claim 1, wherein the gas refiner includes a recovery tank that recovers the gas having passed through the third pipe, a pressure boosting pump that boosts pressure of a gas having passed through the recovery tank, a boosted pressure gas tank that contains a gas having passed through the pressure boosting pump, and a trap that refines a gas having passed through the boosted pressure gas tank.

14. The laser gas regeneration system according to claim 1, wherein the halogen gas contains fluorine gas.

15. The laser gas regeneration system according to claim 1, wherein the first laser gas contains at least one of krypton gas, neon gas, and helium gas.

16. The laser gas regeneration system according to claim 1, wherein the first laser gas contains at least one of argon gas, neon gas, and helium gas.

17. The laser gas regeneration system according to claim 1, wherein the gas refiner includes a xenon trap that traps xenon gas contained in the gas having passed through the third pipe, and the first regenerated gas supplier includes a xenon adder that adds xenon gas to the gas having divided and flowed into the fourth pipe and a regenerated gas tank into which a gas having passed through the xenon adder flows, and the gas having flowed into the regenerated gas tank is supplied to the first pipe.

* * * * *